(12) United States Patent
Makii

(10) Patent No.: US 8,275,212 B2
(45) Date of Patent: Sep. 25, 2012

(54) IMAGE PROCESSING APPARATUS, IMAGE PROCESSING METHOD, AND PROGRAM

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 758 days.

(21) Appl. No.: 12/383,423

(22) Filed: Mar. 24, 2009

(65) Prior Publication Data

US 2009/0245684 A1 Oct. 1, 2009

(30) Foreign Application Priority Data

Mar. 25, 2008 (JP) .................. P2008-078018

(51) Int. Cl.
G06K 9/36 (2006.01)
H04N 5/235 (2006.01)

(52) U.S. Cl. .................... 382/264; 348/229.1

(58) Field of Classification Search .............. 382/167, 382/254, 274–27, 284, 300, 312, 274–276, 382/305; 345/589, 617, 629, 639; 348/36, 348/221.1, 229.1, 362, 366; 358/1.9, 518, 358/520, 540; 396/61, 65

See application file for complete search history.

(56) References Cited

U.S. PATENT DOCUMENTS

| | | | | |
|---|---|---|---|---|
| 6,720,997 | B1 * | 4/2004 | Horie et al. | 348/218.1 |
| 7,142,725 | B2 * | 11/2006 | Komiya et al. | 382/284 |
| 7,295,232 | B2 | 11/2007 | Washisu | |
| 7,711,210 | B2 * | 5/2010 | Hosoda et al. | 382/305 |
| 2006/0062433 | A1 | 3/2006 | Ikeda | |
| 2006/0127084 | A1 | 6/2006 | Okada | |

FOREIGN PATENT DOCUMENTS

| | | |
|---|---|---|
| EP | 1434443 A1 | 6/2004 |
| EP | 1814315 A1 | 8/2007 |
| JP | 2003298925 A | 10/2003 |
| JP | 2004-219765 A | 8/2004 |
| JP | 2005-354166 A | 12/2005 |
| JP | 2006-086933 A | 3/2006 |
| JP | 2006-174069 A | 6/2006 |
| JP | 2006-191296 A | 7/2006 |
| JP | 2007243418 A | 9/2007 |
| WO | 2008004005 A2 | 1/2008 |

OTHER PUBLICATIONS

European Search Report EP 09155942, dated Nov. 2, 2010.
Office Action from Japanese Application No. 2008-078018, dated May 15, 2012.

* cited by examiner

*Primary Examiner* — Kanjibah Patel
(74) *Attorney, Agent, or Firm* — Lerner, David, Littenberg, Krumholz & Mentlik, LLP

(57) ABSTRACT

An image processing apparatus includes a pre-combination processing unit configured to perform a pre-combination process so that a plurality of frames of image data having continuity in time are used as combination-use image data to be combined, an operation detection unit configured to detect operation input information used for a combination process, a storage unit configured to store coefficient templates each having a pattern of weighting coefficients assigned to image data of frames, a template management unit configured to select one of the coefficient templates stored in the storage unit according to the operation input information, and a combination processing unit configured to perform a combination process on the combination-use image data of the plurality of frames obtained in the pre-combination process using the coefficient template selected by the template management unit so as to generate combined-image data representing a still image.

10 Claims, 57 Drawing Sheets

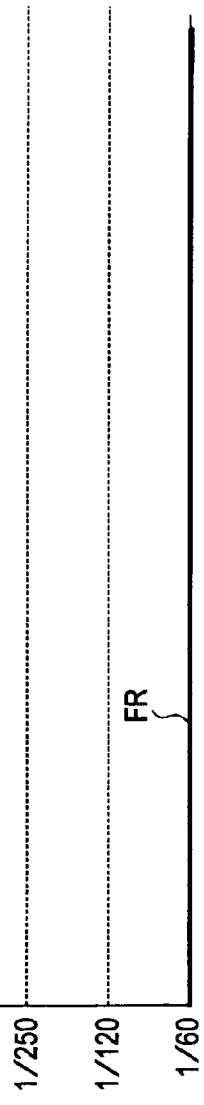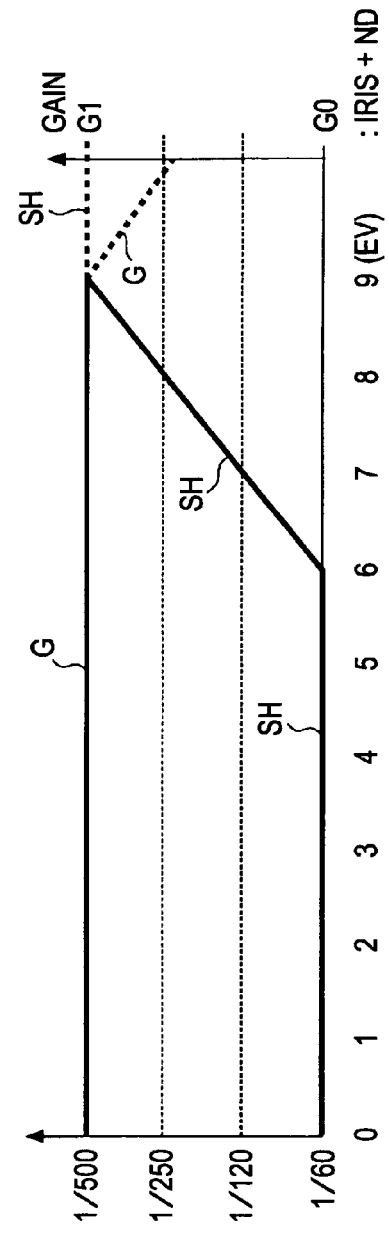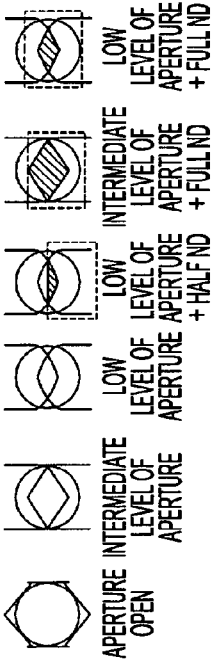

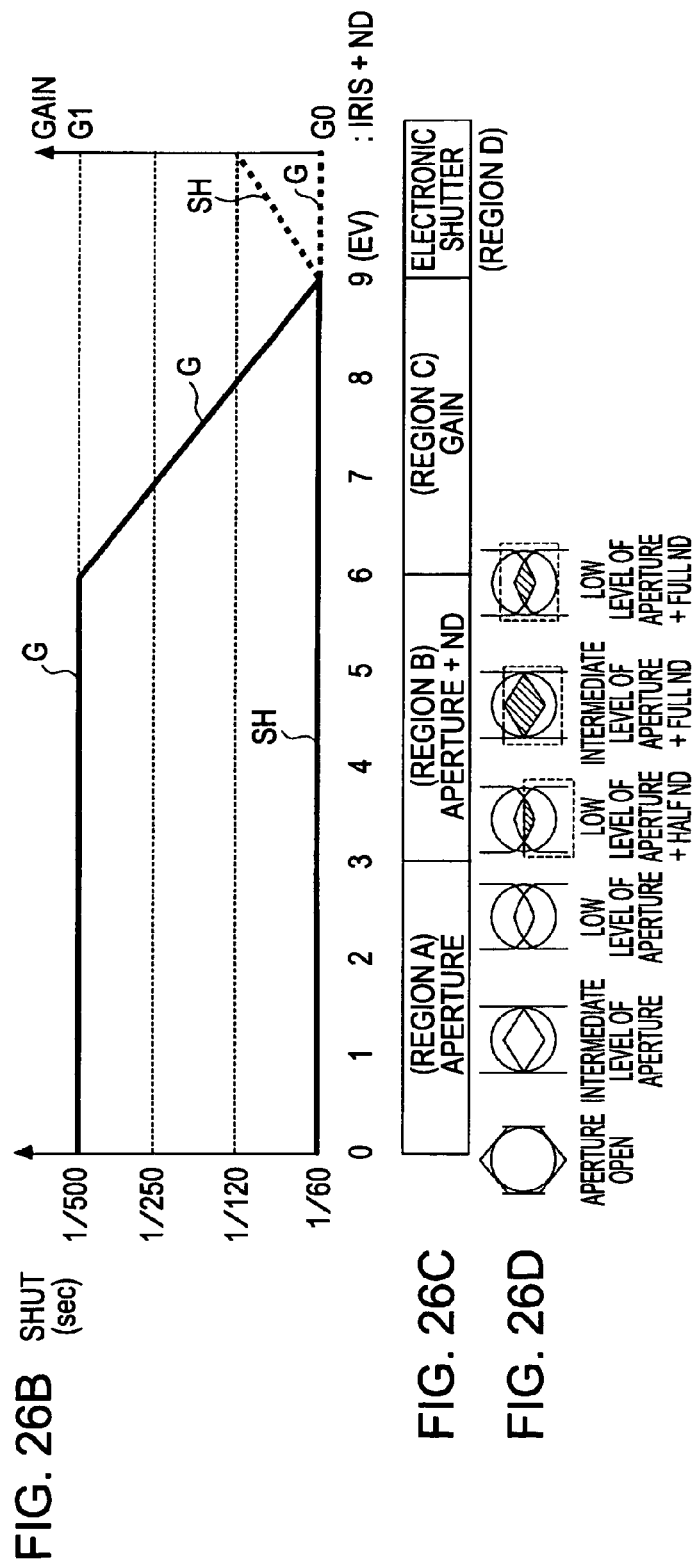

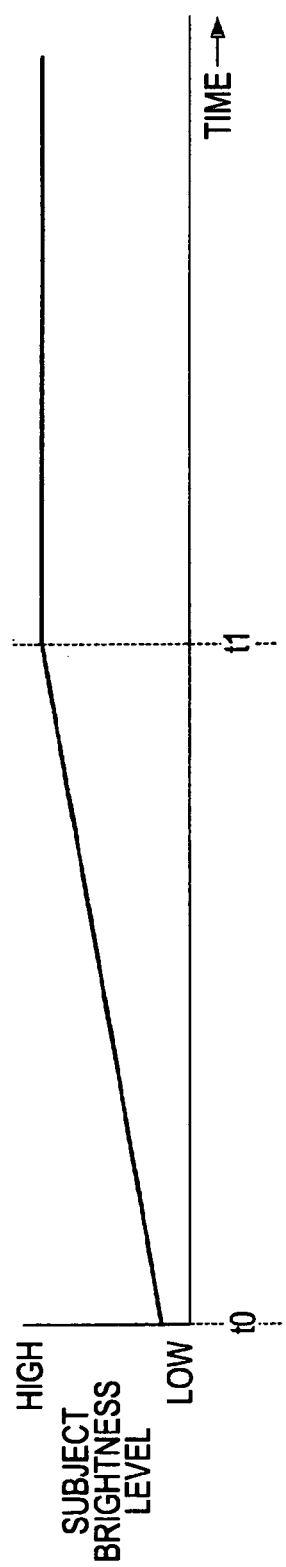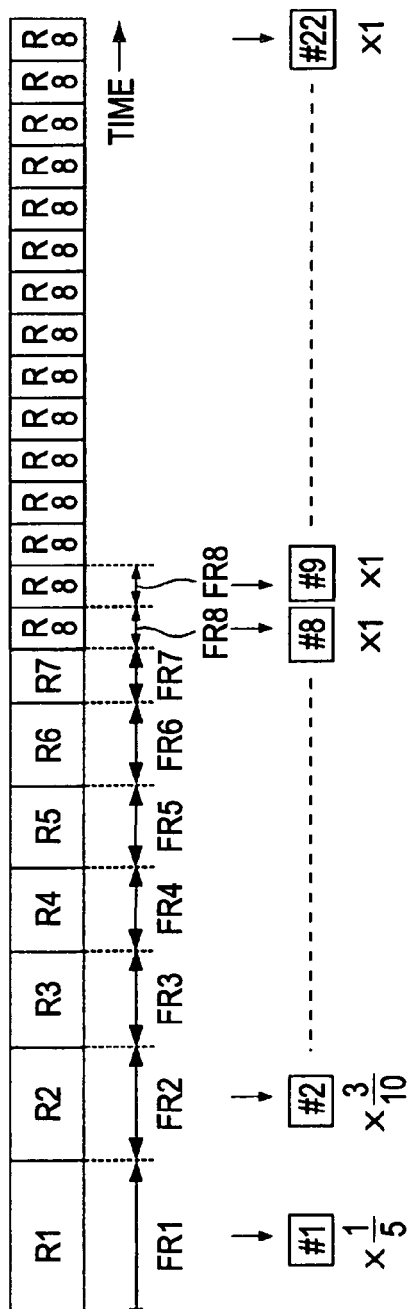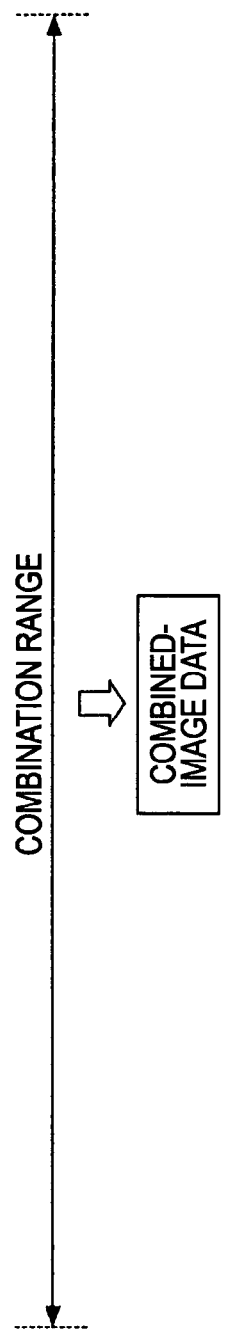

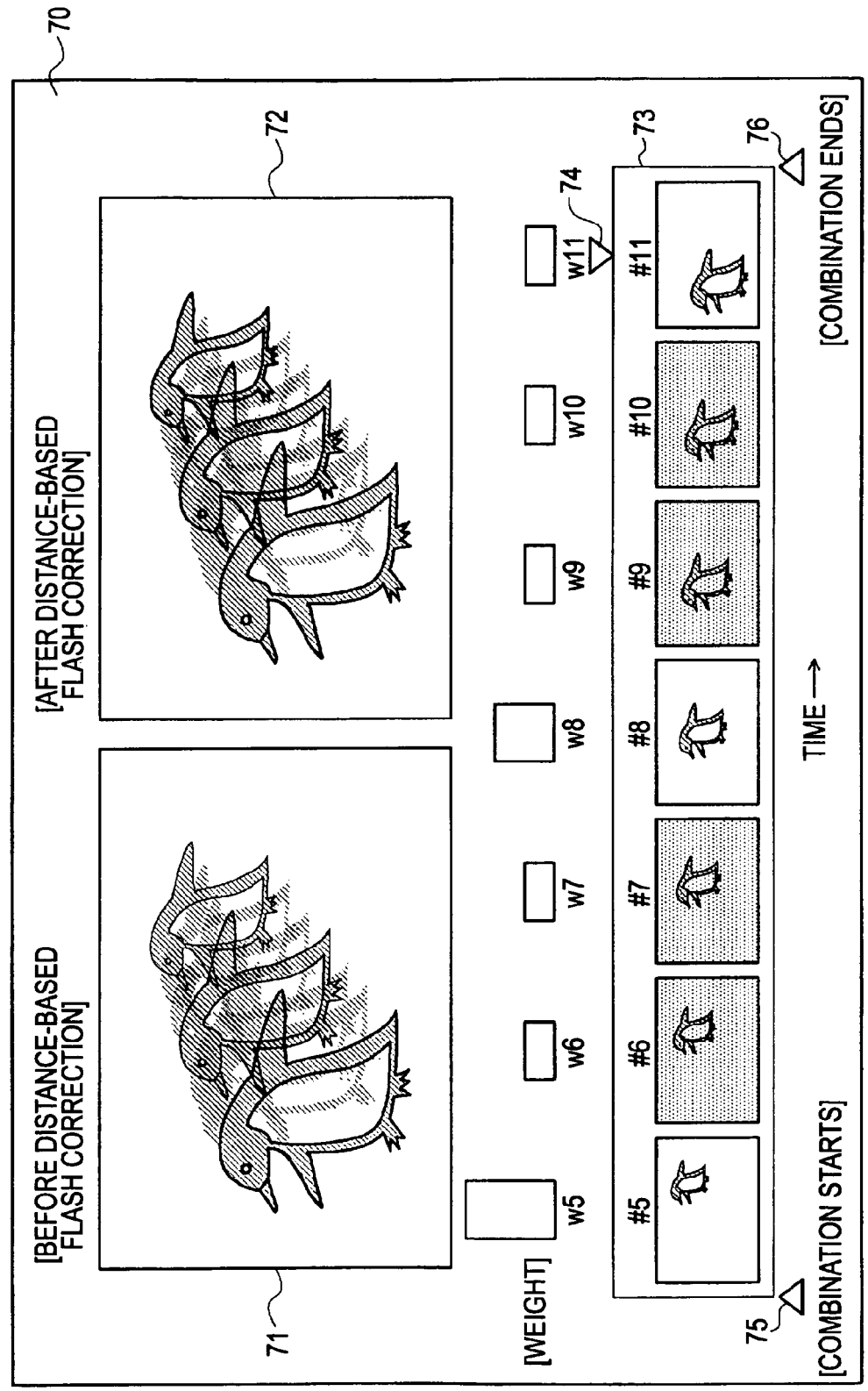

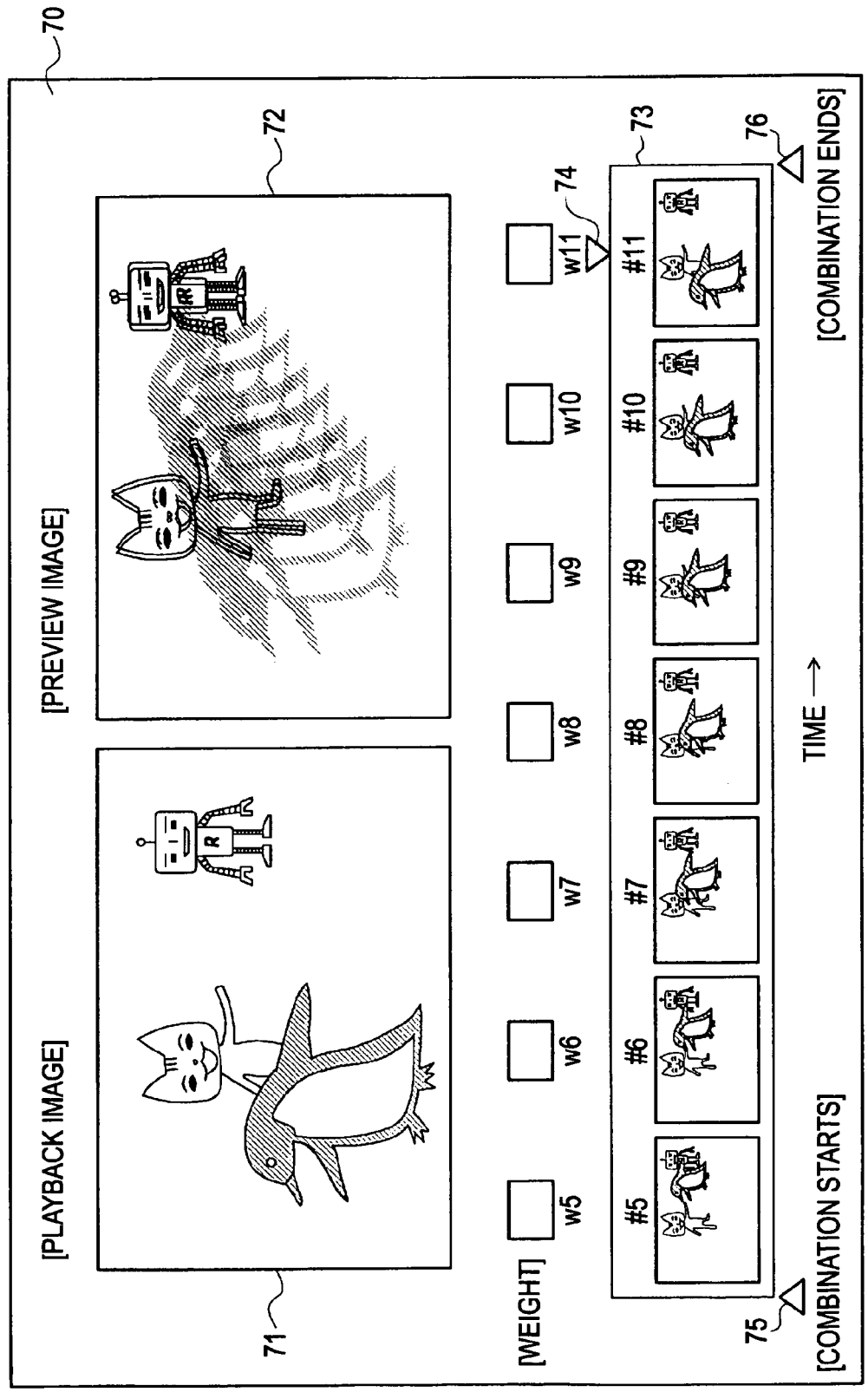

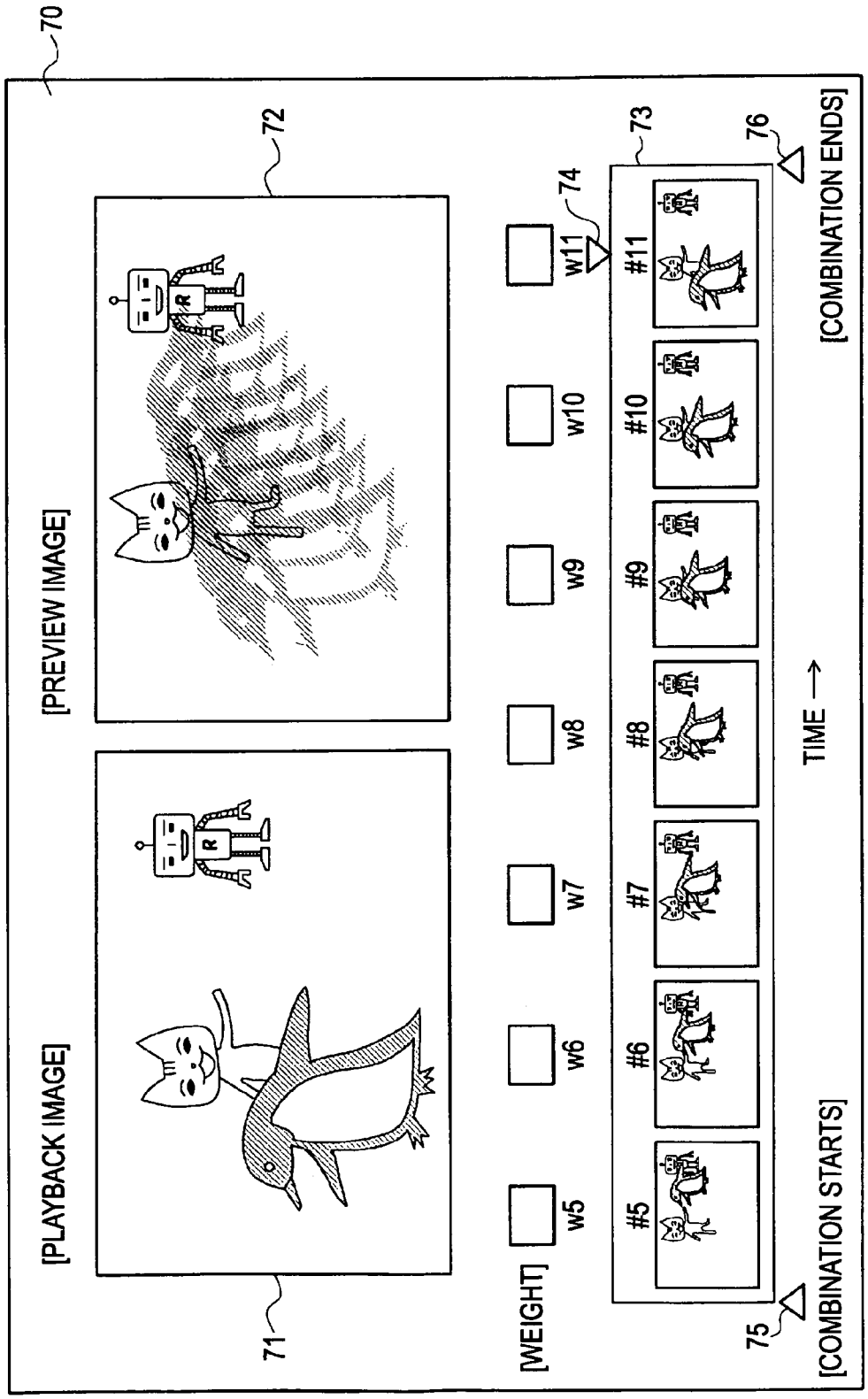

IMAGE PROCESSING APPARATUS, IMAGE PROCESSING METHOD, AND PROGRAM

CROSS REFERENCES TO RELATED APPLICATIONS

The present application claims priority from Japanese Patent Application No. JP 2008-078018, filed in the Japanese Patent Office on Mar. 25, 2008, the entire content of which is incorporated herein by reference.

BACKGROUND OF THE INVENTION

1. Field of the Invention

The present invention relates to an image processing apparatus, an image processing method, and a program for image processing.

2. Description of the Related Art

Japanese Unexamined Patent Application Publications No. 2005-354166, No. 2004-219765 (corresponding to U.S. Pat. No. 7,295,232B2), No. 2006-86933 (corresponding to US 2006062433A1), and No. 2006-174069 (corresponding to US 2006127084A1) are examples of related art.

A long-time exposure technique is common as a photographic or image capture technique. In this technique, exposure is continuously performed for a certain period of time such as several seconds to several tens of seconds or even over several tens of minutes.

The long-time exposure technique is also used to provide photographic representations as well as to adjust the brightness of a subject.

For example, night scenes are captured with a long exposure time. Since the amount of light is low, the exposure time is increased to collect a sufficient amount of light to obtain shots of night scenes.

The long-time exposure technique may also be used for other purposes. For example, the aperture is intentionally set low or the image capture sensitivity is reduced to represent the motion of a subject or focus on a stationary object among moving objects.

Image capture techniques such as using a flash (flashlight device) during long-time exposure to achieve various effects such as first-curtain synchronization, second-curtain synchronization, and multi-flash are also common.

SUMMARY OF THE INVENTION

However, it is difficult for users to obtain their desired images using long-time exposure image capture.

Some recent image capture apparatuses (such as digital still cameras) are designed such that the cameras perform metering in the normal image capture process to determine appropriate exposure settings (aperture and shutter speed). However, in dark conditions involving long-time exposure, the light level is outside the metering range determined by the cameras and the exposure settings are not provided. In such cases, it is necessary for users to determine settings such as the exposure time and the shutter time according to their experience and intuition in order to perform long-time exposure image capture. In practice, this is difficult for inexperienced users.

Japanese Unexamined Patent Application Publication No. 2005-354166 discloses a technique for achieving the image effect of long-time exposure using a combination process.

This technique includes real-time observation of an image which is being produced as a result of light received by solid-state image capture elements during exposure, selection and combination of a plurality of images after image capture that are divisionally generated during exposure, and removal of an undesired image during exposure.

This technique provides a favorable image using long-time exposure photography under image capture conditions where the subject is not moving (there is little motion or, even though the subject is moving, no motion blur occurs because the exposure time is sufficiently long). This is effective to capture non-motion scenes such as night scenes using a long exposure time.

However, it is difficult to obtain a favorable image when a user wishes to capture a still image of a moving subject, for example, an image representing the motion of a subject or an image in which a stationary object is focused on among moving objects.

It is also difficult to obtain a still image that provides a smooth representation of motion by removing an undesired image during exposure (such as an image of a night scene which is captured when surroundings are illuminated by the headlight of a vehicle passing by).

While the first-curtain synchronization, second-curtain synchronization, and multi-flash effects described above are used as photographic or image capture representation techniques, it is necessary for users to determine settings such as the shutter time, the exposure time, and the amount of flash illumination according to their experience and intuition in order to obtain their desired images. This is also difficult for inexperienced users.

Since there are actually "flash prohibited" environments in public spaces such as museums, images with effects such as first-curtain synchronization, second-curtain synchronization, and multi-flash may not necessarily be obtained.

Furthermore, since firing a flash consumes power, a battery or capacitor for a flash is necessary. This may inhibit the reduction in device size, power consumption, and cost.

Furthermore, it is often necessary to use a tripod to hold a camera during long-time exposure to prevent the camera from moving. Photographers or users therefore purchase accessories in addition to a camera body, such as a tripod and also carry the accessories. The transportation of the camera and accessories will be a burden for the users to discourage the user from readily capturing images with a long exposure time.

During long-time exposure, further, movements of subjects, camera shake, or the like may cause blurring of all moving subjects in a captured image. Thus, it is difficult to obtain sufficient image capture conditions for capturing a desired image.

Moreover, during long-time exposure image capture, for example, the firing of a flash by another photographer or instantaneous illumination from the headlight of a vehicle passing by would not provide a favorable combined image.

It is therefore desirable to allow general users who are not experts to easily achieve various image effects, in particular, an image effect similar to the long-time exposure effect or image effects achieved using long-time exposure such as first-curtain synchronization, second-curtain synchronization, and multi-flash. It is also desirable to allow users to easily obtain their desired images.

In an embodiment of the present invention, an image processing apparatus includes a pre-combination processing unit configured to perform a pre-combination process so that a plurality of frames of image data having continuity in time are used as combination-use image data to be combined, an operation detection unit configured to detect operation input information used for a combination process, a storage unit configured to store coefficient templates each having a pattern of weighting coefficients assigned to image data of frames, a template management unit configured to select one of the coefficient templates stored in the storage unit according to the operation input information detected by the operation detection unit, and a combination processing unit configured to perform a combination process on the combination-use image data of the plurality of frames obtained in the pre-combination process using the coefficient template selected by the template management unit so as to generate combined-image data representing a still image.

The coefficient templates may include a coefficient template having a pattern of weighting coefficients in which a high weighting coefficient is assigned to a start frame in consecutive frames and in which a low weighting coefficient is assigned to a remaining frame. That is, a weighting coefficient pattern for achieving the first-curtain synchronization effect is obtained.

The coefficient templates may include a coefficient template having a pattern of weighting coefficients in which a high weighting coefficient is assigned to a last frame in consecutive frames and in which a low weighting coefficient is assigned to a remaining frame. That is, a weighting coefficient pattern for achieving the second-curtain synchronization effect is obtained.

The coefficient templates may include a coefficient template having a pattern of weighting coefficients in which a high weighting coefficient and a low weighting coefficient are periodically assigned to consecutive frames. That is, a weighting coefficient pattern for achieving the multi-flash effect is obtained.

In the pre-combination process, the pre-combination processing unit may obtain a plurality of frames of image data having continuity in time that are recorded on a recording medium and may use the obtained plurality of frames of image data as combination-use image data to be combined.

The image processing apparatus may further include an image capture unit configured to capture an image of a subject to obtain image data, and a recording playback unit configured to record and play back the image data obtained by the image capture unit onto and from a recording medium. In the pre-combination process, the pre-combination processing unit may detect a plurality of consecutive or intermittent frames of image data from a plurality of frames of image data that are recorded on a recording medium using the recording playback unit, and may use the detected plurality of consecutive or intermittent frames of image data as combination-use image data to be combined.

The image processing apparatus may further include a display control unit configured to generate display data for selecting a coefficient template from the coefficient templates and output the generated display data as image data used for display.

The display control unit may generate display data for selecting a coefficient template from the coefficient templates so as to include an image in which combination effects achieved using the coefficient templates are shown, and may output the generated display data as image data used for display.

In another embodiment of the present invention, an image processing method includes the steps of performing a pre-combination process so that a plurality of frames of image data having continuity in time are used as combination-use image data to be combined; detecting operation input information used for a combination process; selecting one of coefficient templates according to the operation input information, each coefficient template being stored as a pattern of weighting coefficients assigned to image data of frames; and performing a combination process on the combination-use image data of the plurality of frames obtained in the pre-combination process using the selected coefficient template so as to generate combined-image data representing a still image.

In still another embodiment of the present invention, a program causes an arithmetic processing apparatus to execute the steps described above.

In the embodiments of the present invention, a plurality of frames of image data having continuity in time, that is, a sequence of image data that has been captured in a movie fashion, are combined to obtain a combined image with a long-time exposure effect applied.

In this case, first, in the pre-combination process, a plurality of frames of image data are obtained as combination-use image data. For example, image data obtained by an image capture operation, or a sequence of image data captured using the user's apparatus or any other apparatus and recorded onto a certain recording medium, can be used as the combination-use image data.

In a combination process, a user performs an operation input to select a coefficient template. Coefficient templates are stored as patterns of weighting coefficients suitable for various effects such as the first-curtain synchronization effect, second-curtain synchronization effect, and multi-flash effect.

In the combination process, a combination process is performed using the selected coefficient template. Specifically, weighting coefficients designated in the coefficient template are assigned to the combination-use image data of the plurality of frames to perform a combination process so as to generate combined-image data representing a still image. Thus, the user can obtain an image with a desired effect only by selecting a coefficient template.

The image processing apparatus and the image processing method according to the embodiments of the present invention can be implemented in various apparatuses including an image capture apparatus such as a digital still camera, and an information processing apparatus such as a personal computer.

According to the embodiments of the present invention, therefore, image effects similar to long-time exposure and other special effects, which may be achievable only by experts in the related art, and image effects that could not have been achieved in image capture of the related art can be easily achieved by general users. For example, enhanced photographic representations or more creative photographic representations can be promoted. In particular, in a combination process, a user can obtain an image with a desired effect only by selecting a coefficient template. Thus, it is easier to obtain an image equivalent to that obtained using high-performance image capture techniques.

In addition, an image in which combination effects achieved using coefficient templates are shown is displayed to a user as an output image for helping select a coefficient template. Therefore, even a user who is not familiar with various high-performance image capture techniques can readily obtain the effect of the techniques.

BRIEF DESCRIPTION OF THE DRAWINGS

FIGS. 25A to 25D are diagrams showing examples of exposure adjustment control methods according to the embodiment;

FIGS. 26A to 26D are diagrams showing exposure adjustment control methods using preferentially functions other than the electronic shutter according to the embodiment;

FIGS. 31A to 31C are diagrams showing a variable-frame-rate operation according to the embodiment;

FIG. 47 is a diagram showing another combination-work image obtained when distance-based flash correction is performed according to the embodiment;

FIG. 49 is a diagram showing a combination-work image in which a combined image affected by camera shake is displayed according to the embodiment;

FIG. 50 is a diagram showing a combination-work image in which a combined image after camera-shake correction is displayed according to the embodiment;

DESCRIPTION OF THE PREFERRED EMBODIMENTS

An embodiment of the present invention will be described hereinafter in the following order:
1. Structure of Image Capture Apparatus
2. Operation Mode
3. Camera-Mode Processes
4. Combination-Mode Process
4-1: Combining Preparatory Process
4-2: Combination Process
4-3: Exemplary Adjustment Process Using Displayed Images before and after Change
5. Template-based Process
6. Image Capture Operation at Fixed Frame Rate
7. Image Capture Operation at Variable Frame Rate
8. Exemplary Combination-Mode Process: Frame Interpolation
9. Exemplary Combination-Mode Processes: Flash Removal/Correction
10. Exemplary Combination-Mode Processes: Distance-based Correction
11. Exemplary Combination-Mode Processes: Blurring Correction
12. Information Processing Apparatus
1. Structure of Image Capture Apparatus The structure of an image capture apparatus according to an embodiment of the present invention will now be described in the context of the structure of a digital still camera with reference to FIGS. 1 to 3.

Figure 2A:
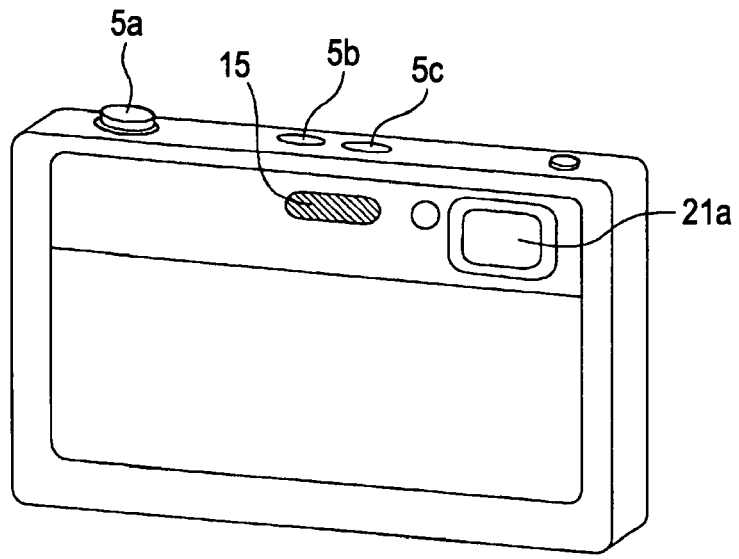
FIGS. 2A and 2B are external front and rear views of the image capture apparatus according to the embodiment, respectively.
Figure 2B:
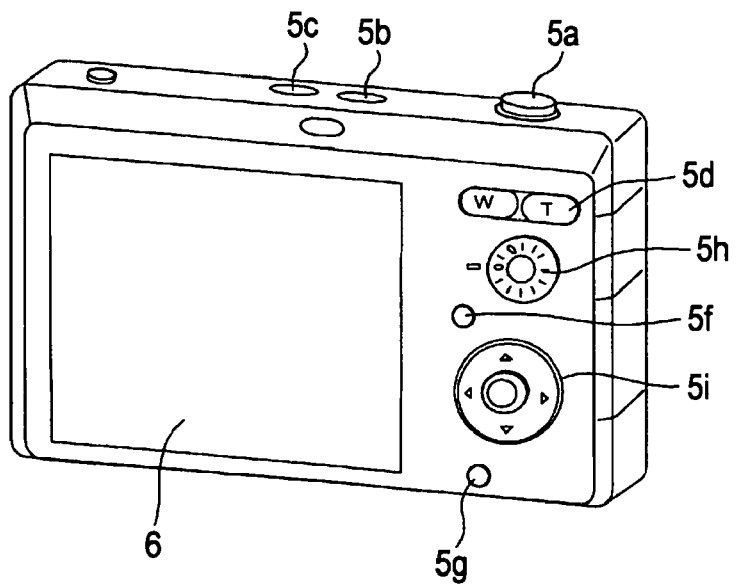

FIGS. 2A and 2B are external front and rear views of an image capture apparatus 1 according to an embodiment of the present invention, respectively. As shown in FIGS. 2A and 2B, the image capture apparatus 1 may be, for example, a digital still camera which a general user who is not an expert usually uses.

The image capture apparatus 1 includes an image capture lens unit 21a and a flash light emitting unit 15 on a front side thereof, and a display panel 6 on a rear side thereof. The display panel 6 may be a liquid crystal panel, an organic electroluminescent (EL) panel, or the like. The image capture apparatus 1 further includes operators at appropriate locations which are used for user operations. For example, operation keys 5a, 5b, 5c, 5d, 5f, and 5g serve as keys for providing various operation functions, including a shutter operation key, a mode operation key, a wide-angle/telephoto operation key, a menu operation key, an exposure correction instruction key, and a playback key. Other operators including a dial operation unit 5h and a cross key 5i are also disposed. The dial operation unit 5h is used for selection or the like of, for example, an image capture mode. The cross key 5i is used for various operations such as selection/setting of an operation menu item displayed on the display panel 6.

An example structure of the image capture apparatus 1 will be described with reference to, for example, FIG. 1.

Figure 1:
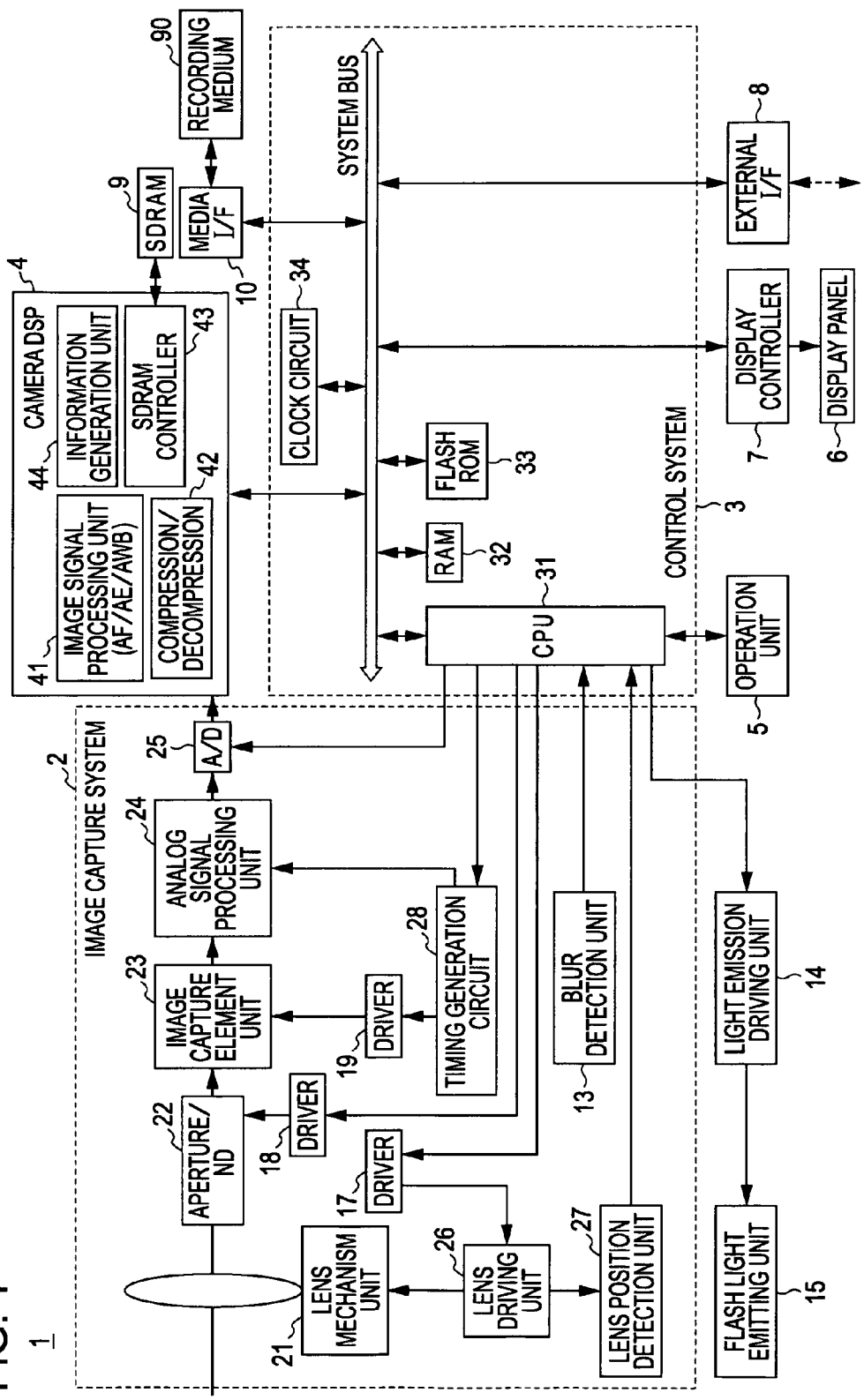
FIG. 1 is a block diagram of an image capture apparatus according to an embodiment of the present invention.

As shown in FIG. 1, the image capture apparatus 1 includes an image capture system 2, a control system 3, a camera digital signal processor (DSP) 4, an operation unit 5, the display panel 6, a display controller 7, an external interface (I/F) 8, a synchronous dynamic random access memory (SDRAM) 9, and a media interface 10.

The image capture system 2 is configured to execute an image capture operation. The image capture system 2 includes a lens mechanism unit 21, an aperture/neutral density (ND) filter mechanism 22, an image capture element unit 23, an analog signal processing unit 24, an analog-to-digital (A/D) conversion unit 25, a lens driving unit 26, a lens position detection unit 27, a timing generation circuit 28, a blur detection unit 13, a light emission driving unit 14, the flash light emitting unit 15, a lens driver 17, an aperture/ND driver 18, and an image capture element driver 19.

Incident light from a subject is directed into the image capture element unit 23 through the lens mechanism unit 21 and the aperture/ND filter mechanism 22.

The lens mechanism unit 21 is incorporated in the image capture lens unit 21 shown in FIG. 2A, and has a plurality of optical lenses including a cover lens, a focus lens, and a zoom lens. The lens driving unit 26 serves as a lens shifting mechanism for shifting the focus lens or zoom lens along an optical axis. When drive power is applied by using the lens driver 17, the lens driving unit 26 shifts the focus lens or zoom lens. The lens driver 17 is controlled by a central processing unit (CPU) 31, which will be described below, to execute focus control or zoom operations.

The aperture/ND filter mechanism 22 includes an aperture mechanism and an ND filter mechanism that is inserted into a lens optical system to attenuate (adjust) the amount of incident light. The aperture/ND filter mechanism 22 is configured to adjust the light intensity.

The aperture/ND driver 18 adjusts the amount of incident light by opening and closing the aperture mechanism. The aperture/ND driver 18 also adjusts the amount of incident light by inserting and removing an ND filter along the optical axis of the incident light. The CPU 31 controls the aperture/ND driver 18 to drive the aperture mechanism or the ND filter to control the amount of incident light (or perform exposure adjustment control).

The light flux coming from the subject is transmitted through the lens mechanism unit 21 and the aperture/ND filter mechanism 22, and a subject image is formed on the image capture element unit 23.

The image capture element unit 23 photoelectrically converts the formed subject image, and outputs a captured image signal corresponding to the subject image.

The image capture element unit 23 has a rectangular image-capture area formed of a plurality of pixels, and sequentially outputs image signals, each of which is an analog signal corresponding to an amount of electric charge accumulated in one of the pixels, to the analog signal processing unit 24 on a pixel-by-pixel basis. The image capture element unit 23 may be implemented by, for example, a charge coupled device (CCD) sensor array, a complementary metal oxide semiconductor (CMOS) sensor array, or the like.

The analog signal processing unit 24 includes internal circuits such as a correlated double sampling (CDS) circuit and an automatic gain control (AGC) circuit. The analog signal processing unit 24 performs a predetermined analog process on the image signal input from the image capture element unit 23.

The A/D conversion unit 25 converts the analog signal processed by the analog signal processing unit 24 into a digital signal, and supplies the digital signal to the camera DSP 4.

The timing generation circuit 28 is controlled by the CPU 31 to control the timings of the operations of the image capture element unit 23, the analog signal processing unit 24, and the A/D conversion unit 25.

Specifically, the timing generation circuit 28 supplies signals for controlling the timing of the image capture operation of the image capture element unit 23 to the image capture element unit 23 through the image capture element driver 19, such as an exposure/electric-charge-read timing signal, a timing signal for providing an electronic shutter function, a transfer clock signal, and a synchronization signal according to a frame rate. The timing generation circuit 28 also supplies the timing signals to the analog signal processing unit 24 so that the analog signal processing unit 24 can perform a process in synchronization with the transfer of an image signal from the image capture element unit 23.

The CPU 31 can control the timing signals generated by the timing generation circuit 28 to change the frame rate for image capture or perform electronic shutter control (intra-frame variable control of exposure time). Further, for example, the CPU 31 can apply a gain control signal to the analog signal processing unit 24 through the timing generation circuit 28 to perform variable gain control of a captured image signal.

The blur detection unit 13 is configured to detect the amount of camera shake. The blur detection unit 13 is formed of, for example, an acceleration sensor, a vibration sensor, or the like, and supplies the detected information to the CPU 31 as the amount of blur.

The flash light emitting unit 15 is driven by the light emission driving unit 14 to emit light. The CPU 31 instructs the light emission driving unit 14 to emit flash light at a predetermined time specified in a user operation or the like so that light can be emitted from the flash light emitting unit 15.

The camera DSP 4 performs various digital signal processes on the captured image signal input from the A/D conversion unit 25 of the image capture system 2.

In the camera DSP 4, for example, as shown in FIG. 1, processing functions such as an image signal processing unit 41, a compression/decompression processing unit 42, an SDRAM controller 43, and an information generation unit 44 are implemented by internal hardware or software.

The image signal processing unit 41 performs a process on the input captured image signal. For example, the image signal processing unit 41 performs arithmetic processing for controlling the driving of the image capture system 2 using the captured image signal, such as autofocus (AF) processing and auto-iris (automatic exposure (AE)) processing, and also performs processing for the input captured image signal itself, such as automatic white balance (AWB) processing.

For example, in the autofocus processing, the image signal processing unit 41 performs contrast detection of the input captured image signal, and sends the detected information to the CPU 31. Various control techniques are available as autofocus control methods. In a technique called contrast AF, contrast detection of the captured image signal is performed at each time point with the focus lens forcibly moved, and a position of the focus lens in an optimum contrast state is determined. Specifically, prior to the image capture operation, the CPU 31 performs control so as to check the contrast detection value detected by the image signal processing unit 41 while controlling the movement of the focus lens and to set a position at an optimum contrast state as an optimum focus position.

During image capture, the CPU 31 can perform focus control using a detection method called wobbling AF. During the image capture operation, the CPU 31 checks the contrast detection value detected by the image signal processing unit 41 while causing the focus lens to slightly move back and forth constantly. Although the optimum position of the focus lens may vary depending on the situation of the subject, contrast detection is performed by slightly displacing the focus lens back and forth, thereby determining changes in a focus control direction in accordance with changes of the subject. Accordingly, autofocus can be executed in accordance with subject conditions.

Note that the lens shifting mechanism in the lens driving unit 26 is assigned addresses for individual shift positions, and a lens position is identified using the addresses of the shift positions.

The lens position detection unit 27 identifies the address of the current lens position of the focus lens to calculate the distance to an in-focus subject, and supplies distance information regarding the calculated distance to the CPU 31. Therefore, the CPU 31 can determine the distance to the main subject that is in focus.

In the auto-iris processing performed by the image signal processing unit 41 of the camera DSP 4, for example, the subject brightness is calculated. For example, the average brightness of the input captured image signal is calculated and subject brightness information, or exposure information, regarding the calculated average brightness is supplied to the CPU 31. The average brightness can be calculated using various methods such as calculating an average value of brightness signals of all pixels of one frame of captured image data or calculating an average value of brightness signals when a weight is assigned to a center portion of an image.

The CPU 31 can perform automatic exposure control based on the exposure information. Specifically, exposure adjustment is performed using the aperture mechanism, the ND filter, electronic shutter control in the image capture element unit 23, or gain control for the analog signal processing unit 24.

The image signal processing unit 41 of the camera DSP 4 performs, in addition to the process for generating the signals used for the autofocus operation and auto-iris operation, signal processes on the captured image signal itself such as automatic white balance, gamma ($\square$) correction, edge enhancement, and camera-shake correction.

The compression/decompression processing unit 42 in the camera DSP 4 performs a compression process on the captured image signal or a decompression process on compressed image data. For example, the compression/decompression processing unit 42 performs a compression process/decompression process according to a technique such as a Joint Photographic Experts Group (JPEG) or Moving Picture Experts Group (MPEG) technique.

The SDRAM controller 43 performs writing/reading on the SDRAM 9. The SDRAM 9 is used to, for example, temporarily store the captured image signal input from the image capture system 2, store data or reserve a work area in the process performed by the image signal processing unit 41 or the compression/decompression processing unit 42, or store information obtained by the information generation unit 44. The SDRAM controller 43 performs writing/reading of such data on the SDRAM 9.

The information generation unit 44 generates information used for various operations in a combination process described below. For example, the information generation unit 44 generates distance distribution information indicating the distances to subjects in a captured image signal screen. The distance distribution information may be, for example, information regarding the distances to subjects in units of pixels as well as the distance to the main subject. The information is also called a depth map.

The determination of pixel-based distance information for generating distance distribution information can be executed by analyzing the amount of blur during the wobbling AF described above or the like. Alternatively, a light emitting unit (not shown) configured to emit auxiliary light having a specific wavelength of non-visible light may be provided and a period of time during which the light of the specific wavelength returns after it has been emitted may be measured to determine the distance to a subject on a pixel-by-pixel basis.

The control system 3 includes the CPU 31, a random access memory (RAM) 32, a flash read-only memory (ROM) 33, and a clock circuit 34. Each unit in the control system 3, each unit in the camera DSP 4, each unit in the image capture system 2, the display controller 7, the external interface 8, and the media interface 10 are configured to communicate image data or control information with one another via a system bus.

The CPU 31 controls the overall operation of the image capture apparatus 1. Specifically, the CPU 31 performs various arithmetic processes or exchanges control signals or the like with the corresponding units according to a program stored in an internal ROM or the like and according to a user operation using the operation unit 5 to cause the units to execute necessary operations. The CPU 31 also performs further processes for image combination described below such as arithmetic processing and image analysis processing.

The RAM 32 temporarily stores the captured image signal (image data of each frame) processed by the camera DSP 4, or stores image data used for a combination process described below and other information corresponding to various processes of the CPU 31.

The flash ROM 33 is used to store image data representing a captured image (which has been captured by a user as a still image or a moving image) or other information to be saved in a non-volatile fashion. The flash ROM 33 may also be used to store a software program for controlling the image capture apparatus 1, camera setting data, or the like. The flash ROM 33 is also used to store coefficient templates used for a combination process described below.

The clock circuit 34 performs time counting to determine current time information (year, month, day, hour, minute, and second).

The operation unit 5 includes the operators shown in FIGS. 2A and 2B and a signal generation unit for generating signals according to the operations of the operators. User operation information based on the operators is transmitted from the operation unit 5 to the CPU 31.

The operation unit 5 may be configured to allow touch panel operations as well as operations using the operators. Specifically, the display panel 6 may be provided with a touch sensor so that an operation input can be performed in response to a touch of the screen by the user.

The display controller 7 causes the display panel 6 to execute a necessary display operation under the control of the CPU 31. Examples of display operations on the display panel 6 may include display of a monitor (so-called Live View Display or display of a moving-image/still-image capturing monitor), display of a playback image read from the recording medium 90 or the flash ROM 33, display of an operation menu, display of various icons, display of time and date, and display regarding a combination process described below.

The media interface 10 performs reading/writing of data on the recording medium 90, such as a memory card (a card-shaped removable memory) placed in the image capture apparatus 1, under the control of the CPU 31. For example, the media interface 10 performs an operation of recording still-image data or moving-image data obtained as a result of image capture onto the recording medium 90. The media interface 10 further performs an operation of reading image data used for a combination process described below from the recording medium 90.

While the recording medium 90 is implemented as a portable memory card by way of example, the recording medium 90 may be any other recording medium for recording image data of a still image or a moving image to be saved as a result of image capture. For example, a portable disk medium such as an optical disk may be used, or a hard disk drive (HDD) may be incorporated and used for recording.

The external interface 8 sends and receives various data to and from an external device via a predetermined cable according to a signal standard such as the universal serial bus (USB) standard. The external interface 8 may be an external interface complying with a standard other than the USB standard, such as the Institute of Electrical and Electronics Engineers (IEEE) 1394 standard.

In place of a wired transmission interface, the external interface 8 may be a wireless transmission interface such as an infrared transmission interface or a near field communication interface.

The image capture apparatus 1 is configured to send and receive data to and from a personal computer or other various devices via the external interface 8. For example, the image capture apparatus 1 can transfer captured image data or image data obtained as a result of the combination process to an external device.

Figure 3:
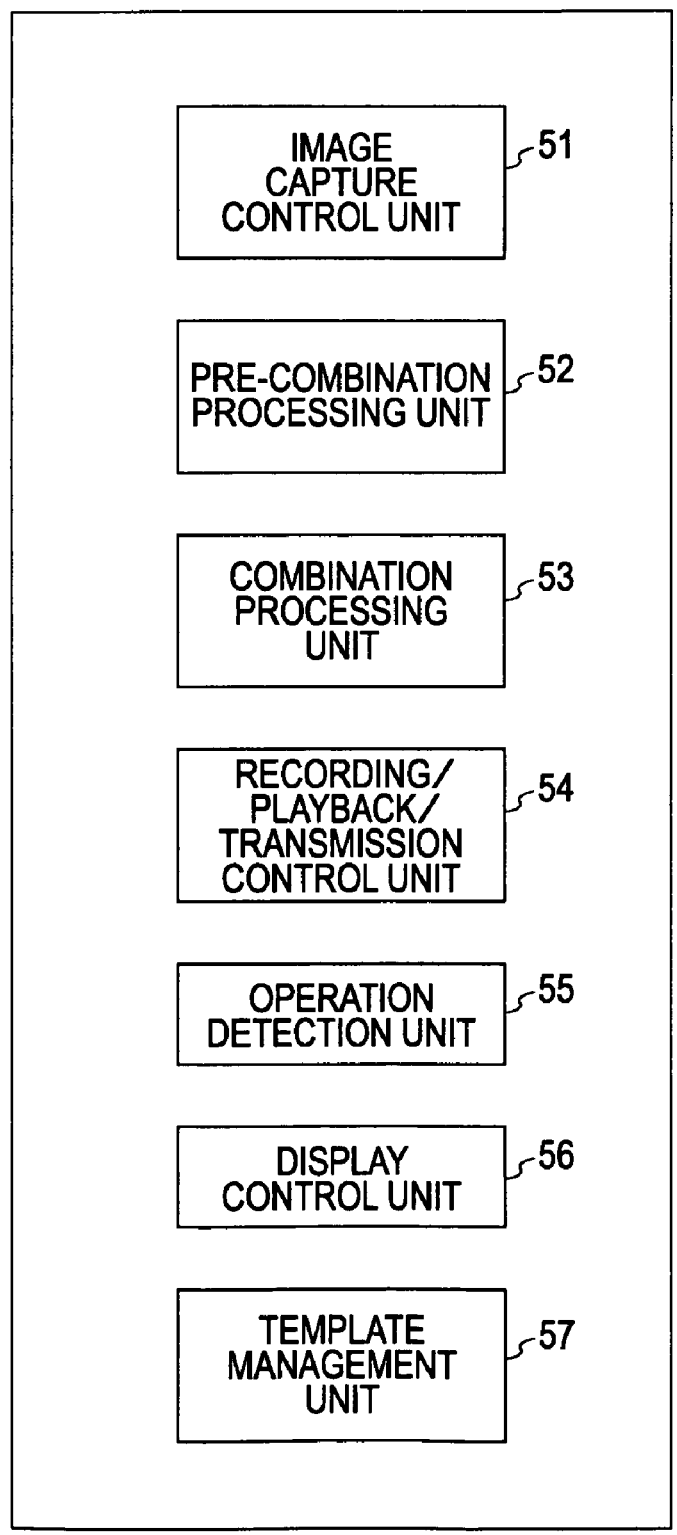
FIG. 3 is a block diagram showing a functional structure of a central processing unit (CPU) in the image capture apparatus according to the embodiment.

In the image capture apparatus 1 of the present embodiment, the CPU 31 executes image capture operation control or arithmetic processing and control for various operations described below according to a program stored therein. FIG. 3 shows operation functions implemented by the arithmetic processing of the CPU 31. Specifically, an image capture control unit 51, a pre-combination processing unit 52, a combination processing unit 53, a recording/playback/transmission control unit 54, an operation detection unit 55, a display control unit 56, and a template management unit 57 are formed as software function blocks.

The image capture control unit 51 performs image capture operation control. Specifically, the image capture control unit 51 controls each unit in the image capture system 2 or the camera DSP 4 to capture a subject image. The image capture control unit 51 performs other processes such as an autofocus process, an automatic exposure adjustment process, and a flash light emission control process.

The pre-combination processing unit 52 may perform a pre-combination process so that a plurality of frames of image data having continuity in time that are used for a combination process described below are used as image data to be combined (hereinafter referred to as "combination-use image data") For example, the pre-combination processing unit 52 may obtain a plurality of frames of image data having continuity in time that are recorded on the recording medium 90, and use the obtained frames of image data as combination-use image data. The term "a plurality of frames of image data having continuity in time" means a plurality of consecutive or intermittent frames of image data that can be extracted from a plurality of frames obtained by a series of temporally consecutive image capture actions. The pre-combination processing unit 52 may obtain a sequence of image data supplied from an external device as a target for the combination process.

The pre-combination processing unit 52 may further perform a brightness adjustment process on image data of each of the plurality of frames of image data having continuity in time used as combination-use image data. The brightness adjustment process may be a process of equalizing average brightness levels of image data of all or some of the frames of image data used as the combination-use image data. In particular, frames of image data captured without using a flash can be extracted from among the plurality of frames of image data used as the combination-use image data, and the average brightness levels of the extracted image data can be equalized.

The combination processing unit 53 may perform a combination process on the combination-use image data obtained in the pre-combination process by the pre-combination processing unit 52 according to the operation input information so as to generate combined-image data representing a still image.

For example, the combination processing unit 53 may perform a combination process on combination-use image data of frames in a range on a time axis specified by the operation input information among the combination-use image data having continuity in time so as to generate combined-image data representing a still image.

Further, the combination processing unit 53 may perform a combination process on combination-use image data of each of the plurality of frames using a weighting coefficient specified by the operation input information so as to be generate combined-image data representing a still image.

The combination processing unit 53 may further perform a combination process on combination-use image data of a plurality of frames using weighted averages so as to generate combined-image data representing a still image.

In addition to the processes described above, the combination processing unit 53 may perform arithmetic operations for various combination processes described below.

The recording/playback/transmission control unit 54 instructs the media interface 10 to control reading from the recording medium 90 or writing into the recording medium 90. For example, the recording/playback/transmission control unit 54 may instruct the media interface 10 that a plurality of frames of image data having continuity in time that are recorded on the recording medium 90 be read so as to be obtained by the pre-combination processing unit 52.

The recording/playback/transmission control unit 54 may further perform a process of recording the combined-image data generated by the combination processing unit 53 onto the recording medium 90 or sending the combined-image data to an external device via the external interface 8.

The operation detection unit 55 detects operation input information provided by the user. Specifically, the operation detection unit 55 detects input information from the operation unit 5. Based on the operation input information detected by the operation detection unit 55, the image capture operation control in the image capture control unit 51, the pre-combination process in the pre-combination processing unit 52, the combination process in the combination processing unit 53, and the control process in the recording/playback/transmission control unit 54 are executed.

The display control unit 56 instructs the display controller 7 to execute necessary display on the display panel 6. For example, monitor display during image capture or display of a playback image is executed.

In the combination process of the combination processing unit 53, the display control unit 56 generates and outputs combination-work image data to the display controller 7 to display a combination-work image on the display panel 6.

The combination-work image data may be display data including a playback moving image including the combination-use image data of the plurality of frames obtained in the pre-combination process, an image used to specify a range on a time axis, the range being a range of combination-use image data used in a combination process among the combination-use image data of the plurality of frames, an image including representations of weighting coefficients each assigned to combination-use image data of one of a plurality of frames, and a combined image generated in a combination process performed using combination-use image data of a plurality of frames (such as a preview image obtained as a result of the combination process). When a given combination process is performed, the display control unit 56 can further generate the combination-work image data so as to include both images obtained before and after the given combination process, and can output the generated combination-work image data to the display controller 7 to display the corresponding image on the display panel 6.

The display control unit 56 can further output combined-image data finally generated in the combination process to the display controller 7 as image data for display, and can display the corresponding image on the display panel 6.

The template management unit 57 is configured to manage coefficient templates that are prepared to simplify user operations in the combination process and to select a coefficient template.

As described below, a weighting coefficient can be assigned to each of a plurality of frames of image data to be combined. For example, weighting coefficient patterns for achieving image effects such as the first-curtain synchronization effect, second-curtain synchronization effect, and multi-flash effect are created as templates which are stored in, for example, the flash ROM 33 or the like. In a case such as when the operation detection unit 55 detects a user operation or when an image for selection from the templates is displayed by using the display control unit 56, the template management unit 57 performs a process of selecting a coefficient template according to the user operation and sending the selected coefficient template to the combination processing unit 53 so that the selected coefficient template can be used in the combination process.

2. Operation Mode

Figure 4:
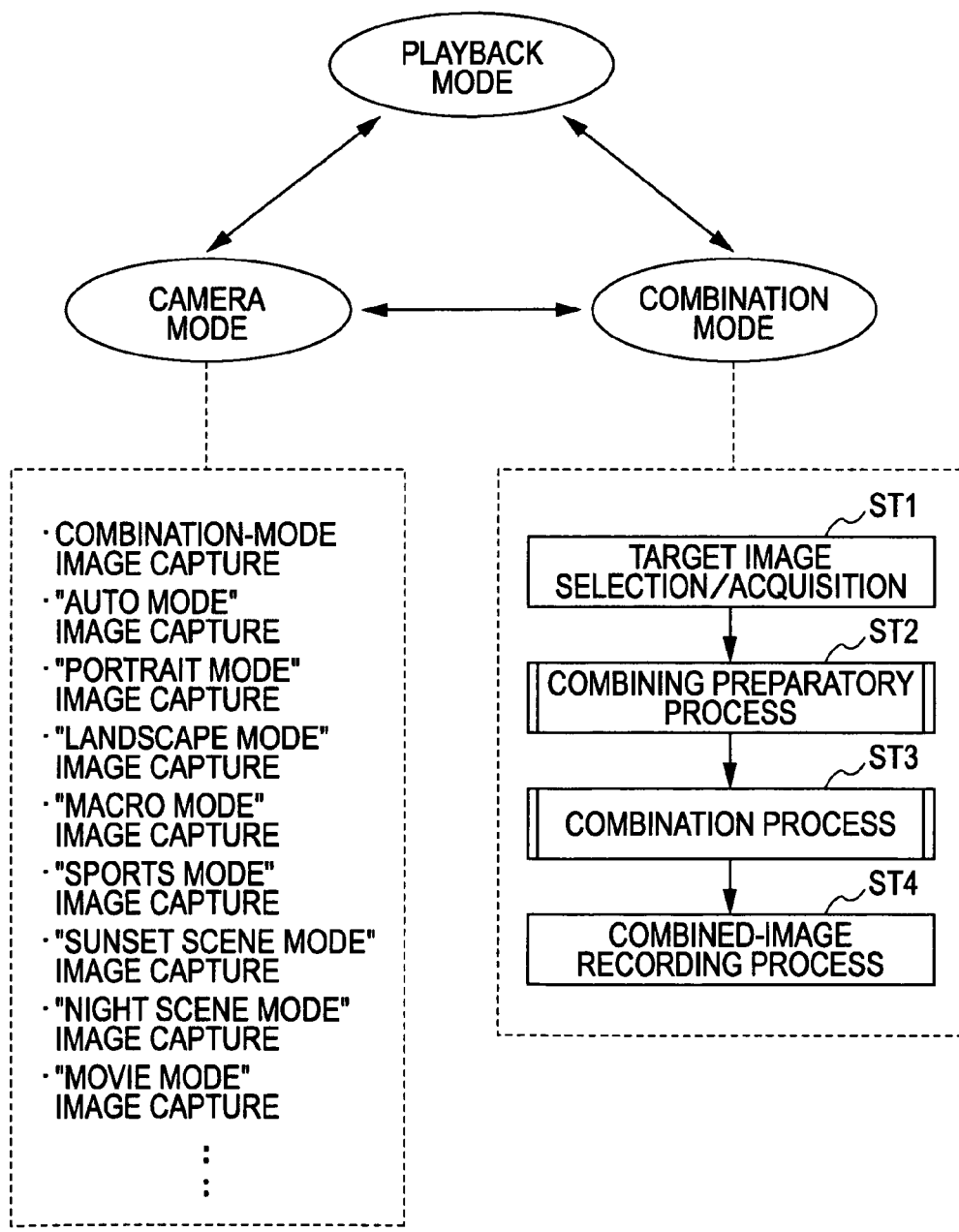
FIG. 4 is a diagram showing a mode operation of the image capture apparatus according to the embodiment.

FIG. 4 shows operation modes of the image capture apparatus 1 of the present embodiment. In the image capture apparatus 1 of the present embodiment, the operation mode is changed to a camera mode, a playback mode, and a combination mode in accordance with a user operation. In practice, other modes such as a communication mode that allows for communication with an external device may be provided, which are omitted for simplicity of illustration.

The camera mode is a mode in which the image capture system 2 performs image capture. That is, the camera mode is an operation mode in which a user normally captures images using a camera. In the camera mode, a variety of image capture modes as shown in FIG. 4 are available.

Combination-mode image capture is an image capture mode in which an image used for a combination process described below is captured, which is a characteristic operation of the present embodiment. A plurality of frames having continuity in time are captured, and the plurality of frames of image data are recorded onto the recording medium 90.

In the following description, image data obtained as a result of image capture is stored onto the recording medium 90 in the image capture operation. The image data may be stored in the flash ROM 33 instead of the recording medium 90. Another operation method in which the image data is normally recorded onto the recording medium 90 and is recorded onto the flash ROM 33 when the recording medium 90 is not placed may be used.

An auto mode is an image capture mode in which the optimum settings such as the aperture value, shutter speed, and International Organization for Standardization (ISO) sensitivity are automatically performed using the image capture apparatus 1.

A portrait mode is an image capture mode in which image capture is performed with settings optimal for providing shots of people.

A landscape mode is an image capture mode in which image capture is performed with settings optimal for providing shots of landscapes.

A macro mode is an image capture mode in which image capture is performed with settings optimal for providing shots of subjects closer to the camera than normal. A special macro mode, namely, a nature macro mode for providing sharp and vivid macro shots of flowers and insects, may be provided.

A sports mode is an image capture mode in which image capture is performed with settings optimal for providing shots of actions.

A sunset scene mode is an image capture mode in which image capture is performed with settings optimal for providing shots of sunset scenes.

A night scene mode is an image capture mode in which image capture is performed with settings optimal for providing shots of night scenes.

A movie mode is an image capture mode in which a moving image is captured.

Other modes, such as a night portrait mode suitable for providing shots of people in night scenes and a firework mode suitable for providing shots of fireworks, may be provided.

After setting the camera mode, the user selects a desired image capture mode from among the image capture modes described above, thereby performing an image capture operation to obtain a captured image suitable for the subject type or condition.

In order to obtain an image with a special effect such as the long-time exposure effect, first-curtain synchronization effect, second-curtain synchronization effect, or multi-flash effect described below, the user executes the combination-mode image capture to create an image with a desired effect in a subsequent combination process.

In the camera mode, the image capture control unit 51, the operation detection unit 55, the display control unit 56, and the recording/playback/transmission control unit 54 in the CPU 31 cooperate with each other to control the image capture system 2, and control the recording operation and the display operation to capture an image, display an image of captured image data, and record the captured image data.

The playback mode is an operation mode in which an image captured and recorded on the recording medium 90 or the flash ROM 33 is played back.

In accordance with a user operation, the CPU 31 performs control to read an image recorded on the recording medium 90 or the flash ROM 33 and to play back and display the image on the display panel 6.

In the playback mode, the operation detection unit 55, the display control unit 56, and the recording/playback/transmission control unit 54 in the CPU 31 cooperate with each other to control the playback operation and the display operation to execute the display or the like of the image data.

The combination mode is an operation mode in which a plurality of frames of image data having continuity in time are used as combination-use image data to perform a combination process. The CPU 31 advances the combination process in accordance with a user operation.

In the combination mode, in steps ST1 and ST2, the CPU 31 performs a pre-combination process. First, in step ST1, the CPU 31 performs a target image selection/acquisition process. For example, a sequence of image data having continuity in time captured in the combination-mode image capture and recorded on the recording medium 90 is selected and acquired as combination-use image data used in a combination process.

In step ST2, the CPU 31 performs a combining preparatory process. As described below, the combining preparatory process is a process for performing, for example, brightness adjustment (exposure adjustment) of the acquired sequence of image data and equalizing the brightness states of the image data elements of the sequence of image data so that the image data elements become in a state suitable for the combination process.

After the pre-combination process in steps ST1 and ST2 has been completed, in step ST3, the CPU 31 performs a combination process. In this case, the CPU 31 advances the combination process using a sequence of combination-use image data in accordance with a user operation. This combination process will also be described in detail below.

When combined-image data as a final result of combination is generated using the combination process, in step ST4, the CPU 31 performs a combined-image recording process.

Specifically, the CPU 31 records the combined-image data generated using the combination process onto the recording medium 90 through the media interface 10. Alternatively, the combined-image data may be recorded onto the flash ROM 33. Thus, thereafter, the user can play back the combined image as desired.

The CPU 31 may also send the combined-image data to an external device connected to the external interface 8. Thus, for example, the combined-image data can be recorded onto a predetermined recording medium or the corresponding image can be displayed and output using the external device.

In the combination mode, in steps ST1 and ST2, the pre-combination processing unit 52, the operation detection unit 55, the display control unit 56, and the recording/playback/transmission control unit 54 in the CPU 31 cooperate with each other to perform a necessary processing operation.

In step ST3, the combination processing unit 53, the operation detection unit 55, and the display control unit 56 in the CPU 31 cooperate with each other to perform a necessary processing operation. In a case where coefficient templates are used, the template management unit 57 works.

In step ST4, the combination processing unit 53, the operation detection unit 55, the display control unit 56, and the recording/playback/transmission control unit 54 in the CPU 31 cooperate with each other to perform a necessary processing operation.

3. Camera-Mode Processes

First, the processes of the CPU 31 in the camera mode will be described with reference to FIG. 5.

In steps F10, F11, and F12, the CPU 31 monitors a user operation.

In step F10, the CPU 31 monitors the operation of the image capture mode. As described above, a variety of modes such as the combination mode, the auto mode, and the portrait mode are available as image capture modes, and the user can select a desired image capture mode according to the image capture purpose. A mode may be selected by, for example, operating the dial operation unit 5h shown in FIG. 2B or selecting a mode in the menu display on the display panel 6.

When the user selects an image capture mode, the CPU 31 proceeds to step F13 and performs operation settings according to the selected image capture mode. For example, the CPU 31 controls each unit in the image capture system 2 to determine settings such as the exposure amount, the exposure method, the electronic shutter setting, the frame rate, and the gain. In particular, when the combination-mode image capture is selected, the setting of continuous image capture is also performed.

In step F11, the CPU 31 monitors a shutter operation performed by the user. When a shutter operation performed by the user is detected, in step F14, the CPU 31 causes the process to branch depending on whether or not the current image capture mode is the combination-mode image capture.

If the current image capture mode is other than the combination-mode image capture, in step F16, an image capture process is performed. Specifically, the CPU 31 controls the camera DSP 4, the media interface 10, and any other suitable unit so that an image of one frame obtained at the time of the shutter operation is stored as captured image data, namely, still-image data.

The combination-mode image capture is an image capture mode for obtaining image data used for a later combination process. When a shutter operation is performed in the combination-mode image capture, the CPU 31 proceeds to step F15 and executes a continuous image capture process as combination-mode image capture. The continuous image capture process may be a movie-like capture operation in which each of frames consecutively obtained by the image capture system 2 is stored as image data onto the recording medium 90 or the like. Depending on the setting of the frame rate, for example, intermittent frames such as every other frame may be stored. The captured image data is stored as a large number of still images or a moving image.

While, in step F15, frames are consecutively stored as captured image data, image capture may be executed for a period of time as follows by way of example:

(1) Frames of image data for a period from when the user performs a shutter operation to when the user performs a second shutter operation are stored as captured images.

(2) Frames of image data for a period from when the user performs a shutter operation to when the time counted by the CPU 31 has reached a preset timer value are stored as captured images. The preset timer value may be fixed or selected by the user.

(3) Frames of image data for a period during which the user continues a shutter operation (continues to press the shutter release button) are stored as captured images. When the user releases the shutter release button, the image capture ends.

By performing the combination-mode image capture in step F15, a plurality of frames of image data having continuity in time are captured and stored.

The plurality of frames of image data are stored in association with each other so as to be identified as a sequence of image data having continuity in time.

For example, the image data of each frame may be assigned a serial number and may be recorded, and management information regarding a range including the serial numbers may be added. Alternatively, the image data of the frames may be associated with each other by adding metadata indicating image data obtained by the series of image capture actions.

Such association may not necessarily be performed during image capture. In a combination process described below, image data of frames consecutive in order image-capture time may be extracted to read the image data of the consecutive frames. Time and date information obtained in the time counting by the clock circuit 34 is added to image data of each frame to be captured and recorded. Thus, such association in the reading operation can also be performed.

Further, metadata is added to image data of each frame to be captured. The metadata may be information regarding emission of flash light from the flash light emitting unit 15. The flash light emission is controlled by the CPU 31 according to a user operation, a setting, or the like.

Information obtained in the image capture operation may also be added as metadata to image data of each frame, such as information regarding the distance to the main subject, which is measured by the lens position detection unit 27, and the distance distribution information generated by the information generation unit 44.

The user can perform various operations other than the image-capture-mode operations and the shutter operation. If any of such other operations is detected in step F12, the CPU 31 proceeds to step F17 and executes a process corresponding to the detected operation. For example, when the operation of changing the mode to the playback mode or the combination mode is performed, a mode change process is performed. The CPU 31 performs necessary processes according to various operations, such as various settings for image capture, for example, the manual setting of the exposure amount, the zoom operation, the manual focus setting, and the setting of use of flash/non-use of flash/automatic lighting.

Figure 5:
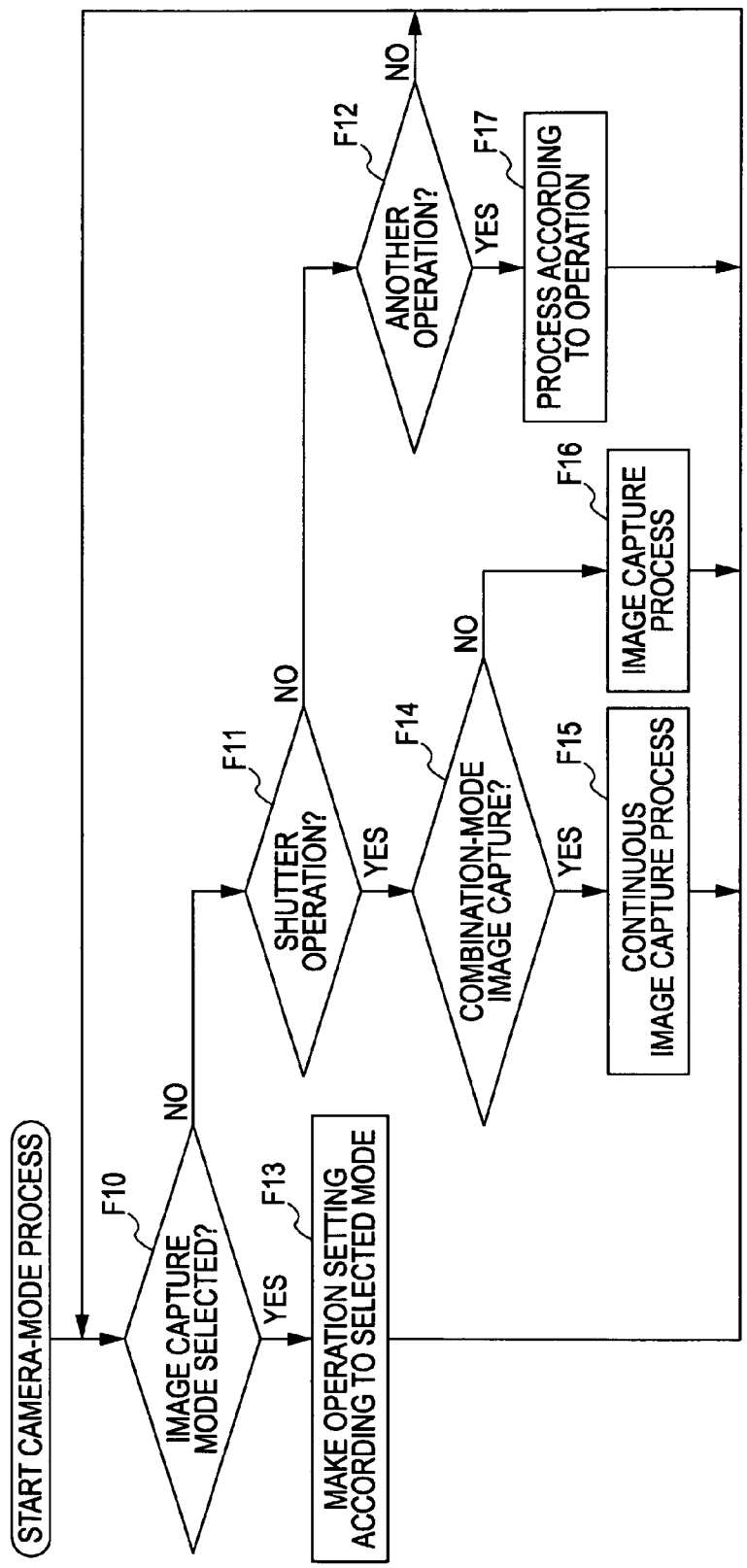
FIG. 5 is a flowchart showing a camera-mode process of the image capture apparatus according to the embodiment.

In the camera mode, image capture is performed in various image capture modes according to the process shown in FIG. 5 described above, and captured image data is stored on the recording medium 90.

Figure 6:
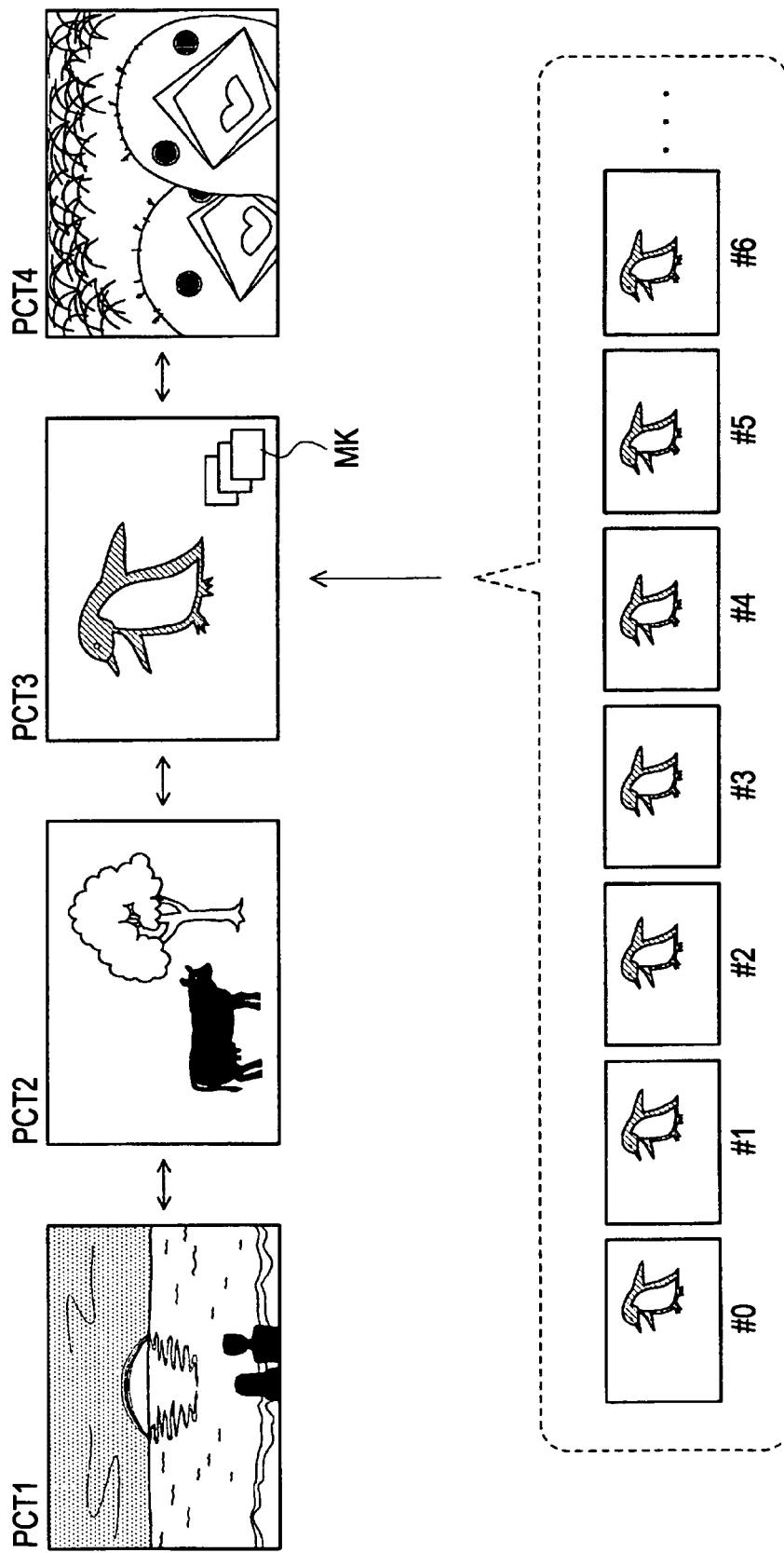
FIG. 6 is a diagram showing an image captured using the image capture apparatus according to the embodiment.

FIG. 6 shows an example in which various types of image data stored on the recording medium 90 are played back and displayed as images. Together with image data of images PCT1, PCT2, and PCT4 captured in the normal image capture modes (such as the auto mode and the portrait mode), an image data set captured in the combination-mode image capture selected by the user, such as image data of an image PCT3, is stored on the recording medium 90. The user performs an operation in the playback mode to play back and display the corresponding images on the display panel 6 for confirmation.

The image data of the image PCT3 captured in the combination-mode image capture is a group of image data elements associated as having continuity in time, as indicated by, for example, image data elements #0, #1, and #2.

When the user plays back and views the captured images in the playback mode, the image data of the images PCT1, PCT2, PCT3, PCT4, etc., are sequentially played back. For the image data of the image PCT3 obtained in the combination-mode image capture, a representative image among the actually recorded image data elements #0, #1, #2, etc., may be played back and displayed. For example, the top image data element #0 may be displayed.

Furthermore, in order to help the user understand that a large number of image data elements (#0, #1, #2, etc.) are actually stored in the combination-mode image capture, as shown in FIG. 6, a mark MK indicating image data captured in the combination-mode image capture is displayed on a display screen during playback.

The user can use the mark MK to understand that the image data of the image PCT3 actually includes a large number of temporally consecutive images which can be used for a combination process.

That is, after performing combination-mode image capture, the user plays back images and selects an image with the mark MK to perform a combination work as an operation in a combination mode described below.

4. Combination-Mode Process 4-1: Combining Preparatory Process

A process performed in the combination mode will now be described.

As described above with reference to FIG. 4, in the combination mode, the CPU 31 performs the target image selection/acquisition process (ST1), the combining preparatory process (ST2), the combination process (ST3), and the combined-image recording process (ST4).

The target image selection/acquisition process (ST1) and the combining preparatory process (ST2) are pre-combination processes prior to an actual combination process. First, the CPU 31 (pre-combination processing unit 52) captures combination-use image data in the target image selection/acquisition process (ST1).

For example, as shown in FIG. 6, when a user performs the operation of playing back captured images, selecting an image captured in the combination-mode image capture (for example, the image PCT3 shown in FIG. 6), and instructing a combination process, the CPU 31 starts the process in the combination mode. In this case, the CPU 31 captures the image selected by the user operation as combination-use image data. Specifically, when the image PCT3 shown in FIG. 6 is selected, the CPU 31 reads the sequence of image data elements #0, #1, #2, etc., as having continuity in time, which are associated with the image PCT3, from the recording medium 90, and acquires them as combination-use image data. Then, the image data elements #0, #1, #2, etc., are set as image data to be combined.

In the combining preparatory process (ST2), a brightness adjustment process is performed on the captured combination-use image data (image data elements #0, #1, #2, etc). In this process, the exposure amounts (screen intensities) of the image data elements #0, #1, #2, etc., are equalized.

Figure 7:
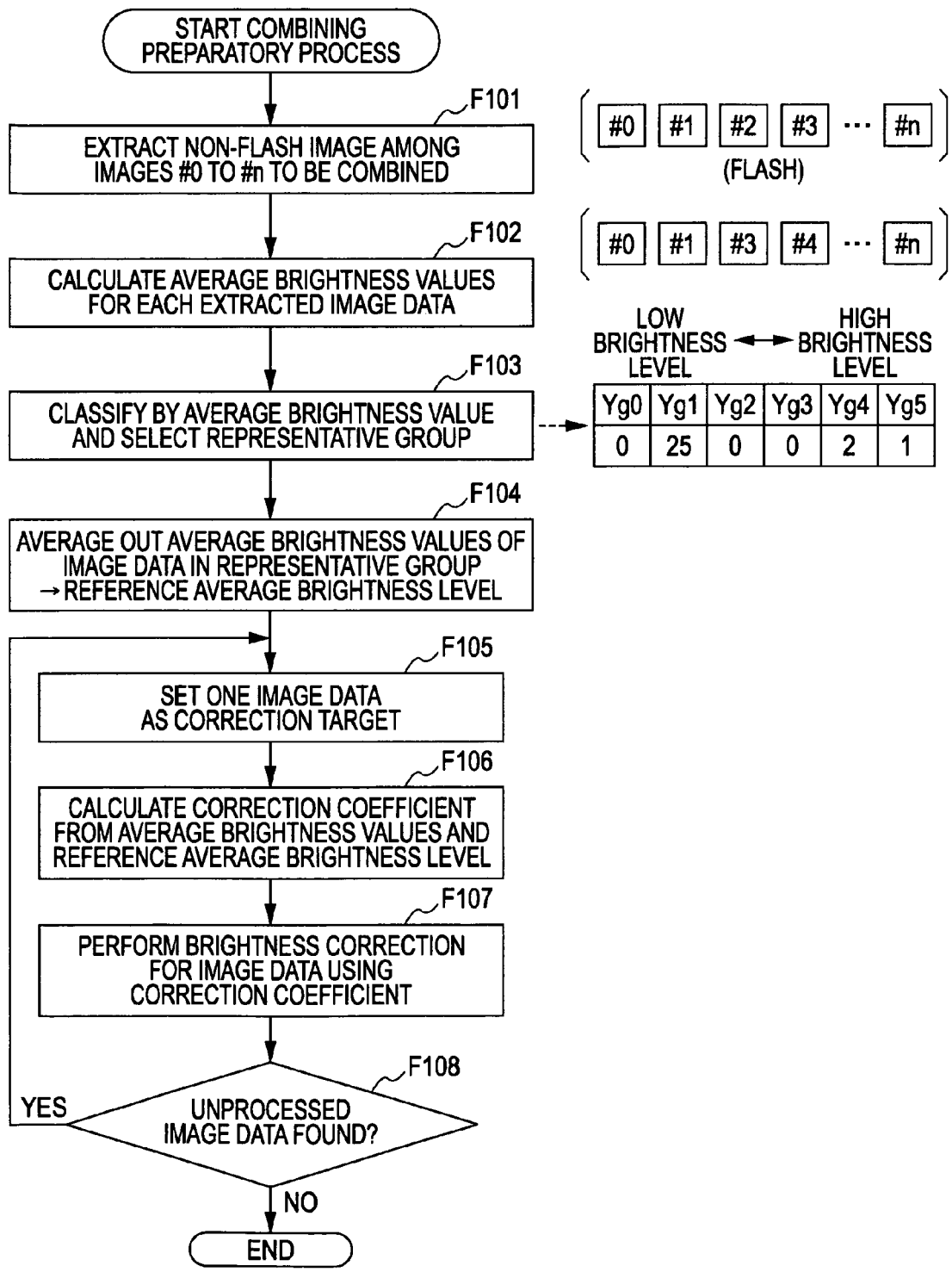
FIG. 7 is a flowchart showing a combining preparatory process according to the embodiment.

In this case, for example, the CPU 31 (pre-combination processing unit 52) performs a process shown in FIG. 7.

First, in step F101, the CPU 31 extracts a non-flash image from the image data elements #0, #1, #2, . . . , #n captured as targets for combination. The non-flash image is image data that has been captured without using a flash. As described above, since information regarding emission of flash light during the image capture is added as metadata to image data, the CPU 31 can extract a non-flash image by checking metadata of the captured image data elements #0, #1, #2, . . . , #n.

Note that the non-flash image is based on information as to whether or not the device that has performed the image capture (i.e., the image capture apparatus 1) has performed the image capture using a flash (hereinafter referred to as "self-flashing image capture"), and does not include an image caused by the screen intensity that suddenly becomes as high as that in the flash light emission state.

For example, an image of a subject which is illuminated with flash light by another photographer or illuminated by the headlight of a vehicle passing by during the image capture is not an image obtained using self-flashing image capture and is handled as a non-flash image.

If, as shown in FIG. 7, among image data elements #0, #1, . . . ,•#n, self-flashing image capture is performed at the time of the image data elements #2 (that is, if a flash light emission indication is given as metadata of the image data element #2), the image data elements #0, #1, #3, . . . , #n, except for the image data element #2, are extracted.

Then, in step F102, the CPU 31 calculates average brightness values for the extracted image data elements (for example, the image data elements #0, #1, #3, . . . , #n).

In this case, an average value of brightness signal values of all pixels may be calculated for each image data element, or weighting may be performed on each area within the screen and a weighted average brightness value may be calculated. In this case, an average brightness value for each image data element may be calculated using a technique similar to that for calculating a brightness level for the so-called automatic exposure adjustment.

In step F103, the CPU 31 classifies the image data elements by average brightness value, and selects a representative group. For example, as shown in FIG. 7, groups Yg0, Yg1, . . . , Yg5 are set in steps of brightness levels, starting from the low-brightness level side to the high-brightness level side, and the image data elements are classified into the groups depending on the average brightness value. For example, in FIG. 7, it is assumed that 28 image data elements are present as extracted image data elements #0, #1, #3, . . . , #n and that 25 image data elements are classified as the group Yg1, two image data elements as the group Yg4, and one image data element as the group Yg5. A representative group is selected based on the result of the classification. The group Yg1 is used as a representative group, by way of example.

A sequence of combination-use image data is a plurality of frames of image data consecutive in time, and is continuously captured during image capture in step F15 shown in FIG. 5. Thus, no extreme difference in brightness level generally occurs. Hence, frames of image data obtained without using self-flashing image capture are generally classified as the same group. However, in some cases, the subject brightness level may suddenly largely change during continuous image capture because of accidental reasons such as the firing of a flash by another photographer, instantaneous illumination of the subject using the headlight of a vehicle passing by, and beams of light that suddenly break through the clouds. As a result of the classification shown in FIG. 7, the images classified as the groups Yg4 and Yg5 are considered as images obtained due to such instantaneous change in exposure amount due to the reasons described above.

If such images having a large difference in subject brightness level are included, only the images may be highlighted or the like in the combination process, which may fail to implement combination as desired.

Thus, the brightness adjustment is performed for each image data element in step F104 and the subsequent steps.

First, in step F104, the CPU 31 calculates an average value of average brightness values of image data elements included in the representative group (Yg1). The calculated average value is set as a reference average brightness level.

In step F105, the CPU 31 selects one (for example, the image data element #0) of the image data elements #0, #1, #3, . . . , #n corresponding to the non-flash images extracted in step F101 as a target for correction. In step F106, the CPU 31 determines the ratio of the average brightness value of the image data element #0 selected as the target to the reference average brightness level, and calculates a correction coefficient according to the ratio.

Then, in step F107, the CPU 31 multiplies the brightness values of all pixels of the image data element #0 by the correction coefficient to perform brightness correction of the image data element #0.

In step F108, if an unprocessed image data element remains, the CPU 31 returns to step F105 and performs similar processing on a next image data element (for example, the image data element #1).

Specifically, in steps F105, F106, and F107, the brightness correction is sequentially performed on all the image data elements extracted as non-flash images. When the process is completed for all the image data elements, the process shown in FIG. 7 ends.

According to the combining preparatory process shown in FIG. 7, the brightness levels of all image data elements extracted as non-flash images acquired as combination-use image data are equalized to produce image data suitable for a combination process described below.

In this embodiment, no correction is performed on an image obtained using self-flashing image capture because the self-flashing image capture has been intentionally performed by the photographer of the image.

In some cases, all combination-use image data may be corrected to equalize the brightness levels regardless of flashlight emission.

In other cases, if a plurality of frames of image data captured using a flash are included, the plurality of frames of flash image data may be corrected to equalize the brightness levels.

4-2: Combination Process

The combination process in step ST3 shown in FIG. 4 will now be described. In the combination process of the present embodiment, image processing is performed so that, instead of simply adding the values of corresponding pixels of a plurality of frames of image data, the values of the corresponding pixels are averaged (or weighted) before a combined image is generated.

Figure 8:
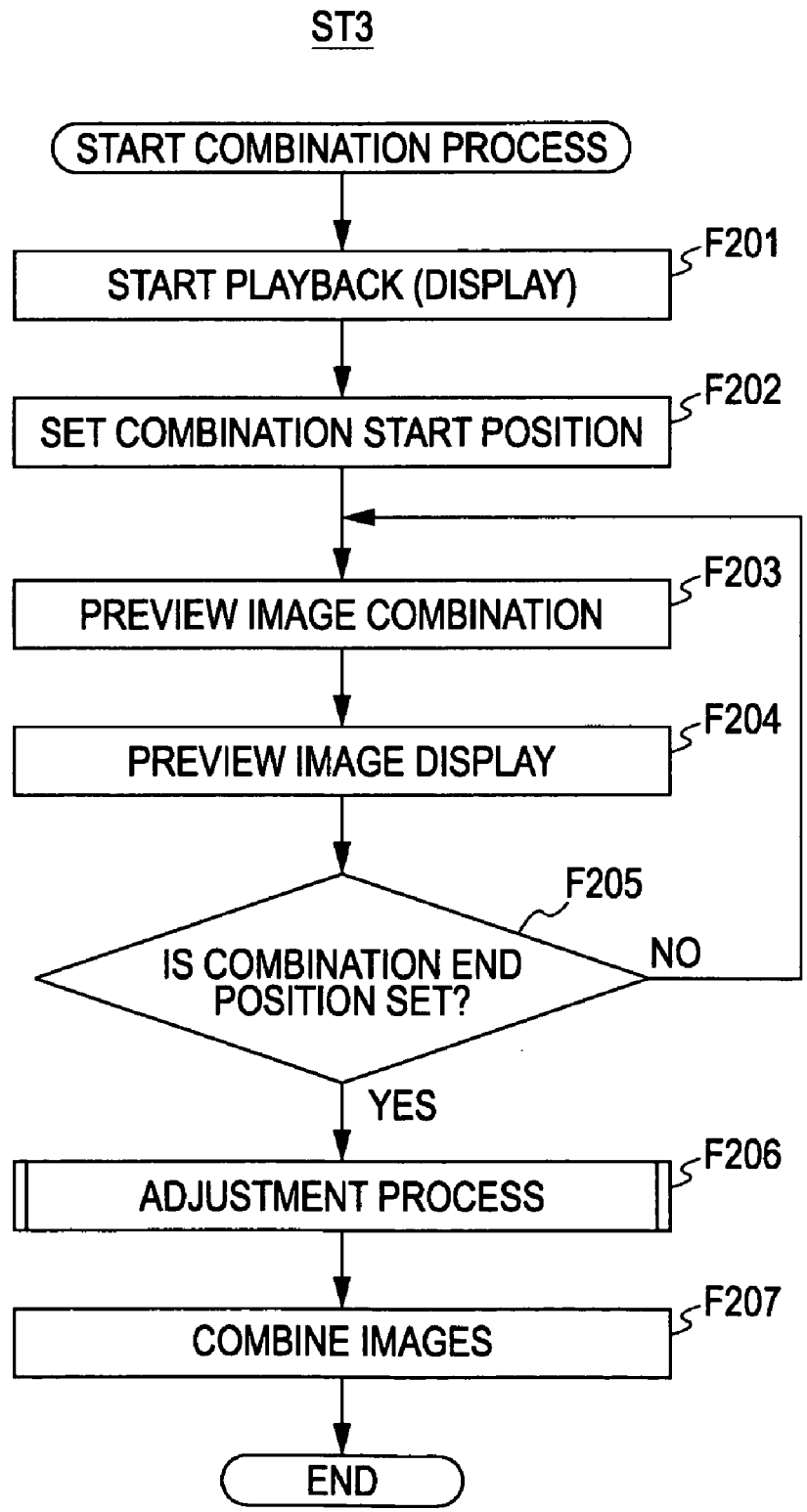
FIG. 8 is a flowchart showing a combination process according to the embodiment.

In the combination process in step ST3, the combination processing unit 53, the display control unit 56, and the operation detection unit 55 in the CPU 31 cooperate with each other to perform a process shown in FIG. 8.

First, in step F201, the CPU 31 starts the playback and display of the combination-use image data using a combination-work image.

FIGS. 10 to 18 show examples of a combination-work image 70 displayed on the display panel 6.

Figure 10:
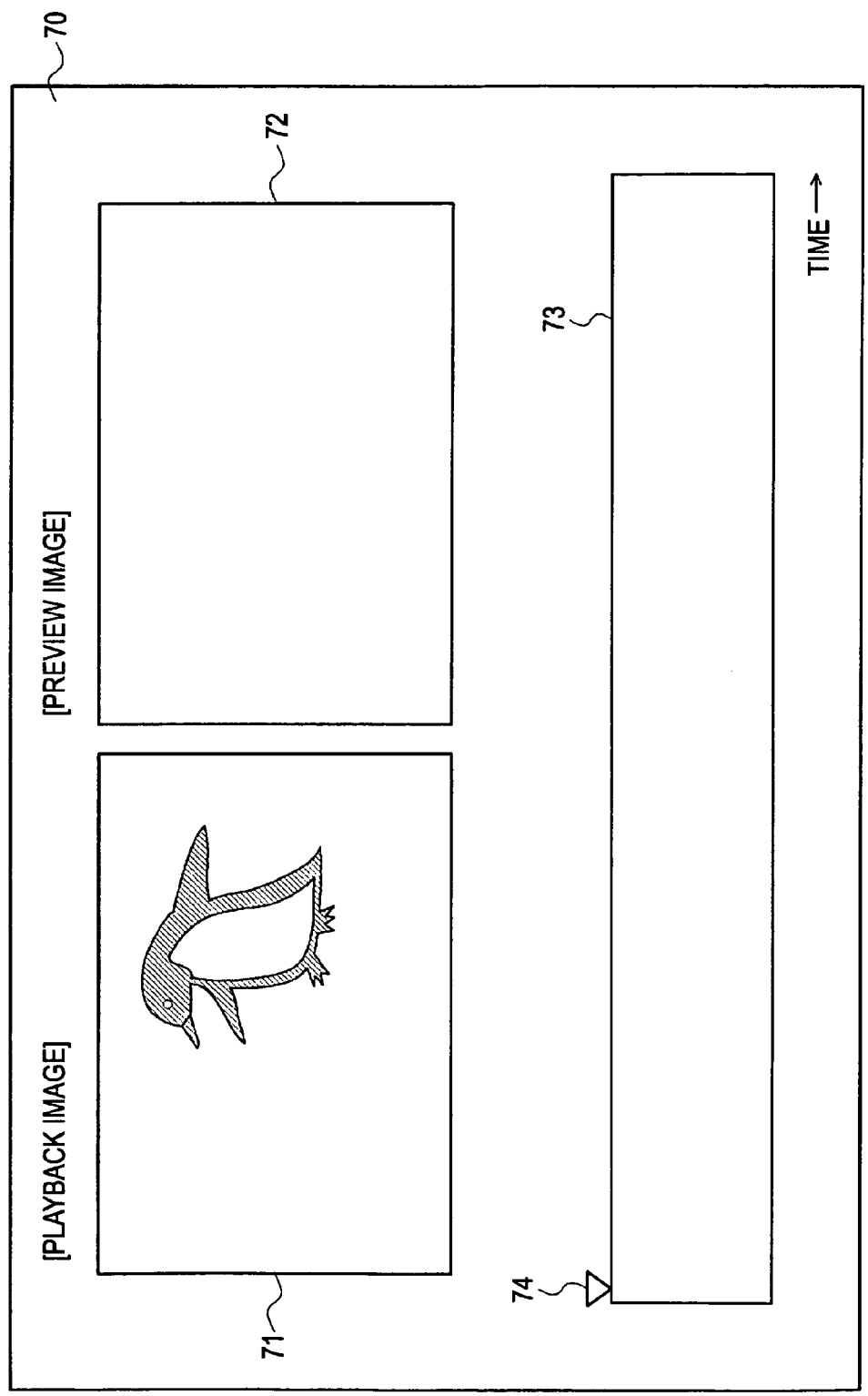
FIG. 10 is a diagram showing a combination-work image obtained at the beginning of playback according to the embodiment.

At the start of the playback, initially, the combination-work image 70 shown in FIG. 10 is displayed. The combination-work image 70 shown in FIG. 10 includes image display areas 71 and 72, a timeline 73, and a playback position marker 74.

The image display area 71 is used for the display or the like of a playback image.

The image display area 72 is used for the preview display or the like of a combined image.

The timeline 73 represents a time width of combination-use image data of a plurality of temporally consecutive frames.

The playback position marker 74 represents a current playback position on the timeline 73.

At the start of the playback, initially, as shown in FIG. 10, images in the combination-use image data are sequentially played back and displayed in the image display area 71 in a movie fashion, starting from the temporally first image. For example, if it is assumed that the combination-use image data includes image data elements #0, #1, #2, . . . , #n, the CPU 31 sequentially displays images corresponding to the image data elements #1, #2, #3, . . . in the image display area 71 in sequence, starting from the image data element #0, so that the sequence of image data elements #0 to #n can be represented in a movie fashion. The playback position marker 74 moves to the left along the timeline 73 with the progress of the playback.

A user specifies a combination start position at a certain time while viewing the playback image. For example, a user may specify a combination start position by pressing the shutter operation key.

After the playback and display are started in step F201, in step F202, the CPU 31 sets a combination start position in accordance with an operation performed by the user for specifying a combination start position.

Figure 11:
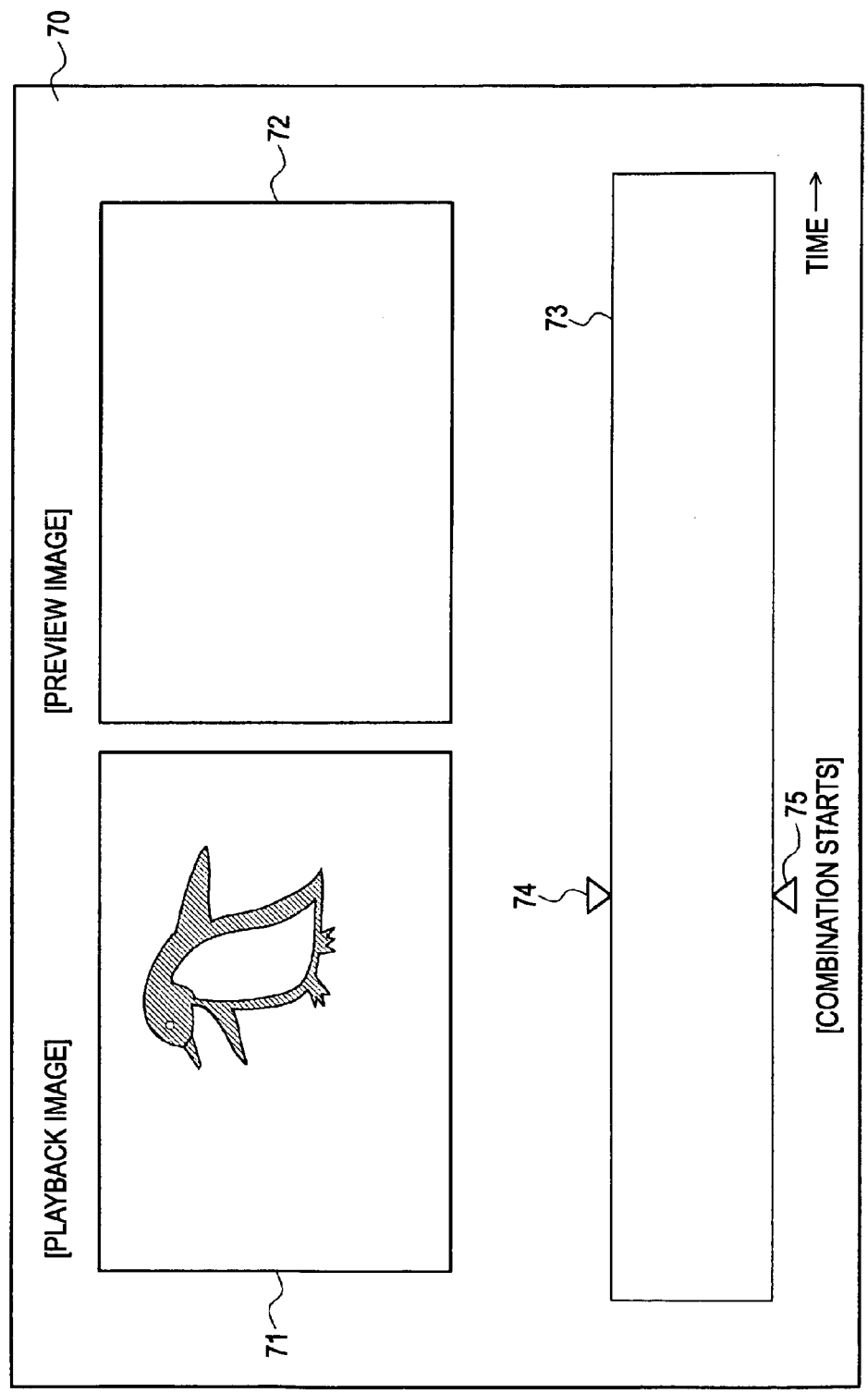
FIG. 11 is a diagram showing a combination-work image obtained when a combination start position is specified according to the embodiment.

For example, as shown in FIG. 11, at a time point in the course of the playback, the user specifies a combination start position. Then, an image data element #x corresponding to a playback image at the time point is set as an image at the combination start position (hereinafter referred to as "combination-start image"). A combination start marker 75 is further displayed.

The playback and display of images in the image display area 71 are continuously performed.

After the combination start position is set, the CPU 31 continues the processing of steps F203 and F204 until the operation of setting a combination end position is detected in step F205.

The preview image combination in step F203 is a process of combining the combination-start image up to the image currently being played back in the image display area 71.

The preview image display in step F204 is a process of displaying a combined image in the image display area 72 as a preview.

Figure 12:
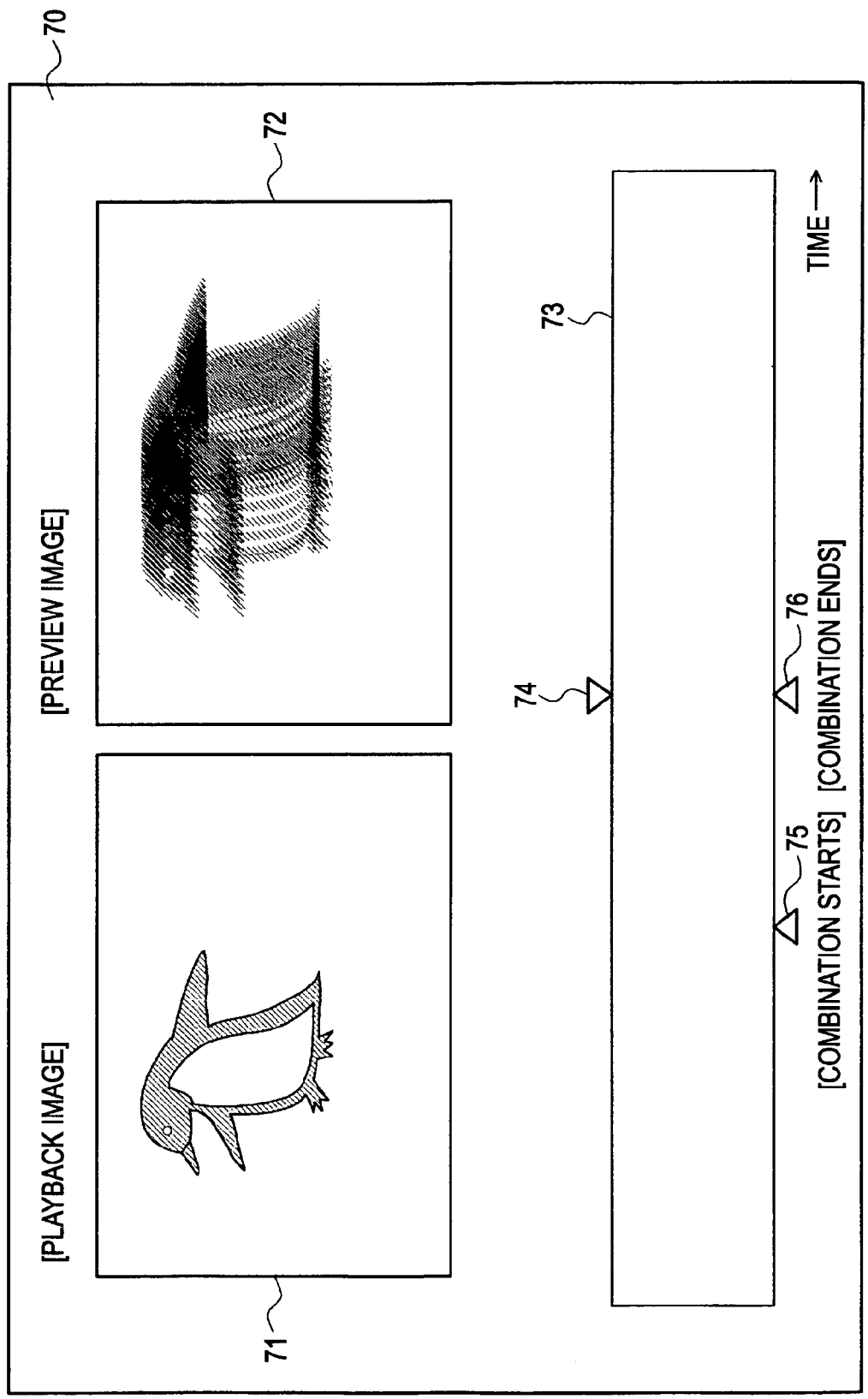
FIG. 12 is a diagram showing a combination-work image obtained when a combination end position is specified according to the embodiment.

Specifically, all images from the combination-start image to the frame currently being played back are combined, and a resulting combined image is displayed in the image display area 72 as a preview in the manner shown in FIG. 12.

Since the playback is still in progress, the size of a combination range increases by one frame with the progress of the playback. Specifically, each time a playback image is played back, the values of the corresponding pixels are added, and the resulting sum is divided by the number of playback images played back. Such combination is performed to generate a preview image. Thus, a non-weighted image similar to an image captured using long-time exposure is obtained and is displayed as a preview image.

In a case where the sequence of image data elements #0 to #n represents an image in which a subject is moving from right to left, as shown in FIG. 12, in accordance with the progress of the playback in the image display area 71, a long-time exposure image in which the subject is moving from right to left is displayed in the image display area 72 as a combined image obtained by combining the combination-start image up to the current image.

The user specifies a combination end position while viewing the playback and preview images.

The user may set a combination end position by, for example, pressing the shutter operation key to specify a combination start position and then releasing the shutter operation key.

After the shutter operation key is pressed, the CPU 31 repeats the processing of steps F203 and F204. When the shutter operation key is released, the playback image obtained at this time is set as an image at the combination end position (hereinafter referred as a "combination-end image). Then, as shown in FIG. 12, a combination end marker 76 indicating the combination end position is displayed. Thereafter, the CPU 31 proceeds from step F205 to step F206.

The operation of setting the combination start position/combination end position may be performed by, but not limited to, pressing the shutter operation key. For example, the shutter operation key may be pressed once to set a combination start position and the shutter operation key may be pressed again to set a combination end position.

Alternatively, combination-use image data of consecutive frames may be selected in advance from the first frame to the last frame, or a combination start position may be set by a user operation and a combination end position may be set when the capacity of a buffer memory used for preview image or image combination becomes full.

The generation and display of a preview image may be performed with a simple setting (such as a weighting setting) before a final image combination process is performed in step F207, which will be described below, or may be simply performed with an image size enough to allow a user to confirm the effect of the setting in advance.

Figure 9:
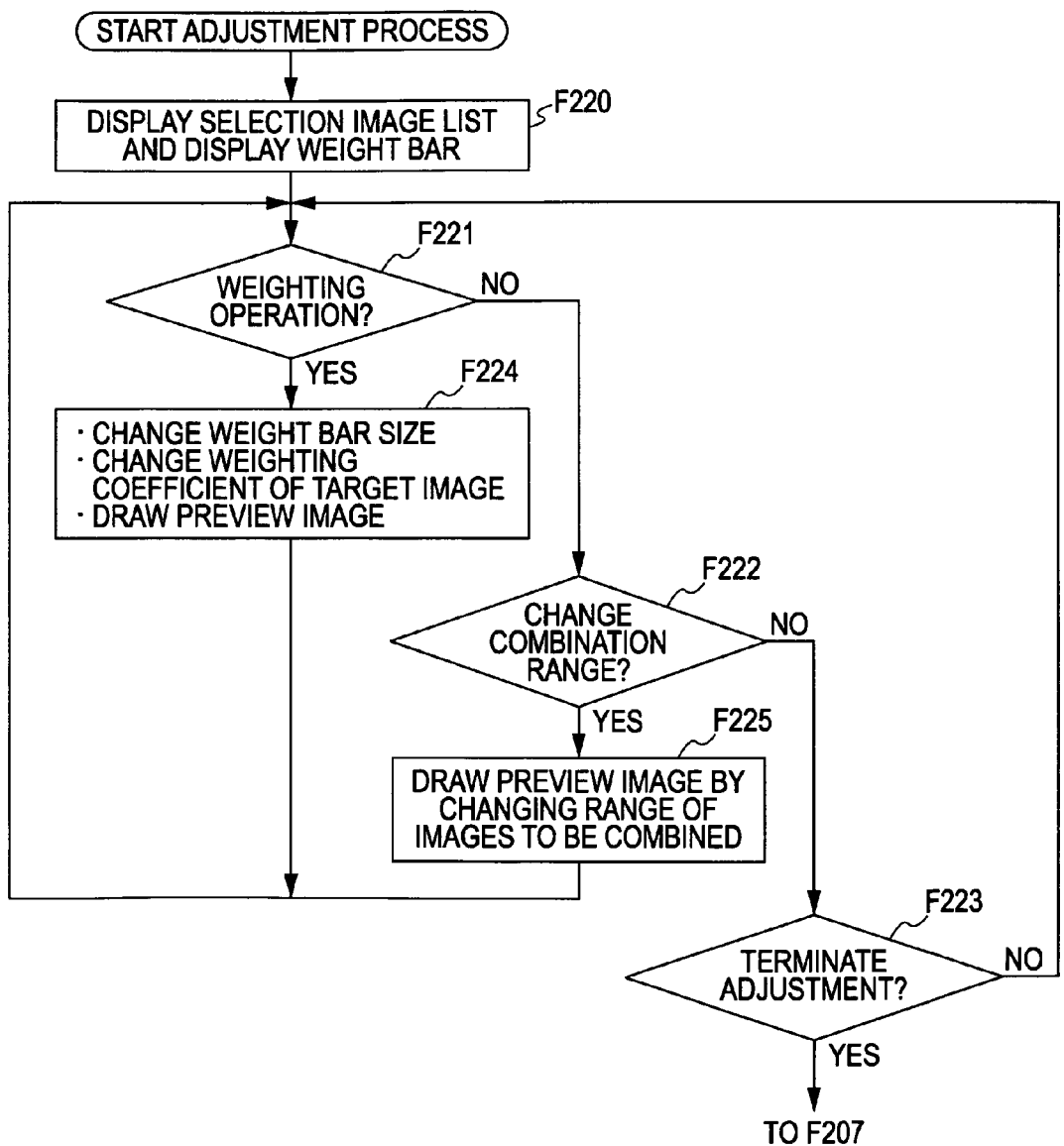
FIG. 9 is a flowchart showing an adjustment process according to the embodiment.

When the combination start position and the combination end position are set in the processing up to step F205, the CPU 31 proceeds to step F206 and performs an adjustment process. FIG. 9 shows the details of the adjustment process.

First, in step F220, the CPU 31 displays a selection image list and weight bars in the combination-work image 70.

Figure 13:
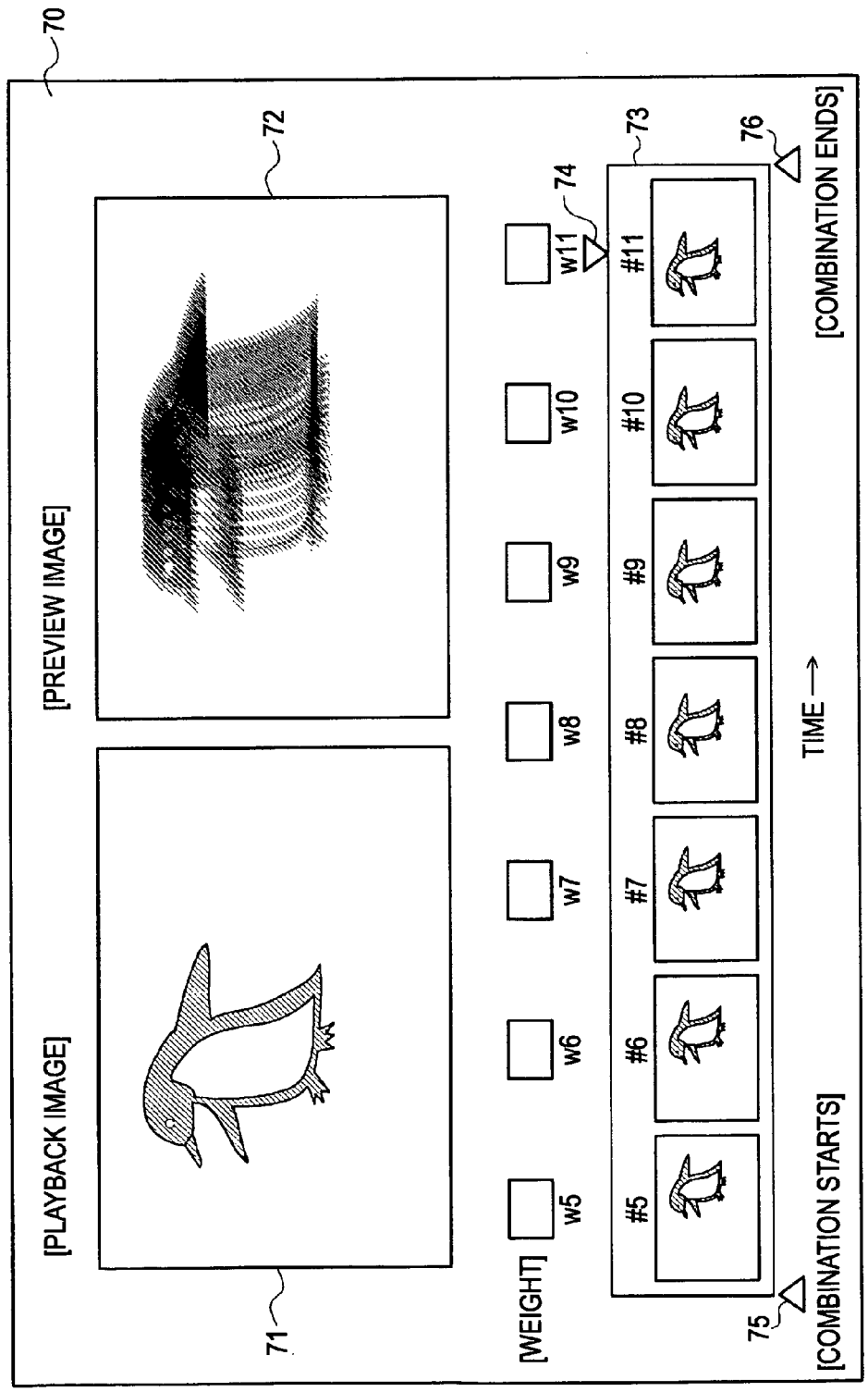
FIG. 13 is a diagram showing a combination-work image (with a long-time exposure effect) obtained at an initial state in an adjustment process according to the embodiment.

As shown in FIG. 13, images in the combination range from the combination-start image to the combination-end image are displayed in a selection image list view in the timeline 73.

For example, in this example, the image data element #5 is used as a combination-start image and the image data element #11 is used as a combination-end image, by way of example. The image data elements #5, #6, #7, . . . , #11 are displayed in the selection image list view in the timeline 73.

In practice, although all images in the combination range may not displayed in the timeline 73, the selection image list is automatically resized so as to be displayed in the timeline 73. In terms of visibility, for example, the selection image list may be scrollable right and left to show the images to avoid excessive reduction in size. Alternatively, preceding and following frames of an image to be selected may also be displayed side-by-side in the selection image list so that the user can easily check a frame to be selected in the adjustment operation.

When weight bars are displayed, weight bars w5, w6, w7, . . . , w11 corresponding to the image data elements #5, #6, #7, . . . , #11, respectively, are displayed. For example, each weight bar has a height that represents a weighting coefficient.

In the initial state in step F220, no weight is assigned to a specific image data element. In other words, respective image data elements are equally weighted.

In the present embodiment, in the continuous description, a weight bar is adapted to represent a weighting coefficient. An image representing a weighting coefficient assigned to each image data element is not limited to the weight bar. For example, any other shape (such as a circular graph shape) or a numerical value indicating a weighting coefficient may be displayed.

Alternatively, an independent image representing only a weighting coefficient may not necessarily be displayed. For example, an image representing a weighting coefficient assigned to each image data element may be implemented using a technique such as changing the lightness levels of the images corresponding to the image data elements #5, #6, #7, . . . , #11 displayed in the selection image list according to the weighting coefficients.

In the process shown in FIG. 9, the CPU 31 monitors a user operation in steps F221, F222, and F223.

In the combination-work image 70 shown in FIG. 13, a user can perform the operation of changing the weighting coefficients of the image data elements, the operation of changing the combination range, or any other suitable operation.

For example, the user can perform the operation of performing a left-right operation of the cross key 5i shown in FIG. 2B to select image data of a desired image in the selection image list and then perform an up-down operation of the cross key 5i to change the weighting coefficient of the selected image data.

When the user performs the operation of selecting a certain image and changing the corresponding weighting coefficient, the CPU 31 advances the process from step F221 to step F224.

In the display process in accordance with the operation, the CPU 31 changes the height of the weight bar w(x) corresponding to the selected image data element #(x).

The CPU 31 further changes the weighting coefficient set for the selected image data element #(x).

The CPU 31 further performs, in addition to reflecting the changed weighting coefficient, a combination process using weighted averages of the image data elements within the combination range to generate a preview image, and displays the preview image in the image display area 72.

For example, the user performs the operation of selecting the image data element #5 in the state shown in FIG. 13 and increasing the corresponding weighting coefficient. Then, the CPU 31 performs the processing of step F224 to increase the weight bar w5 in the manner shown in FIG. 14, change the weighting coefficient set for the image data element #5 to a high value, and perform the combination process of the image data elements (#5 to #11) within the combination range to produce a preview image which is then displayed in the image display area 72.

The user further performs the operations of selecting the remaining image data elements #6 to #11 and reducing the corresponding weighting coefficients. Then, the CPU 31 performs the processing of step F224 in accordance with the individual operations to reduce the heights of the weight bars w6 to w11 in the manner shown in FIG. 14 to change the weighting coefficients set for the image data elements #6 to #11 to low values and thereafter perform the combination process of the image data elements (#5 to #11) within the combination range to produce a preview image which is then displayed in the image display area 72.

When the user performs the weighting coefficient operations described above for the image data elements #5 to #11, combination is performed so that the temporally first image data element #5 in the combination range is highlighted by a higher weight than the remaining image data elements #6 to #11. As indicated by the preview image shown in FIG. 14, a combined image with the so-called first-curtain synchronization effect is obtained.

The first-curtain synchronization effect is an image capture technique in which a clear representation of the temporally first state is provided by firing a flash only at the beginning of long-time exposure. In the present embodiment, the first-curtain synchronization effect is obtained by combining image data of consecutive frames in a combination range so that a high weighting coefficient is assigned to the image data of the first frame and a low weighting coefficient is assigned to the image data of the subsequent remaining frames.

The weighting coefficients can be changed with, for example, variations of 8 bits (256 levels) to realize fine adjustment. For more simplicity of operations for users, two levels, namely, bright and dark, or three levels, namely, upper, middle, and lower, may be used. The coefficient setting of a weight of zero may be added in levels.

The weighting coefficients may be set so that an exposure amount, or the lightness of an image, can be adjusted as desired without removing an undesired image during continuous image capture (such as an image obtained when the surroundings of a photographer who is capturing a night scene are illuminated by the headlight of a vehicle passing by). In the present embodiment, such an image as unsuitable for combination is corrected in advance in the combining preparatory process described above. For example, the adjustment of weighting coefficients can be performed manually by the user.

In a user operation, the combination range defined by the combination start marker 75 and the combination end marker 76 can be changed.

For example, when the image data element (#5) at the combination start position is selected, the user can perform a left-right operation of the cross key 5*i*, while pressing a specific key, to shift the combination start position to the temporally preceding or following frame of image data. Likewise, when the image data element (#11) at the combination end position is selected, the user can perform a left-right operation of the cross key 5*i*, while pressing a specific key, to shift the combination end position to the temporally preceding or following frames of image data.

Alternatively, a user operation may be performed to directly move the combination start marker 75 or the combination end marker 76 to the left and right along the timeline 73.

When the user performs the operation of changing the combination range, the CPU 31 advances the process from step F222 to step F225. Then, in accordance with the operation, the CPU 31 changes the image range of a target for combination, performs a combination process of image data elements in the new combination range to generate a preview image, and displays the preview image in the image display area 72.

Figure 14:
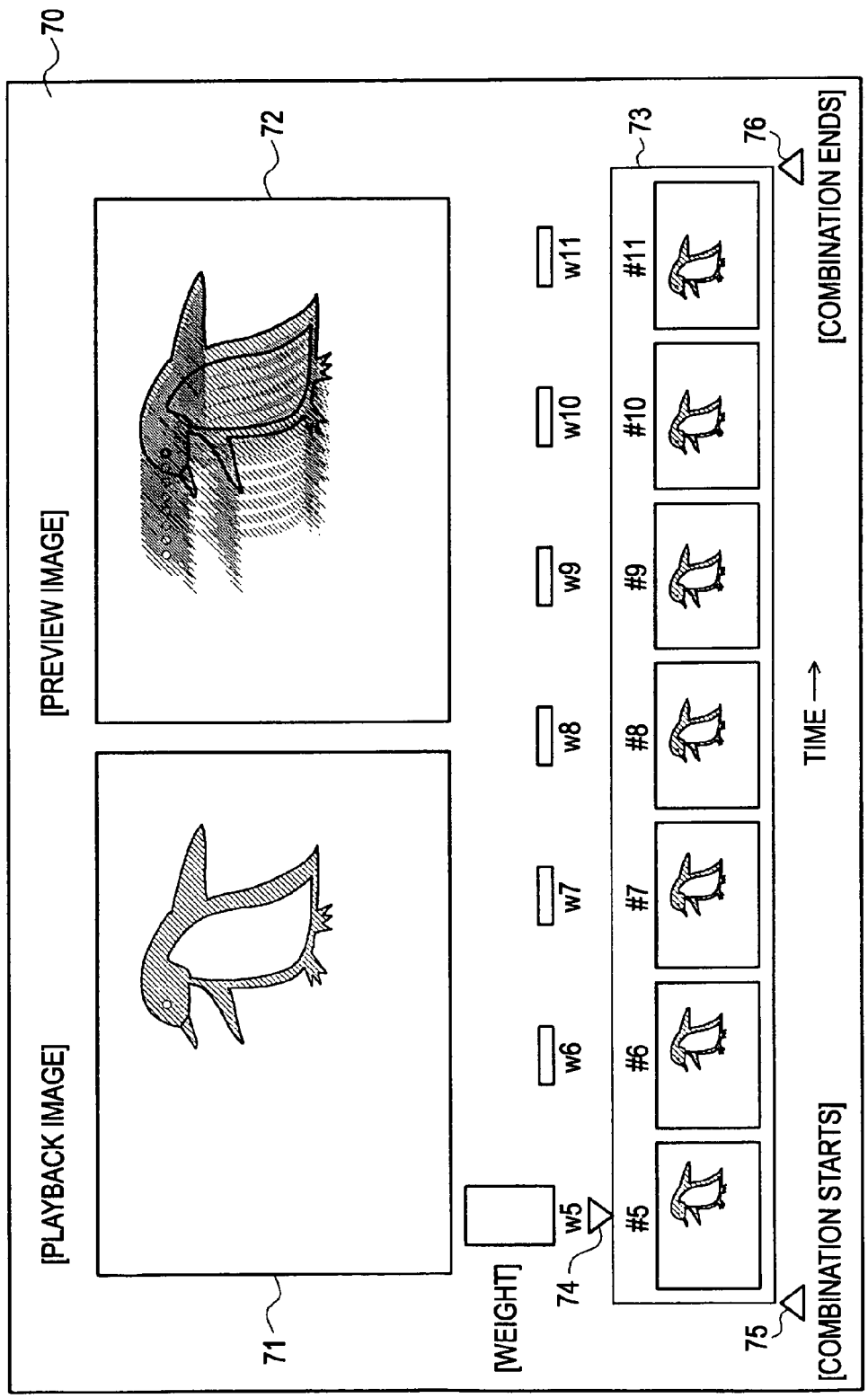
FIG. 14 is a diagram showing a combination-work image obtained when weighting coefficients are changed so as to achieve the first-curtain synchronization effect according to the embodiment.

For example, it is assumed that the user performs the operation of changing the combination-end image to the image data element #7 in the state shown in FIG. 14. Then, the CPU 31 performs the processing of step F225 to perform a combination process of the image data elements (#5 to #7) in the new combination range in the manner shown in FIG. 15 and display a preview image in the image display area 72. The combination end marker 76 is shifted so as to designate the image data element #7.

Figure 15:
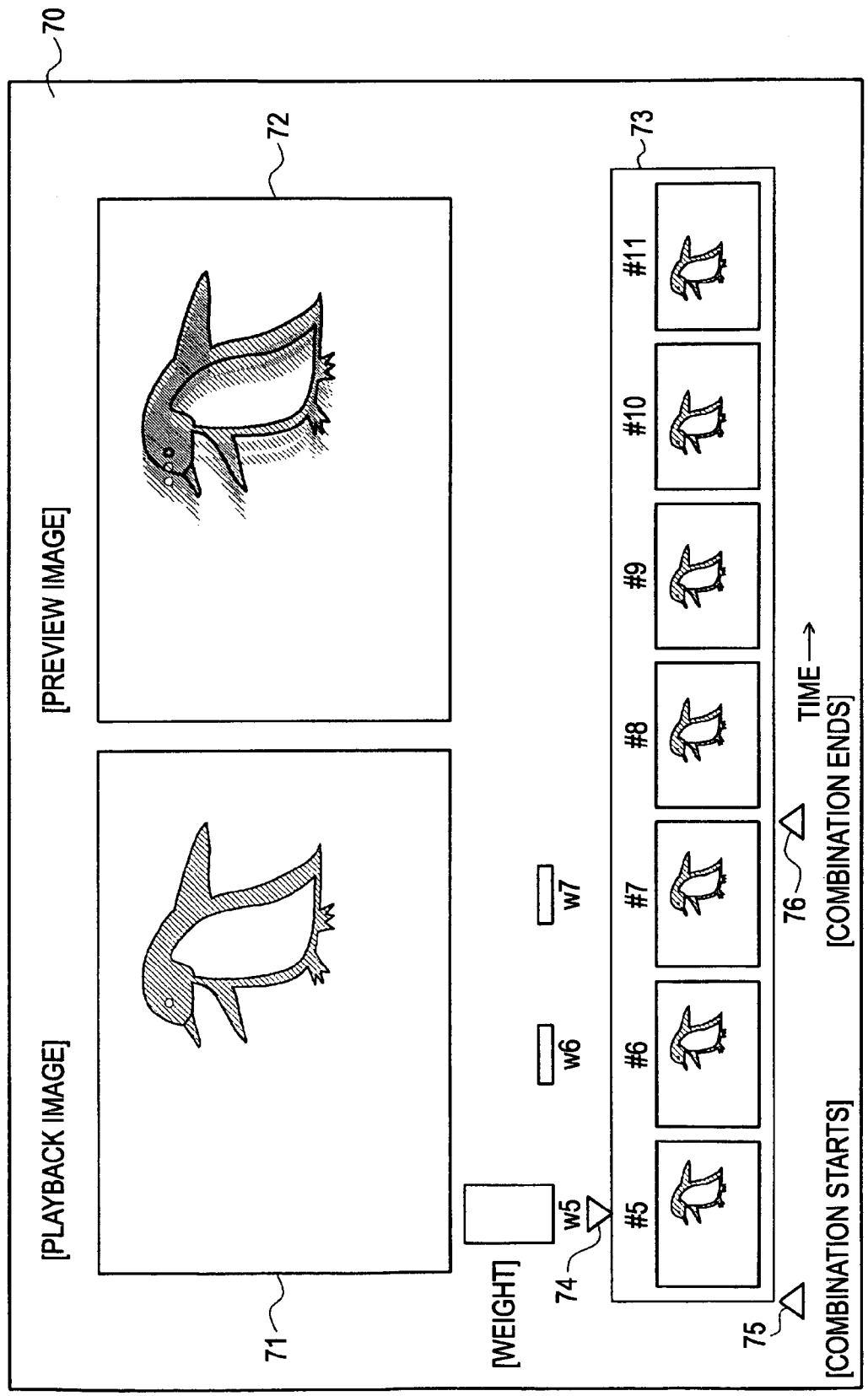
FIG. 15 is a diagram showing a combination-work image obtained when a combination range is changed in the state shown in FIG. 14 according to the embodiment.

In this case, as can be seen from the comparison between the preview images shown in FIGS. 14 and 15, in FIG. 15, due to the shortened combination range, an image effect with the exposure time reduced in first-curtain synchronization is achieved.

As described above, the user performs various operations on the combination-work image 70, thereby displaying various combined images as previews accordingly through the processing of steps F224 and F225 performed by the CPU 31.

Figure 16:
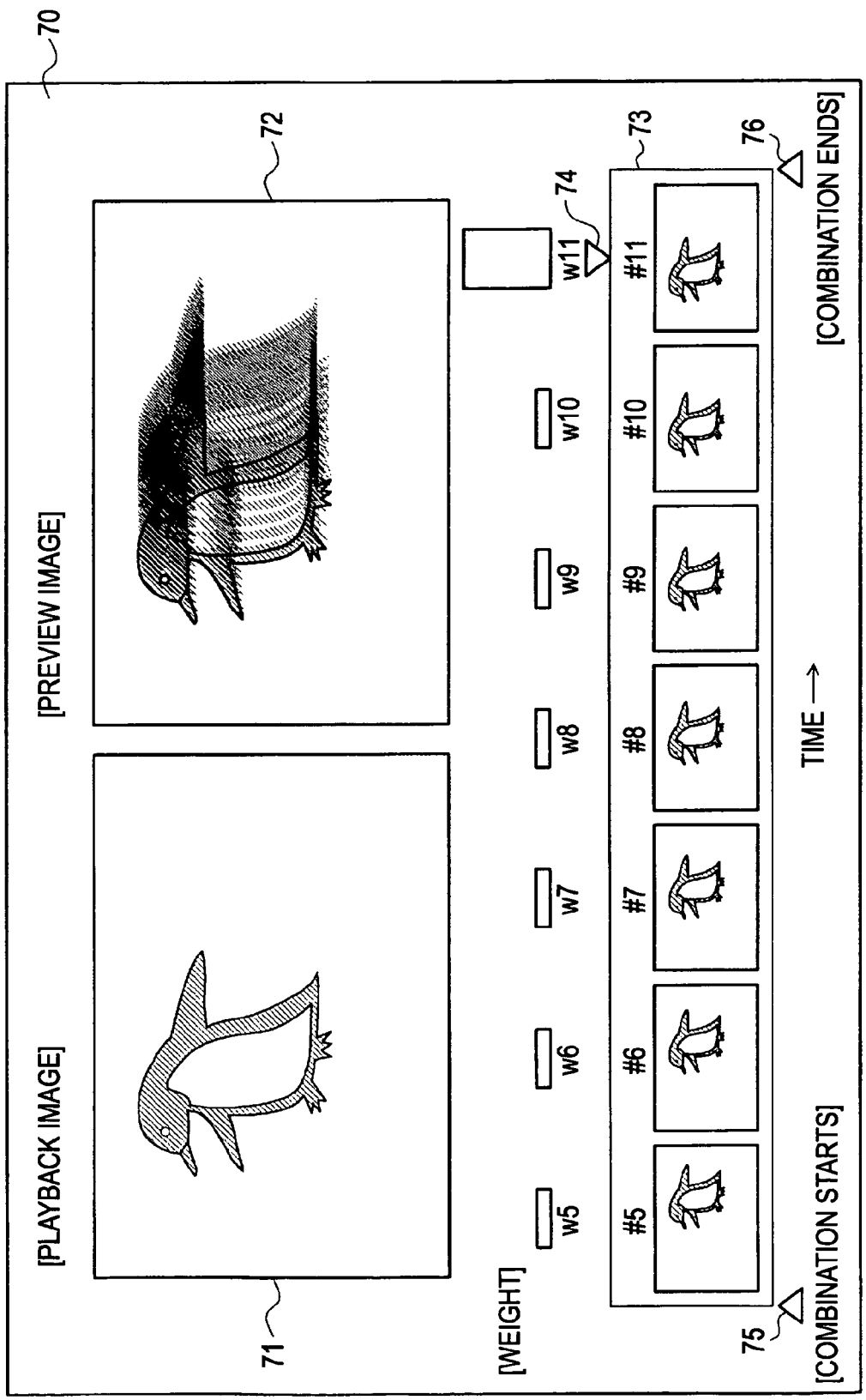
FIG. 16 is a diagram showing a combination-work image obtained when weighting coefficients are changed so as to achieve the second-curtain synchronization effect the according to the embodiment.
Figure 17:
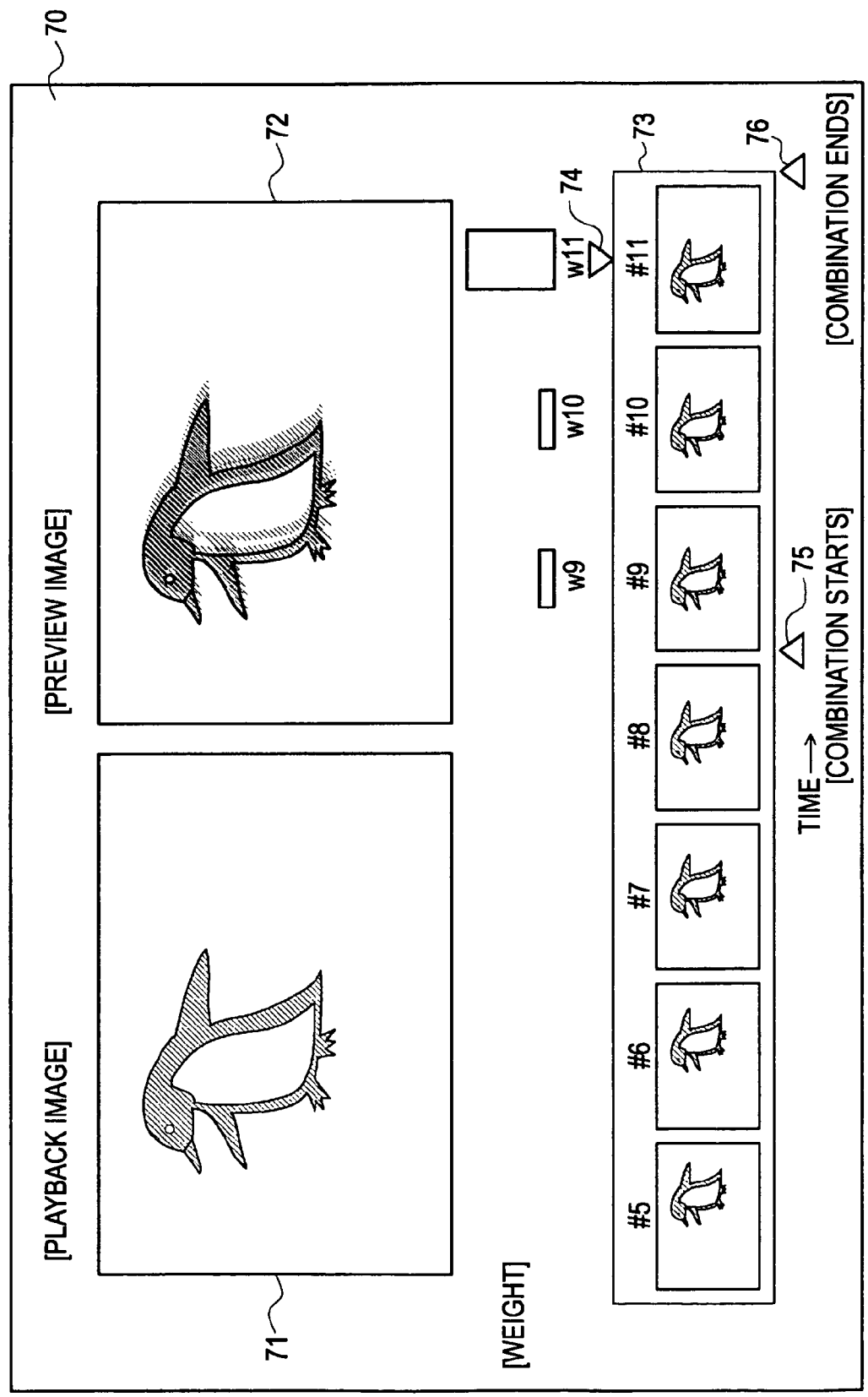
FIG. 17 is a diagram showing a combination-work image obtained when a combination range is changed in the state shown in FIG. 16 according to the embodiment.
Figure 18:
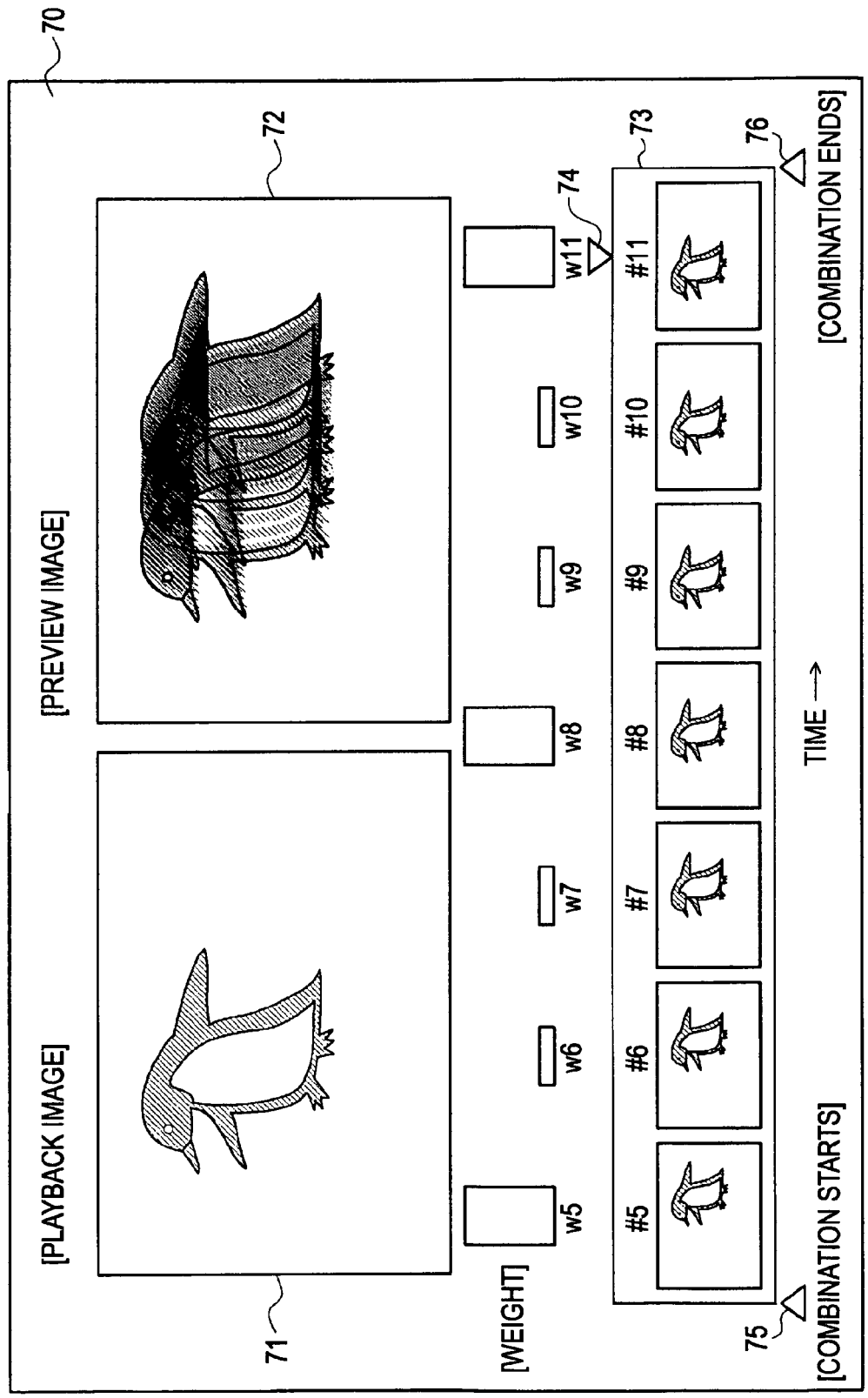
FIG. 18 is a diagram showing a combination-work image obtained when weighting coefficients are changed so as to achieve the multi-flash effect according to the embodiment.

FIGS. 16, 17, and 18 show other examples.

FIG. 16 shows an example of the combination-work image 70 obtained when, for example, the user performs the operation of selecting the image data element #11 in the state shown in FIG. 13 and increasing the corresponding weighting coefficient and also performs the operations of individually selecting the remaining image data elements #5 to #10 and reducing the corresponding weighting coefficients.

The CPU 31 performs the processing of step F224 in accordance with the individual weighting coefficient operations for the image data elements #5 to #11.

In this case, combination is performed so that the temporally last image data element #11, in the combination range is highlighted by a higher weight than the remaining image data elements #5 to #10. As indicated by the preview image shown in FIG. 16, a combined image with the so-called second-curtain synchronization effect is obtained.

The second-curtain synchronization effect is an image capture technique in which a clear representation of the temporally last state is provided by firing a flash only at the end of long-time exposure. In the present embodiment, the second-curtain synchronization effect is obtained by combining image data of consecutive frames in a combination range so that a high weighting coefficient is assigned to the image data of the last frame and a low weighting coefficient is assigned to the image data of the remaining frames.

FIG. 17 shows an example of the combination-work image 70 obtained when the user performs the operation of changing the combination range in the state shown in FIG. 16. When the user performs the operation of changing the combination range to a range of the image data elements #9 to #11, the CPU 31 performs the processing of step F225 to perform a combination process of the image data elements in the new combination range to generate a preview image which is then displayed in the image display area 72.

In this case, as can be seen from the comparison between the preview images shown in FIGS. 16 and 17, in FIG. 17, due to the shortened combination range, an image effect with the exposure time reduced in second-curtain synchronization is achieved.

FIG. 18 shows an example of the combination-work image 70 obtained when, for example, the user performs the operation of increasing the weighting coefficients of the image data elements #5, #8, and #11 in the state shown in FIG. 13 and reducing the weighting coefficients of the remaining image data elements #6, #7, #9, and #10.

The CPU 31 performs the processing of step F224 in accordance with the individual weighting coefficient operations for the image data elements #5 to #11.

In this case, combination is performed so that the images in the combination range are periodically highlighted. As indicated by a preview image shown in FIG. 18, a combined image with the so-called multi-flash effect is obtained.

The multi-flash effect is an image capture technique in which a clear representation of the state of a subject is provided by periodically firing a flash during long-time exposure. In the present embodiment, the multi-flash effect is obtained by combining image data of consecutive frames in a combination range so that high and low weighting coefficients are periodically assigned to the image data.

As in the exemplary illustrations described above, a user can perform a desired operation on the combination-work image 70 to attempt the generation of various combined images and can confirm them as preview images. That is, the user can easily generate a desired image by attempting visual observation of multiple image effects.

When a satisfactory combined image as a preview image is obtained, the user may perform an adjustment termination process. The user may perform the adjustment termination operation by, for example, pressing a set key at the center of the cross key 5*i*.

When the adjustment termination operation is detected, the CPU 31 ends the process shown in FIG. 9 from step F223, and proceeds to step F207 shown in FIG. 8.

In step F207, the CPU 31 performs a final combination process. Specifically, the CPU 31 performs combination using the image data elements in the combination range obtained at the end of the adjustment process and the weighting coefficients set for the image data elements. In this case, the values of pixels of the image data of each of the frames in the combination range are multiplied by the set weighting coefficients. Then, the values of pixels of the image data of each of the frames are added and the resulting sum is divided by the number of frames. That is, a weighted average process is performed.

Note that exposure correction may be applied in the addition or division process so that a combined image to be generated has specified lightness. Alternatively, the combined-image data obtained after the calculation may be corrected.

After the combination process in step ST3 shown in FIG. 4 is performed using the process shown in FIG. 8 described above, in step ST4, the CPU 31 performs a combined-image recording process. Specifically, the CPU 31 performs control so that the combined-image data generated in the manner described above is recorded onto the recording medium 90 through the media interface 10.

The series of processes in the combination mode thus ends.

The operations in the combination mode described above can achieve the following advantages:

First, effects equivalent to those obtained using long-time exposure image capture, which is difficult in the related art because, due to the image combination performed using images after they are captured, it is necessary to determine the exposure time/shutter timing or the like using the photographer's experience and intuition, can easily be achieved even by inexperienced photographers. In addition, many attempts or retries can be made until a satisfactory image effect is obtained.

Further, since weighting coefficients of image data elements to be combined after image capture can be set as desired, image effects such as the first-curtain synchronization, second-curtain synchronization, and multi-flash effect can be easily achieved, which is difficult to achieve without using a flash in the related art.

Furthermore, a favorable image can be achieved even under image conditions with motion of a subject, such as an image capture condition that aims to provide a representation of the motion of a subject or to focus on a stationary subject among moving subjects.

4-3: Exemplary Adjustment Process Using Displayed Images Before and After Change In the exemplary combination process described above, a preview image of a combined image obtained when a user changes weighting coefficients or the like in the combination-work image 70 is displayed in the image display area 72. Preferably, a combined image obtained immediately before the weighting coefficients or the like have been changed (previous preview image) is also displayed at the same time to allow the user to simultaneously view the combined images obtained before and after the changing operation.

Figure 19:
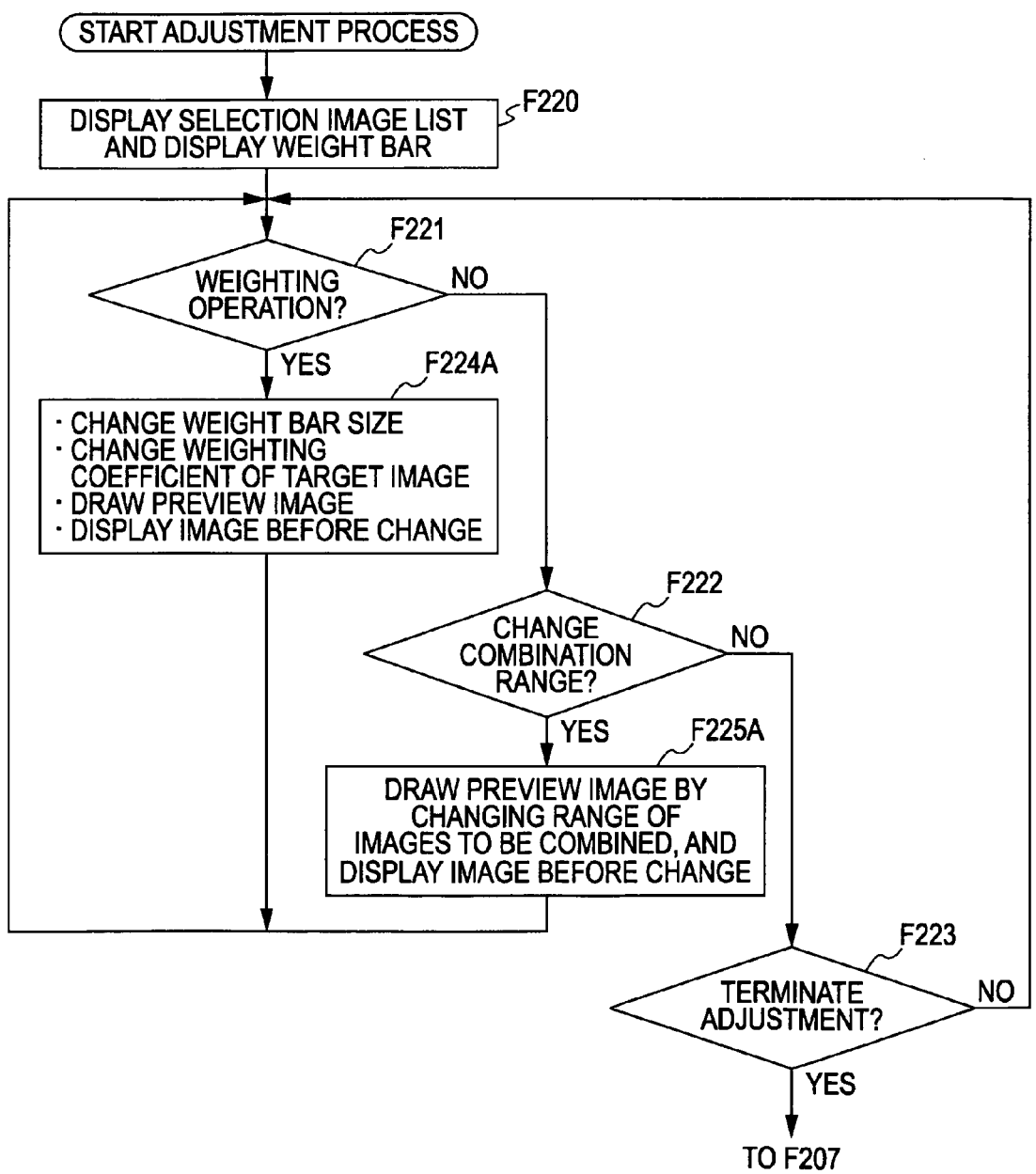
FIG. 19 is a flowchart showing an exemplary process for displaying a combined image before the change in an adjustment process according to the embodiment.

Accordingly, the adjustment process performed in step F206 shown in FIG. 8 may be performed in a manner shown in FIG. 19 instead of using the example shown in FIG. 9.

FIG. 19 shows an exemplary adjustment process executed by the CPU 31. In FIG. 19, the same or similar processing steps as or to those of FIG. 9 are assigned the same numerals and descriptions thereof are omitted.

FIG. 19 is different from FIG. 9 in the processing of step F224A that is performed when the user performs the operation of changing a weighting coefficient and the processing of step F225A that is performed when the user performs the operation of changing a combination range.

When the user performs the operation of changing a weighting coefficient, in step F224A, the CPU 31 changes the height of the weight bar w(x) corresponding to the image data element #(x) being selected. The CPU 31 also changes the weighting coefficient set for the image data element #(x) being selected. The CPU 31 further performs, in addition to reflecting the changed weighting coefficient, a combination process using weighted averages of the image data elements in the combination range to generate a preview image, and displays the preview image in the image display area 72.

The CPU 31 further displays the previous combined image in the image display area 71, which has been displayed immediately before this process in the image display area 72 as a preview image.

Figure 20:
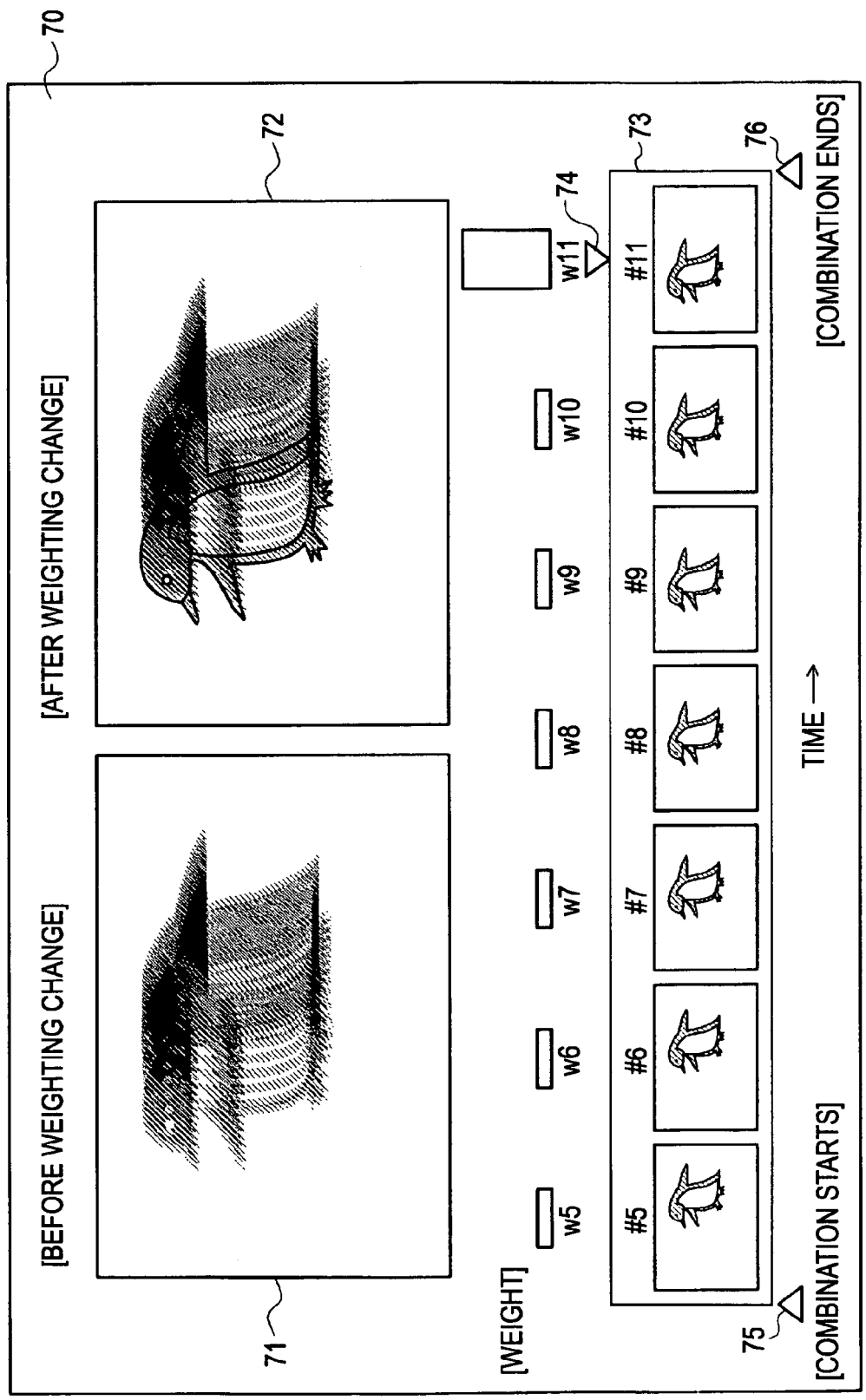
FIG. 20 is a diagram showing a combination-work image obtained when a combined image before the change is displayed in the adjustment process according to the embodiment.

Specifically, the combined image displayed as the previous preview image is not discarded but is stored, and is displayed, as shown in FIG. 20, together with the combined image obtained as the current preview image in the image display areas 71 and 72 side-by-side, respectively.

FIG. 20 shows a combination-work image 70 obtained when, for example, the user performs the operation of increasing the weighting coefficient of the image data element #11. In this case, the current combined image (image with the second-curtain synchronization effect) is displayed in the image display area 72 as a preview image obtained after the weighted change, and the previous combined image (image with the second-curtain synchronization effect removed) is displayed in the image display area 71.

The combined images obtained before and after the change of weighting coefficients are displayed at the same time in the manner shown in FIG. 20, thus allowing the user to easily check the appropriateness of the changed weighting coefficients.

Further, when the user performs the operation of changing a combination range, in step F225A, the CPU 31 changes the range of images to be combined in accordance with the operation, and performs a combination process for image data elements in a new combination range to generate a preview image, and displays the preview image in the image display area 72. The previous combined image is further displayed in the image display area 71, which has been displayed immediately before this process in the image display area 72 as a preview image.

Also in this case, the user can compare the original and changed combination ranges.

For example, in this manner, images obtained before and after combination are checked by comparison when a range of images to be combined is selected or a weight is specified. This is useful for the user to attempt the implementation of various image effects.

For example, when the user compares two images and determines that the original image is better, the operation of canceling the current image combination and recovering the original combination state may be performed.

Furthermore, the user may be allowed to select, as desired, the process shown in FIG. 19 for displaying images obtained before and after combination side-by-side or the process shown in FIG. 9 described above.

5. Template-Based Process

In the combination process described above, a user can create a combined image with an image effect such as the first-curtain synchronization effect, second-curtain synchronization effect, or multi-flash effect by performing the operation of changing a weighting coefficient of each image data element as desired. Some users may not be able to determine the values of weights to obtain a desired image effect. Even users who are able to determine the values of weights may feel that the operation of selecting image data elements one by one and changing the weighting coefficients is time-consuming.

Accordingly, an operation technique in which coefficient templates each having a pattern of weighting coefficients for achieving a predetermined image effect are prepared so that the user can select one of the coefficient templates may be used.

In the following description, it is assumed that four coefficient templates for the long-time exposure effect, first-curtain synchronization effect, second-curtain synchronization effect, and multi-flash effect are prepared.

For example, weighting coefficient patterns corresponding to the long-time exposure effect, first-curtain synchronization effect, second-curtain synchronization effect, and multi-flash effect are stored as coefficient templates in the flash ROM 33. For example, the coefficient template for the first-curtain, synchronization effect represents a weighting coefficient pattern in which a high weight is assigned to the first image while low weights are assigned to subsequent images. The template management unit 57 of the CPU 31 manages such coefficient templates.

Figure 22:
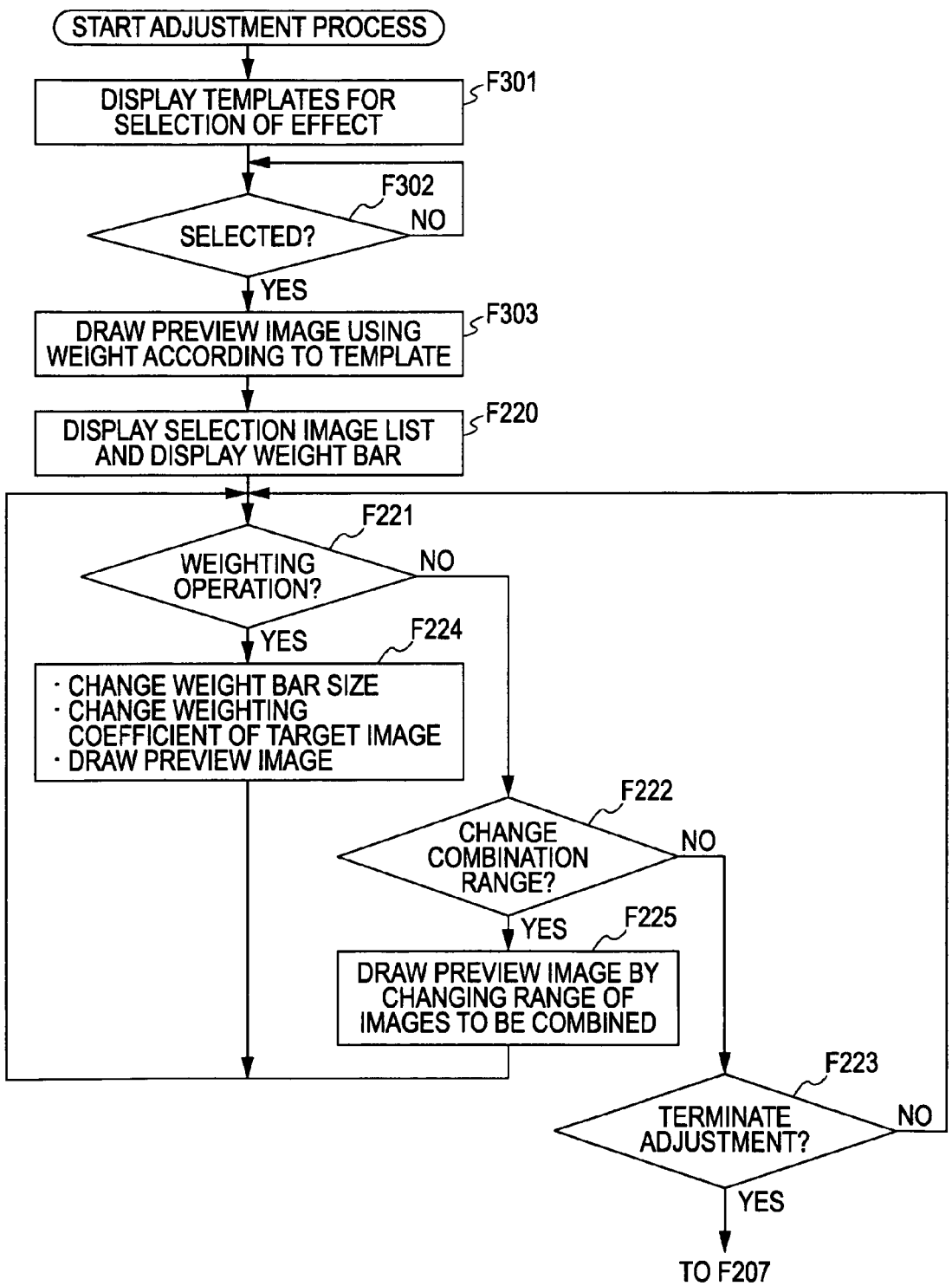
FIG. 22 is a flowchart showing an exemplary process using coefficient templates according to the embodiment.

The CPU 31 performs the adjustment process in step F206 shown in FIG. 8 in a manner shown in FIG. 22 instead of using the example shown in FIG. 9.

In step F206 shown in FIG. 8, the CPU 31 performs the process shown in FIG. 22. First, in step F301, the CPU 31 (the template management unit 57 and the display control unit 56) displays coefficient templates for selecting an effect on the display panel 6.

Figure 21:
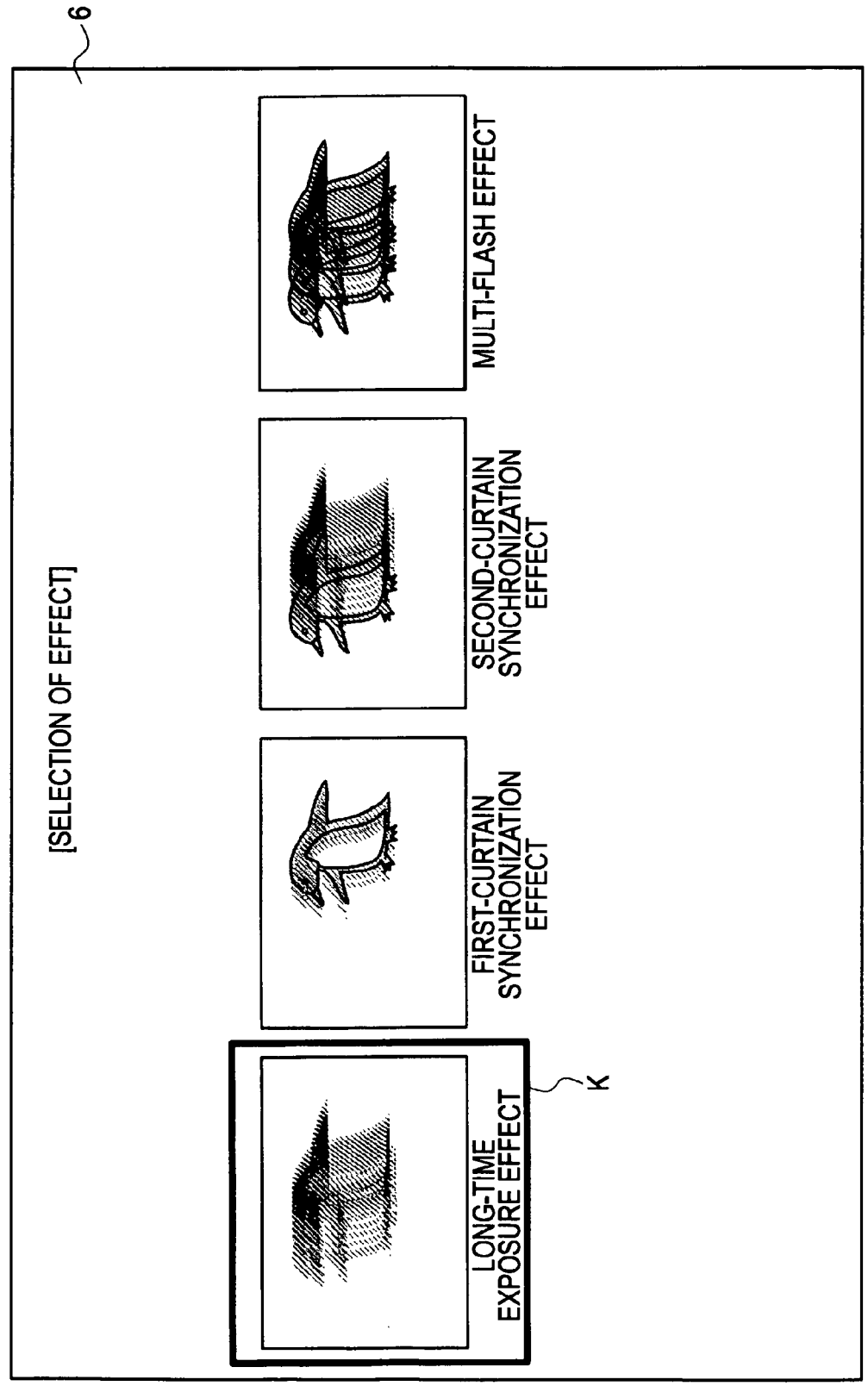
FIG. 21 is a diagram showing a coefficient template selection screen according to the embodiment.

FIG. 21 shows an example of the display. Images corresponding to four coefficient templates for the long-time exposure effect, first-curtain synchronization effect, second-curtain synchronization effect, and multi-flash effect are displayed.

At this time, effect modeling images each indicating an image effect that is obtained using the corresponding coefficient template are displayed. As shown in FIG. 21, an image with the long-time exposure effect, an image with the first-curtain synchronization effect, an image with the second-curtain synchronization effect, and an image with the multi-flash effect are used as effect modeling images, thus allowing the user to recognize the details of the image effects. This is suitable for, in particular, users who are not familiar with various image effects.

The images for selection from the coefficient templates may be displayed as a list of preset effect modeling images each having image data representing one of the coefficient templates.

Alternatively, text items "long-time exposure effect", "first-curtain synchronization effect", "second-curtain synchronization effect", and "multi-flash effect" may be presented in a menu without displaying effect modeling images, and one of them may be selected.

In response to the display as shown in FIG. 21, for example, the user operates the cross key 5$i$ to select a desired effect modeling image and performs a determination operation to select one coefficient template.

In accordance with the selection and determination operation by the user, the CPU 31 advances the process from step F302 to step F303. In this case, the template management unit 57 of the CPU 31 applies the weighting coefficient pattern of the selected coefficient template to the combination processing unit 53, and the combination processing unit 53 applies the weighting coefficient pattern to the individual images in the combination range.

As described above, the CPU 31 proceeds to the adjustment process in step F206 shown in FIG. 8, which is shown in FIG. 22, when, as described with reference to up to FIG. 12, the user determines a combination range (combination start position and combination end position), that is, at the time when the combination-work image 70 is changed from the state shown in FIG. 12 to the state shown in FIG. 13.

When the user selects a coefficient template, as shown in FIG. 13, while the selection image list and the weight bars are displayed, the combination processing unit 53 of the CPU 31 applies the weighting coefficient pattern of the template as the weighting coefficients corresponding to the image data elements, and displays, as a preview image, a combined image obtained using weighted averages with the weighting coefficients applied.

The processing subsequent to the processing of steps F220 to F223 shown in FIG. 22 is similar to that shown in FIG. 9, and a redundant description thereof is omitted.

In this manner, the user selects a coefficient template, thereby initially achieving a preview image of a desired image effect without adjusting weighting coefficients of image data elements in a combination range. The ease of user operation or operation efficiency can therefore be greatly improved.

Further, even users who are not familiar with the details of effects such as the first-curtain synchronization effect can implement various image effects by selecting coefficient templates.

In the processing after step F220 shown in FIG. 22, similarly to FIG. 9, weighting coefficients can be individually changed as desired depending on the image data elements or a combination range can be changed as desired. Thus, the user can create a combined image with greater originality based on a combined image obtained by selecting a coefficient template.

After a coefficient template is selected, the coefficient pattern designated by the coefficient template may be adjusted.

For example, with regard to the weighting coefficient pattern for the multi-flash effect, after the selection of the template, a light emission interval (interval of highly weighted frames) may be adjustable. This adjustment operation may be implemented by adding the corresponding function to one of the operation buttons or by selecting the corresponding item from a menu. Alternatively, a light emission interval (interval of highly weighted frames) may be set as desired by performing an operation such as pressing a left-right button while pressing the shutter release button.

Furthermore, a coefficient template suitable for a specific use such as golf swing check may be prepared.

A coefficient template may also be selected in a process other than the combination process such as during image capture in the camera mode.

Figure 23:
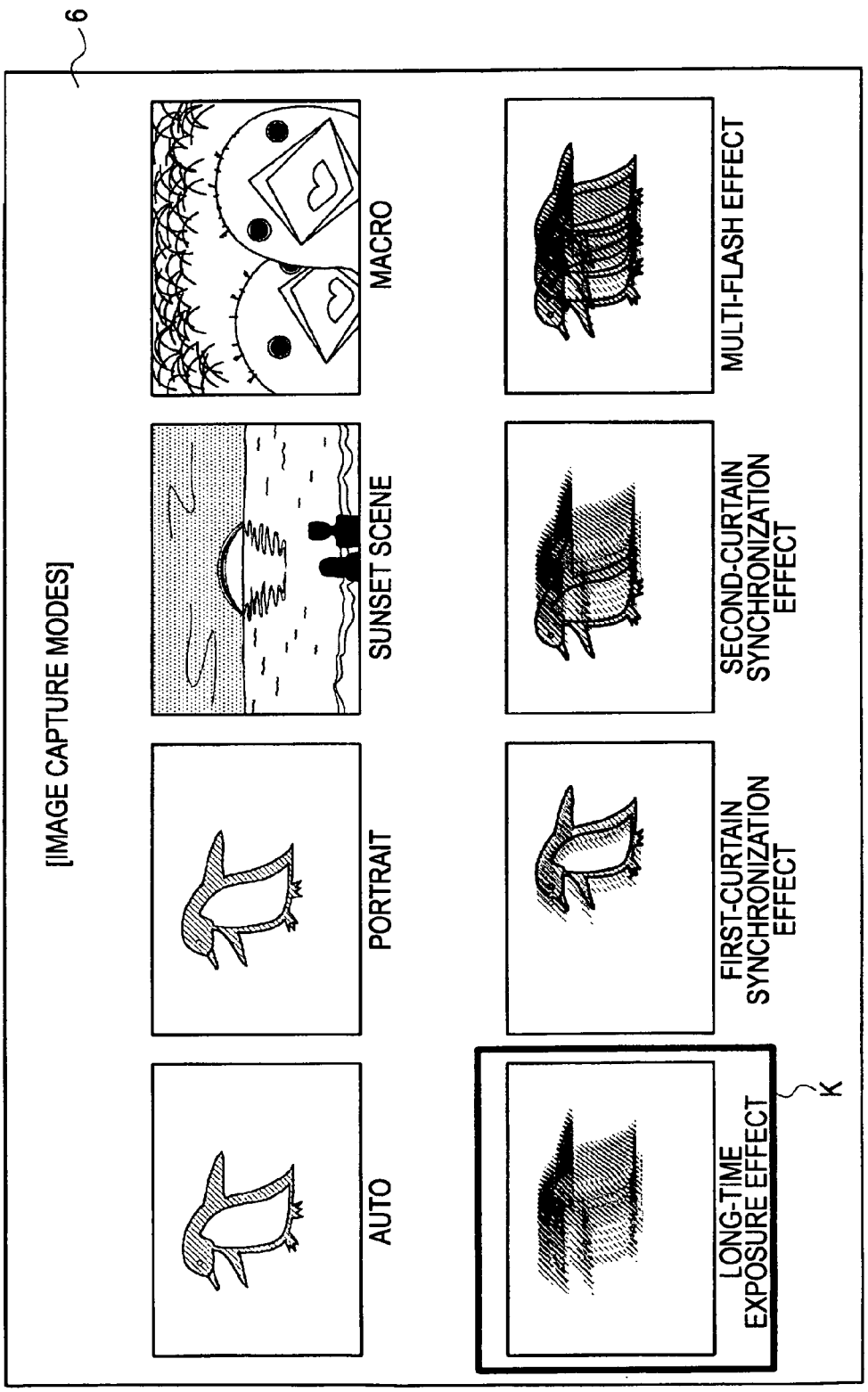
FIG. 23 is a diagram showing a coefficient template selection screen during image capture according to the embodiment.

For example, when an image capture mode is selected in the camera mode, a mode selection screen as shown in FIG. 23 is displayed on the display panel 6.

In this case, in addition to the normal image capture modes such as the auto-mode image capture, portrait-mode image capture, sunset-scene-mode image capture, and macro-mode image capture shown in FIG. 4, effects such as the long-time exposure effect, first-curtain synchronization effect, second-curtain synchronization effect, and multi-flash effect may be selectable.

When one of the long-time exposure effect, first-curtain synchronization effect, second-curtain synchronization effect, and multi-flash effect is selected, in step F15 shown in FIG. 5, images of a plurality of frames are captured in the combination-mode image capture. During the image capture, information regarding the selected effect is recorded using metadata or the like for the image data group to be recorded.

Then, thereafter, such as when preview image combination is performed in step F203 in the combination process shown in FIG. 8 or when the CPU 31 proceeds to step F206, weighted combination can be performed using the coefficient template of the selected image effect.

For example, when the user wishes to achieve the first-curtain synchronization effect during image capture, the coefficient template for the first-curtain synchronization effect is selected in advance during the image capture, thereby performing preview image combination using the weighting coefficient pattern for the first-curtain synchronization effect. Thus, the operation efficiency can be improved.

Furthermore, in a case where the first-curtain synchronization effect, second-curtain synchronization effect, or multi-flash effect is selected in this manner in the image capture stage, the CPU 31 may refer to the weighting coefficient pattern of the coefficient template to set a timing, and may actually perform flash light emission control at the set timing during the continuous frame image capture in step F15 shown in FIG. 5.

6. Image Capture Operation at Fixed Frame Rate

In an image capture apparatus such as a digital video camera or a digital still camera, the incident light fluxes entering image capture elements and the electric charge accumulation period are controlled to adjust the exposure time.

For example, in video cameras, generally, images are continuously shot at constant exposure periods according to a frame rate. However, a high-brightness subject may be captured using an electronic shutter that provides an exposure time shorter (for example, $\frac{1}{250}$ seconds) than an exposure time defined by the frame rate (for example, about $\frac{1}{60}$ seconds for 60 frames per second (fps)).

In this case, no recording is performed for a time equal to a time obtained by subtracting the actual exposure time of the electronic shutter from the exposure time defined by the frame rate. This may result in a moving image including jaggy. In order to prevent the production of such a moving image, exposure control is usually performed. However, unless the moving image looks "jaggy", image capture is generally performed using the electronic shutter for an electronic charge accumulation time shorter than the exposure time defined by the frame rate.

Here, a consideration will be given of, as the combination-mode image capture, the capture of consecutive frames of image data in the image capture apparatus 1 of the present embodiment.

Figure 24A:
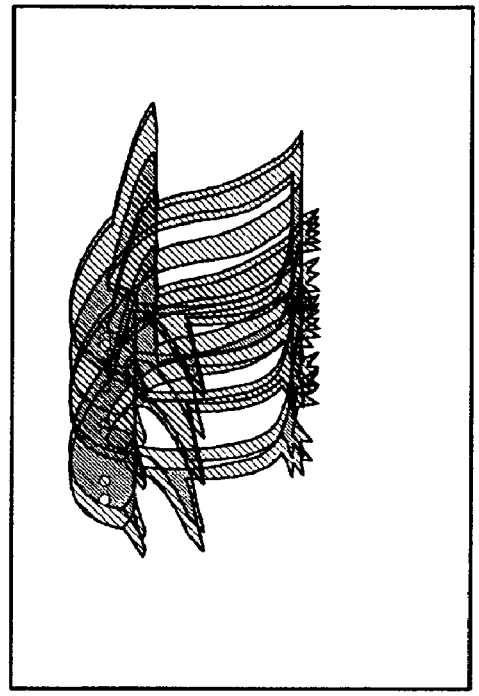
FIGS. 24A to 24D are diagrams showing combined images obtained with and without using an electronic shutter according to the embodiment.
Figure 24B:
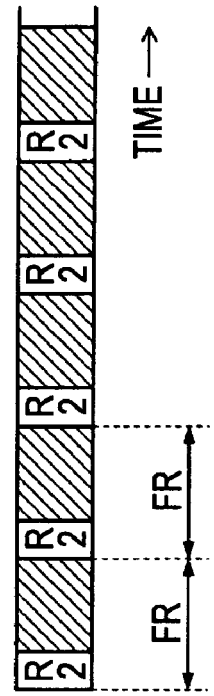
Figure 24C:
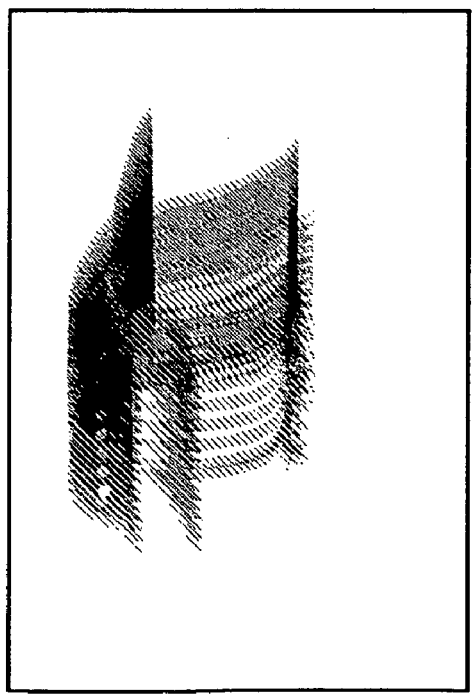
Figure 24D:
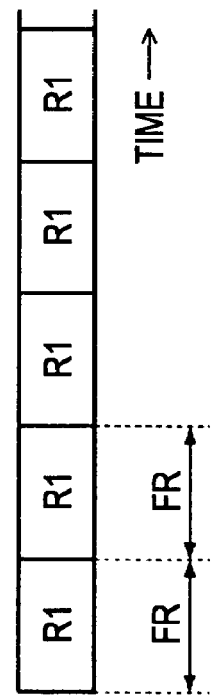

FIGS. 24B and 24D show the capture of consecutive frames at a fixed frame rate during image capture, where a period of one frame is FR.

FIG. 24B shows the case without using the electronic shutter function in the frame periods FR, and an exposure period of image capture elements is R1, where R1 is substantially equal to FR. That is, the image capture elements are continuously exposed to light within the frame periods, except for a minimum period necessary for electric charge transfer caused by the exposure. In the following description, the small amount of period during which the image capture elements are not exposed to light due to the electric charge transfer is ignored for simplicity of description.

FIG. 24D shows a situation in which automatic exposure adjustment is performed using the electronic shutter function when it is necessary to reduce the amount of exposure because of the increase in the subject brightness. In this case, the exposure time within the frame period FR is shortened as indicated by R2. A period indicated by hatching is a period during which exposure is not performed.

FIGS. 24A and 24C show examples of a combined images obtained when, for example, the continuous frame capture as shown in FIGS. 24B and 24D is performed using the combination process described above. The combined images shown in FIGS. 24A and 24C are obtained when the long-time exposure effect is achieved by assigning an equal weighting coefficient to image data of a plurality of frames.

A combined image that is based on image data captured without using the electronic shutter function, as shown in FIG. 24B, results in a smooth long-time exposure effect image, as shown in FIG. 24A.

On the other hand, a combined image that is based on image data captured using the electronic shutter function, as shown in FIG. 24D, results in a non-smooth long-time exposure effect image, as shown in FIG. 24C.

This is because information regarding subject images is not obtained for the non-exposure periods indicated by hatching.

Here, an exposure control operation in a case where, as shown in FIG. 24D, automatic exposure adjustment is performed using the electronic shutter function will be described with reference to FIGS. 25A to 25D.

The image capture apparatus 1 can perform exposure adjustment using the aperture mechanism and/or ND filter mechanism in the aperture/ND filter mechanism 22, the electronic shutter function executed by controlling the operation of the image capture element unit 23 using the timing generation circuit 28, or variable gain to be applied by the analog signal processing unit 24 to the image capture signal obtained by the image capture element unit 23.

In FIGS. 25A and 25B, the abscissa axis represents the subject brightness level. FIG. 25A shows a period of one frame FR that is defined by the frame rate during image capture. In this case, the frame period FR is set to $\frac{1}{60}$ seconds, which is fixed regardless of the subject brightness level.

FIG. 25B shows an electronic shutter SH (exposure time with a frame period or "intra-frame exposure time") and a gain level G. FIG. 25D schematically shows operation states of the aperture mechanism and the ND filter mechanism.

FIG. 25C shows exposure control methods corresponding to changes in the subject brightness level.

In a region having the lowest subject brightness level (region A), exposure adjustment is performed using the aperture mechanism. Specifically, the amount of incident light is adjusted by changing the amount of opening of the aperture mechanism.

In a region B where it is difficult to adjust the amount of incident light using only the aperture mechanism, both the aperture mechanism and the ND filter mechanism are used. Specifically, the amount of incident light is adjusted by changing the amount of opening of the aperture mechanism and the amount of incident light flux entering the ND filter mechanism.

In a region C having too high subject brightness level to adjust the amount of incident light using only the aperture mechanism and the ND filter mechanism, the electronic shutter function is used. For example, control is performed using the electronic shutter function so that the intra-frame exposure time SH, which is initially set to $\frac{1}{60}$ seconds, is reduced as the subject brightness level is increased. For example, the intra-frame exposure time SH is controlled so as to be reduced down to $\frac{1}{500}$ seconds.

A region D is a brightness region having an extraordinarily high subject brightness level, where it is difficult to perform exposure adjustment even using the electronic shutter function. In the region D, the gain level G is changed.

When the frame rate is fixed, for example, the image capture apparatus 1 may perform exposure adjustment control as described above. Then, the electronic shutter function is used when the subject brightness level is within the region C. In this state, image capture is performed, thereby causing the situation shown in FIGS. 24C and 24D described above. Thus, a non-smooth combined image with the long-time exposure effect is obtained.

Accordingly, the image capture apparatus of the present embodiment is configured to perform exposure adjustment control as shown in FIGS. 26A to 26D in a case where at least combination-mode image capture is to be performed (that is, in a case where continuous frame capture in step F15 shown in FIG. 5 is to be performed).

As in FIGS. 25A, 25B, 25C, and 25D, FIGS. 26A, 26B, 26C, and 26D show the frame period FR (which is set to ¹⁄₆₀seconds), the gain level G, the exposure time SH defined by an electronic shutter, exposure control methods, and operation states of the aperture mechanism and the ND filter mechanism, where the abscissa axis represents the subject brightness level.

In a region A having the lowest subject brightness level, exposure adjustment is performed using the aperture mechanism. Specifically, the amount of incident light is adjusted by changing the amount of opening of the aperture mechanism.

In a region B where it is difficult to adjust the amount of incident light using only the aperture mechanism, both the aperture mechanism and the ND filter mechanism are used. Specifically, the amount of incident light is adjusted by changing the amount of opening of the aperture mechanism and the amount of incident light flux entering the ND filter mechanism.

In a region C having too high subject brightness level to perform adjustment using only the aperture mechanism and the ND filter mechanism, the adjustment is performed by variably controlling the gain level G without using the electronic shutter function.

Since gain adjustment may cause electronic noise to result in a captured image that lacks gradations or fineness, desirably, the gain adjustment involves approaches such as setting a limit or performing a noise reduction process.

Only in a region D having an extraordinarily high subject brightness level, which will not be addressed by changing the gain level up to the limit, exposure adjustment is performed using the electronic shutter function.

Figure 27:
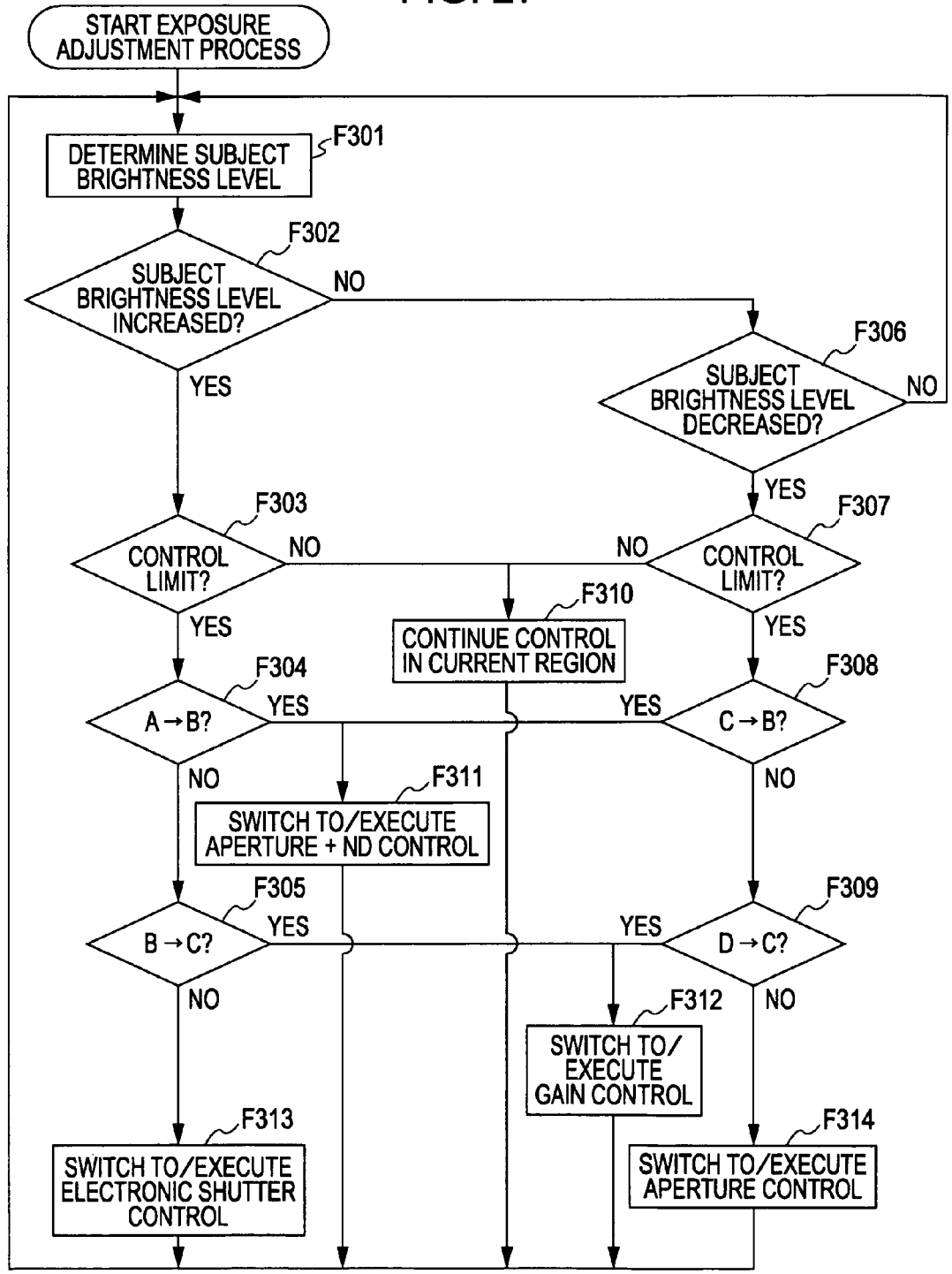
FIG. 27 is a flowchart showing exposure adjustment control using preferentially functions other than the electronic shutter according to the embodiment.

In order to perform exposure adjustment as described above, in the image capture process in step F15 shown in FIG. 5 described above, the CPU 31 (image capture control unit 51) performs an exposure adjustment process shown in FIG. 27. The process shown in FIG. 27 is continuously performed for a period during which frames are continuously captured.

In step F301, the CPU 31 determines the subject brightness level. For example, the CPU 31 obtains exposure amount information (such as average brightness information) regarding the frame currently being captured and processed in the camera DSP 4, which is calculated by the image signal processing unit 41, and compares it with the exposure amount information regarding the preceding frame to determine whether the subject brightness level has been increased or reduced.

If it is determined that no change has occurred in the subject brightness level, the CPU 31 returns to step F301 through steps F302 and F306 and determines the subject brightness level of a next frame.

If it is determined that the subject brightness level has been increased, the CPU 31 proceeds from step F302 to step F303 and determines whether or not the exposure adjustment method of the current region has reached its control limit. Specifically, it is checked whether or not the current increase of the subject light intensity corresponds to one of the increases from the region A to the region B, from the region B to the region C, and from the region C to the region D shown in FIG. 26C.

If the exposure adjustment method of the current region has not reached its control limit, the CPU 31 proceeds to step F310 and addresses the increase of the subject brightness level using the current exposure adjustment method.

Specifically, if the current region is the region A, the amount of opening of the aperture mechanism is reduced. If the current region is the region B, the amount of incident light is reduced using a combination of the aperture mechanism and the ND filter mechanism. If the current region is the region C, control is performed so that the gain level is reduced. If the current region is the region D, control is performed so that the intra-frame exposure time is shortened using the electronic shutter function.

If the exposure adjustment method of the current region has reached its control limit, the process branches in steps F304 and F305.

Specifically, if the subject brightness level has been increased with the transition from the region A to the region B, the CPU 31 proceeds to step F311. Then, the CPU 31 switches from the exposure adjustment using only the aperture mechanism to the exposure adjustment using both the aperture mechanism and the ND filter mechanism, and performs control to address the increase of the subject brightness level.

If the subject brightness level has been increased with the transition from the region B to the region C, the CPU 31 proceeds to step F312. Then, the CPU 31 switches from the exposure adjustment using both the aperture mechanism and the ND filter mechanism to the exposure adjustment using variable gain levels, and performs control to address the increase of the subject brightness level.

If the subject brightness level has been increased with the transition from the region C to the region D, the CPU 31 proceeds to step F313. Then, the CPU 31 switches from the exposure adjustment using variable gain levels to the exposure adjustment using the electronic shutter function, and performs control to address the increase of the subject brightness level.

If it is determined as a result of the determination in step F301 that the subject brightness level has been reduced, the CPU 31 proceeds from step F302 to step F306 and determines whether or not the exposure adjustment method of the current region has reached its control limit. Specifically, it is checked whether or not the current reduction of the subject light intensity corresponds to one of the reductions from the region B to the region A, from the region C to the region B, and from the region D to the region C shown in FIG. 26C.

If the exposure adjustment method of the current region has not reached its control limit, the CPU 31 proceeds to step F310 and addresses the reduction of the subject brightness level using the current exposure adjustment method.

Specifically, if the current region is the region A, the amount of opening of the aperture mechanism is increased. If the current region is the region B, the amount of incident light is increased using a combination of the aperture mechanism and the ND filter mechanism. If the current region is the region C, control is performed so that the gain level is increased. If the current region is the region D, control is performed so that the intra-frame exposure time is increased using the electronic shutter function.

If the exposure adjustment method of the current region has reached its control limit, the process branches in steps F308 and F309.

Specifically, if the subject brightness level has been reduced with the transition from the region C to the region B, the CPU 31 proceeds to step F311. Then, the CPU 31 switches from the exposure adjustment using variable gain levels to the exposure adjustment using both the aperture mechanism and the ND filter mechanism, and performs control to address the reduction of the subject brightness level.

If the subject brightness level has been reduced with the transition from the region D to the region C, the CPU 31 proceeds to step F312. Then, the CPU 31 switches from the exposure adjustment using the electronic shutter function to the exposure adjustment using variable gain levels, and performs control to address the reduction of the subject brightness level.

If the subject brightness level has been reduced with the transition from the region B to the region A, the CPU 31 proceeds to step F314. Then, the CPU 31 switches from the exposure adjustment using both the aperture mechanism and the ND filter mechanism to the exposure adjustment using only the aperture mechanism, and performs control to address the reduction of the subject brightness level.

The CPU 31 performs such processes to execute the exposure adjustment shown in FIGS. 26A to 26D.

Specifically, the CPU 31 causes the image capture system 2 to capture a plurality of frames of image data having continuity in time at a fixed frame rate, and performs exposure adjustment control according to the subject brightness level during the capture by performing exposure adjustment control using exposure adjustment functions (the aperture mechanism, the ND filter mechanism, and gain level control) preferentially to the electronic shutter function.

Such exposure adjustment control is performed in the image capture process in step F15 shown in FIG. 5, that is, the electronic shutter function is not used as much as possible. Thus, the image capture operation as shown in FIG. 24B is realized in most cases.

In accordance with the subsequent combination process, as shown in FIG. 24A, a smooth image, which is comparable to an image actually captured using long-time exposure, can be obtained. In particular, in the case of capturing an image of a moving subject, a smooth long-time exposure image can be obtained.

This operation is performed on the assumption of, in particular, image capture at a fixed frame rate, which is suitable for a combination of combination-mode image capture and capture of a moving-image.

In a case where, for example, a plurality of frames are extracted from moving-image data recorded as a result of the capture and are used in a combination process, the exposure adjustment operation described above can be performed to obtain image data satisfying both conditions of appropriate moving-image data captured at a fixed frame rate and image data suitable for a combination process.

While the electronic shutter function is used in the region D, the region D is a high-brightness region which hardly occurs in a usual case, and the electronic shutter function will not be used in most cases. Thus, a smooth combined image is obtained as a result of combination.

However, if continuous frame capture is performed in the combination-mode image capture in step F15, the use of the electronic shutter function may be prohibited. That is, in the region D shown in FIG. 26C, exposure adjustment may be no longer performed or the gain level may be further reduced to perform the adjustment.

The exposure adjustment control described above may also be performed in the image capture in step F16 as well in as step F15, or the exposure adjustment control shown in FIGS. 25A to 25D may be performed in step F16.

While three exposure adjustment factors (the aperture mechanism, the ND filter mechanism, and variable gain) other than the electronic shutter function are used in FIGS. 26 and 27, all the three factors may not necessarily be used. For example, the ND filter mechanism may not be used.

In the image capture at a fixed frame rate, the following exemplary image capture operation can also be performed.

A plurality of frames of image data having continuity in time may be captured at a fixed frame rate by, using the electronic shutter function, continuously executing divisional exposure within an exposure period defined by the fixed frame rate and combining image data of the plurality of frames obtained by the divisional exposure to produce image data of one frame.

This operation will now be described with reference to FIGS. 28A to 29C.

As described above, exposure adjustment control without using an electronic shutter may cause electric charge accumulation in image capture elements such as CCD elements in excess of the limit thereof, resulting in saturation.

In this case, saturation of electric charge occurs in such a manner that electric charge overflows, and an overexposed image that is in a "whiteout condition" may be formed. Thus, a favorable image will not be obtained.

It is therefore difficult to return such an electric-charge-overflowing image into the original state to obtain a favorable combined image.

In this case, for example, image capture may be performed using the electronic shutter function so that the electric charge accumulated in image capture elements such as CCD elements may not exceed a limit (saturation may not be occurred).

Figure 28A:
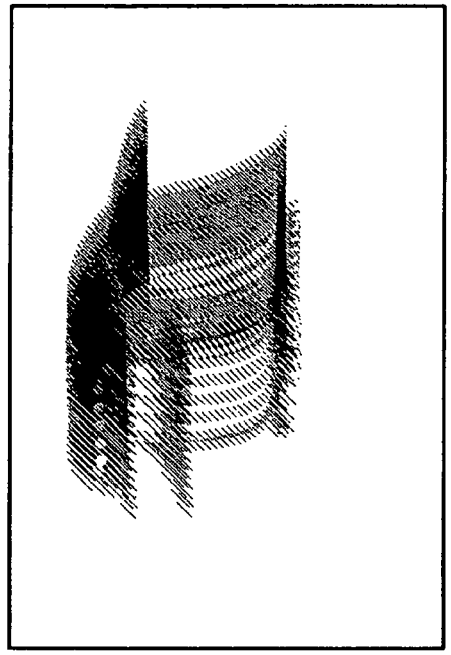
FIGS. 28A to 28D are diagrams showing combined images obtained using divisional exposure at a fixed frame rate according to the embodiment.
Figure 28B:
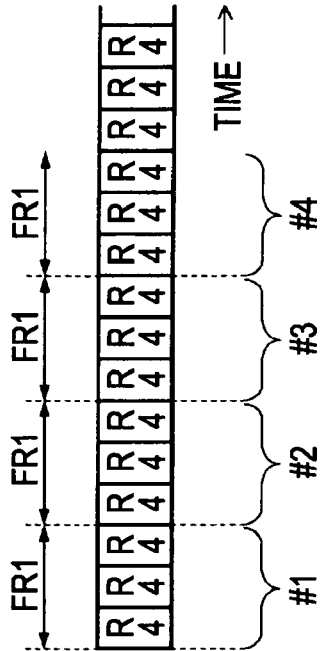

However, if the electronic shutter function is used in a usual manner, a combined image captured with a discontinuous exposure time as shown in FIGS. 28A and 28B may be obtained. For example, as shown in FIG. 28B, an exposure period R3 and a non-exposure period (hatched portion) exist in a period of one frame FR1. Due to the lack of information regarding the subject in the non-exposure periods, a non-smooth combined image as shown in FIG. 28A may be obtained (which is similar to the case shown in FIGS. 24C and 24D described above).

Figure 28C:
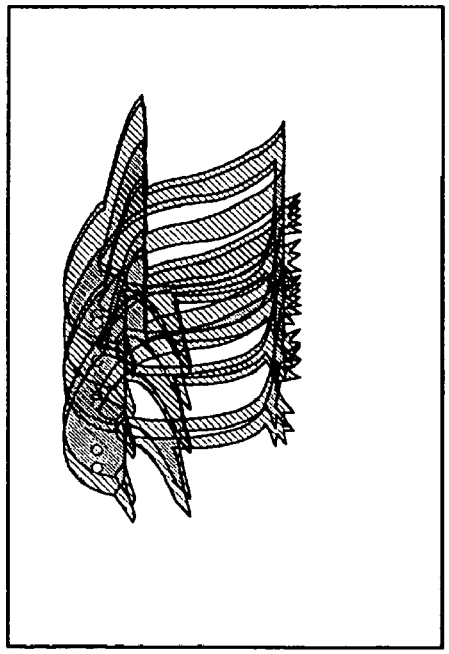
Figure 28D:
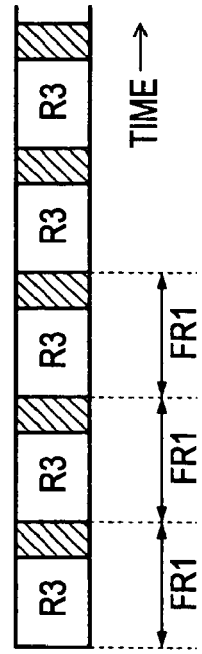

Accordingly, as shown in FIG. 28D, in frame periods FR1 at a specific frame rate, for example, divisional exposure is performed in a manner indicated by exposure periods R4 so that no non-exposure periods may occur.

In this case, in the image capture element unit 23, for example, electric charge is transferred every three exposure periods R4 into which the frame period FR1 is divided, and resulting captured image data is stored in, for example, the camera DSP 4. In the image capture element unit 23, exposure resumes immediately after the transfer of the electric charge and exposure in the exposure periods R4 is performed in a similar manner.

Then, three captured image data elements each corresponding to the exposure period R4 are combined in the camera DSP 4 to produce image data of one frame.

With this operation, captured image data of each frame (#1, #2, . . . ,) at a fixed frame rate is obtained. Furthermore, captured image data with saturation removed in the image capture element unit 23 and having no lack of information caused by non-exposure periods can be obtained.

Therefore, when the image data of the plurality of frames (#1, #2, . . . ) is used in a combination process, a smooth long-time exposure effect image shown in FIG. 28C can be obtained.

In this operation, the divisional exposure periods may be set in various ways. Each of the frame periods FR1 may be divided equally or unequally. In practice, adaptive control may be performed, taking the fixed frame rate, the subject brightness level obtained during the image capture, the saturation time of electric charge in the image capture element unit 23, or the like into account.

For example, in a case where the camera DSP 4 combines a plurality of captured image data elements obtained using divisional exposure to generate one frame of image data, it is desirable that weighted combination be performed according to the divisional exposure time.

Figure 29A:
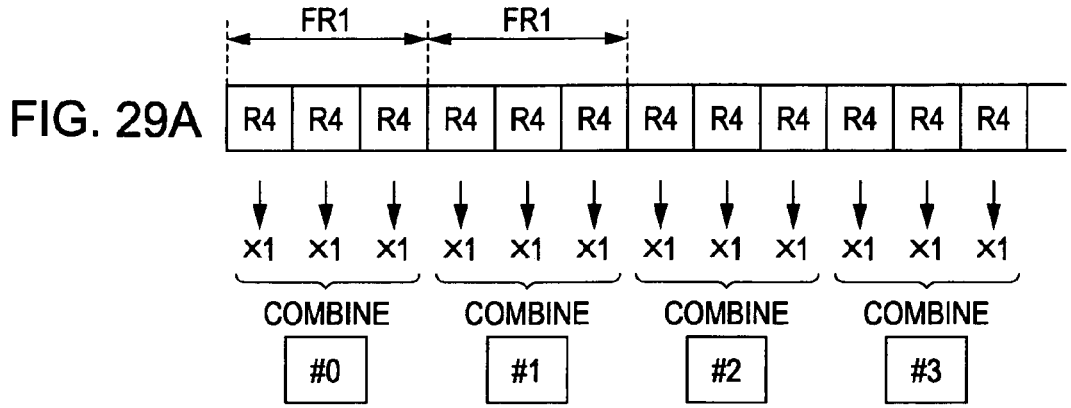
FIGS. 29A to 29C are diagrams showing the generation of frames using divisional exposure at a fixed frame rate according to the embodiment.

FIG. 29A shows divisional exposure in each exposure period R4, where a period of one frame FR1 is equally divided into three parts.

In this case, as shown in FIG. 29A, three captured image data elements forming one frame are combined with the same weight (power of one) to generate captured image data of respective frames (#0, #1, #2, . . . ).

Figure 29B:
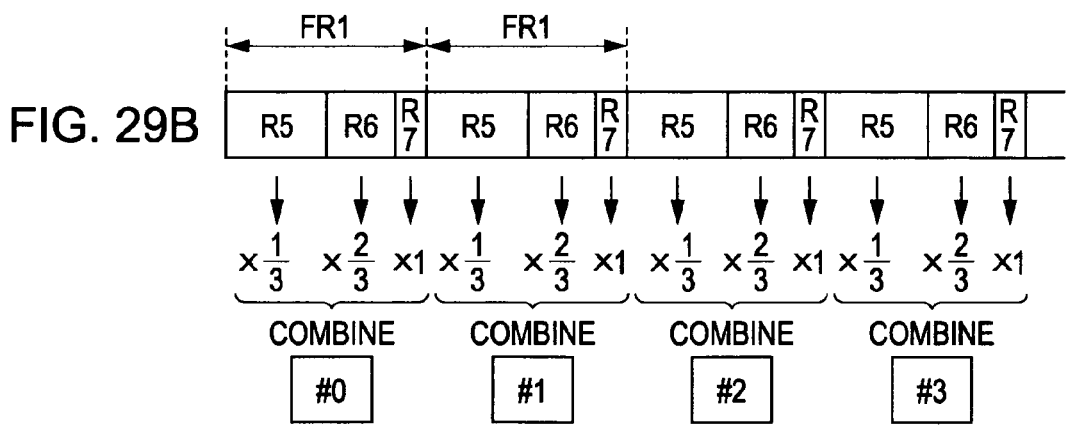

FIG. 29B shows an example of divisional exposure in exposure periods R5, R6, and R7, where a period of one frame FR1 is unequally divided into three parts. If the periods R5, R6, and R7 has a ratio of 3:2:1, combination is performed so that a weight of ⅓ is applied to the image data elements obtained in the exposure periods R5, a weight of ⅔ to the image data elements obtained in the exposure periods R6, and a weight of 1 to the image data elements obtained in the exposure periods R7.

Figure 29C:
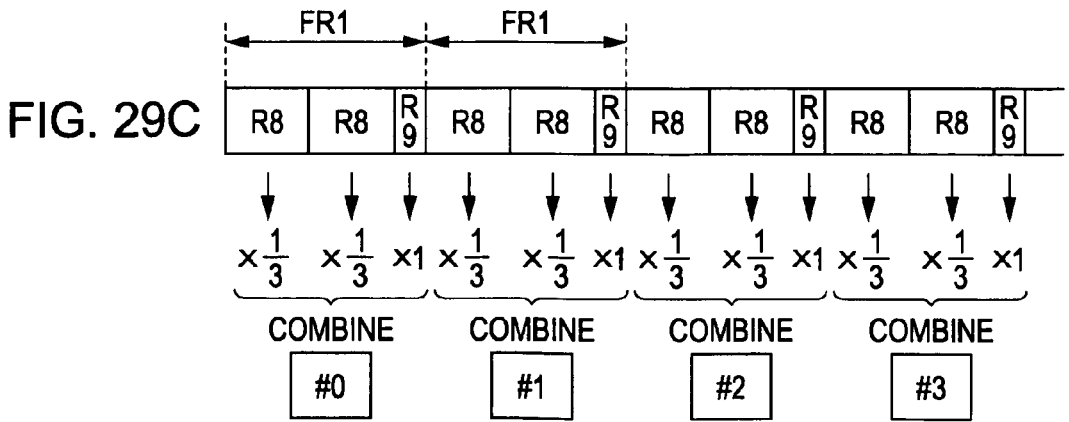

FIG. 29C shows an example of divisional exposure in exposure periods R8 and R9, where a period of one frame FR1 is partially unequally divided into three parts. If the periods R8 and R9 has a ratio of 3:1, combination is performed so that a weight of ⅓ is applied to the two image data elements obtained in the exposure periods R8 and a weight of 1 to the image data element obtained in the exposure period R9.

7. Image Capture Operation at Variable Frame Rate

An exemplary image capture operation taking variable frame rates into account will now be described.

Figure 30A:
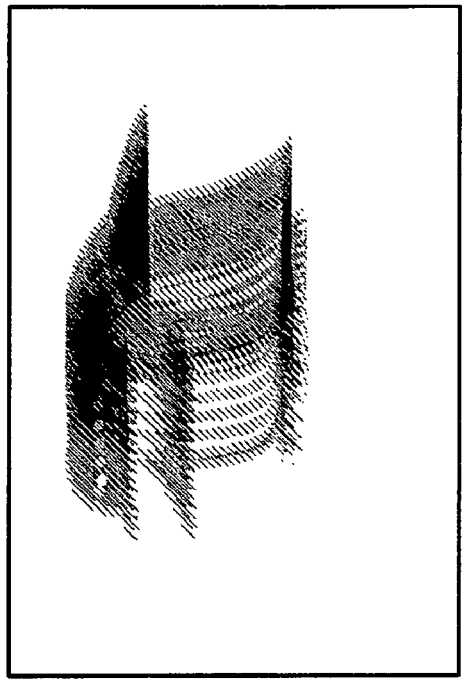
FIGS. 30A to 30D are diagrams showing combined images obtained using continuous and discontinuous exposure times according to the embodiment.

For example, in the image capture in step F15 shown in FIG. 5, if the electronic shutter function is used for automatic exposure adjustment according to the subject brightness level, as described above, a non-smooth combined image is obtained when a combination process is performed using a plurality of frames of image data obtained by the image capture. FIGS. 30A and 30B show a combined image captured with a discontinuous exposure in which, for example, a period of one frame is FR1 and exposure periods R3 within one frame is defined using the electronic shutter function. When combination is performed using image data obtained using such image capture, a combined image as shown in FIG. 30A is obtained due to the lack of information in non-exposure periods indicated by hatching.

Here, it is assumed that in the combination-mode image capture, a fixed frame rate is not necessarily used to obtain a plurality of consecutive frames of image data used in a combination process. Then, image capture may be performed in a manner shown in FIG. 30D. Specifically, a period of one frame FR1 is not fixed, and the period of one frame is shortened as the subject brightness level is increased (that is, variable frame rates), and exposure is continuously performed for the period of one frame.

Figure 30C:
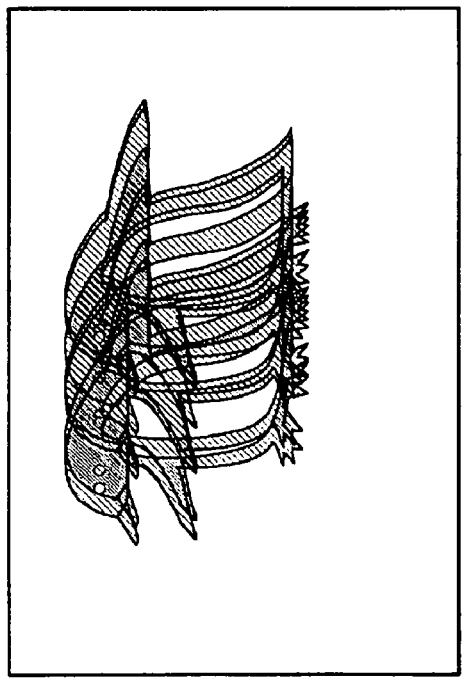
Figure 30B:
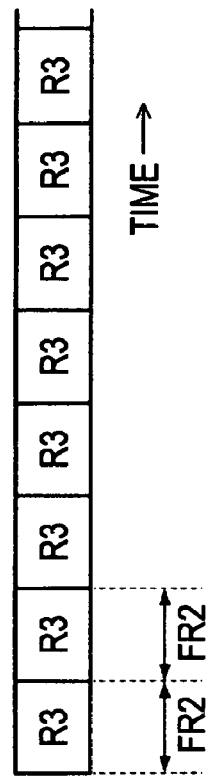
Figure 30D:
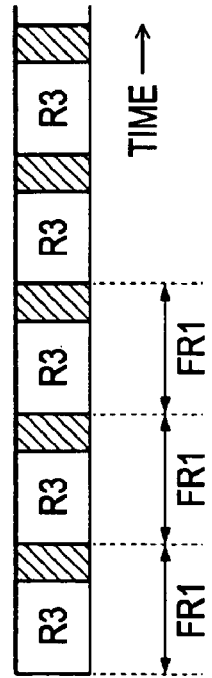

In FIG. 30D, the frame rate is changed so that a period of one frame FR2 can be equal to the exposure period R3, and an exposure adjustment effect equivalent to that shown in FIG. 30B is substantially achieved. Then, in FIG. 30D, because of no presence of non-exposure periods in the frame period FR2, image data of each frame is recorded without lack of subject information. Image data obtained by such image capture is used to perform combination, resulting in a smooth long-time exposure effect combined image shown in FIG. 30C.

Specifically, the CPU 31 (image capture control unit 51), when causing the image capture system 2 to capture a plurality of frames of image data having continuity in time in step F15 shown in FIG. 5, performs control to change a frame rate in accordance with a change in the subject brightness level during the capture. Then, the plurality of frames of image data having continuity in time captured by the image capture operation are used as combination-use image data to perform a combination process. Thus, a smooth long-time exposure effect image is obtained as a result of generating a combined image as a still image.

FIGS. 31A to 31C show an example of the relationship between changes in the subject brightness level and frame rates.

It is now assumed that, as shown in FIG. 31A, the subject brightness level is gradually increased starting from time t0 and becomes substantially constant after time t1. In this case, automatic exposure adjustment is performed by changing the frame rate to control periods of one frame in a manner shown in FIG. 31B. Specifically, exposure adjustment is performed so as to gradually shorten the periods of one frame in order of FR1, FR2, FR3, . . . for the period of time t0 to time t1 during which the subject brightness level is gradually increased. Because of no presence of non-exposure periods in the period of one frame, the one-frame exposure periods are shortened in order of R1, R2, R3, . . . in accordance with the length of the one frame period.

If no change occurs in the subject brightness level after time t1, for example, the subsequent periods may be maintained at the frame period FR8 (exposure period R8).

FIGS. 32A to 32D show an exemplary operation in a case where variable frame rate control as described above is used for automatic exposure adjustment.

Figures 32A, 32B, 32C, 32D:
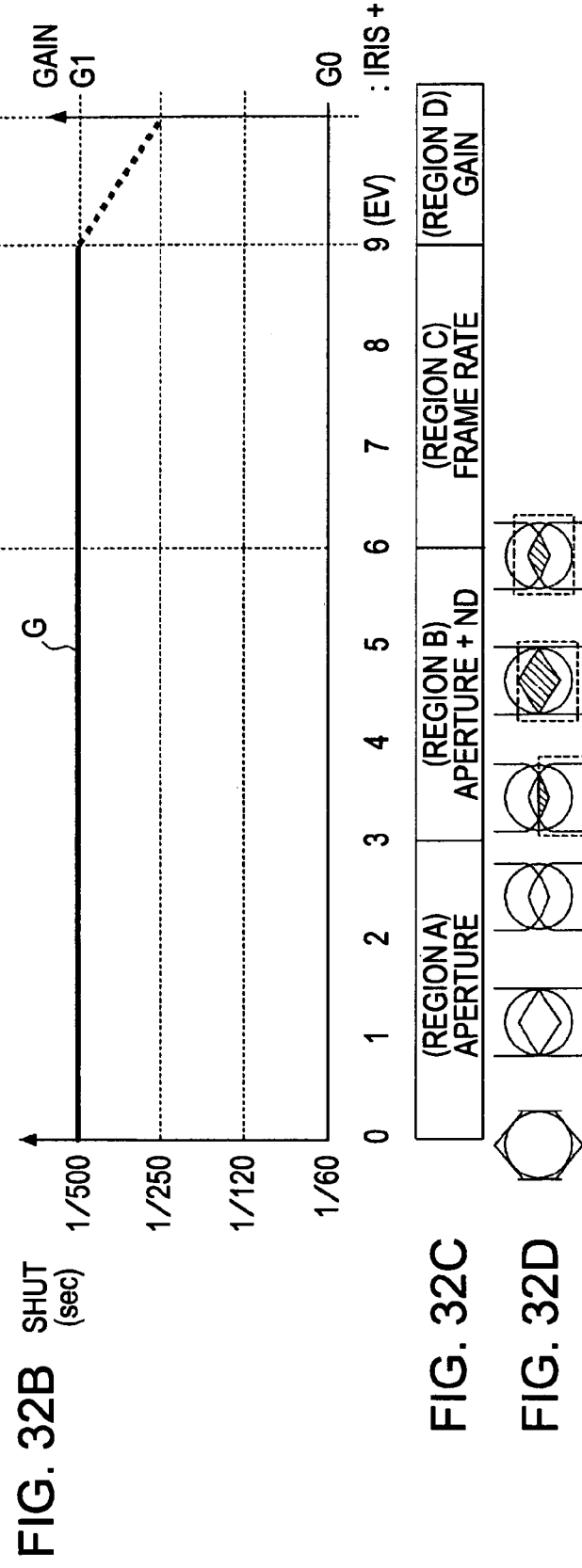
FIGS. 32A to 32D are diagrams showing exposure adjustment methods using variable frame rates according to the embodiment.

In FIGS. 32A, 32B, 32C, and 32D, the abscissa axis presents the subject brightness level. FIG. 32A shows the frame cycle FR, FIG. 32B shows the gain level G, FIG. 32C shows exposure control methods, and FIG. 32D shows operation states of the aperture mechanism and the ND filter mechanism.

Note that the electronic shutter function is not shown because it is assumed that exposure is performed throughout one period (except for a short period for electric charge transfer) and the exposure time within a period of one frame is not shorter than the period of one frame.

In a region A having the lowest subject brightness level, exposure adjustment is performed using the aperture mechanism. Specifically, the amount of incident light is adjusted by changing the amount of opening of the aperture mechanism.

In a region B where it is difficult to adjust the amount of incident light using only the aperture mechanism, both the aperture mechanism and the ND filter mechanism are used. Specifically, the amount of incident light is adjusted by changing the amount of opening of the aperture mechanism and the amount of incident light flux entering the ND filter mechanism.

In a region C having too high subject brightness level to perform adjustment using only the aperture mechanism and the ND filter mechanism, the adjustment is performed by variably controlling the frame rate. Specifically, a period of one frame FR is reduced as the subject brightness level is increased. For example, the frame period FR is set to 1/60seconds when the subject brightness level is low, and is controlled to be variably reduced to 1/500seconds as the subject brightness level is increased.

Only in a region D having an extraordinarily high subject brightness level, which will not be addressed by changing the frame period FR to 1/500seconds, exposure adjustment is performed using variable gain control.

Figure 33:
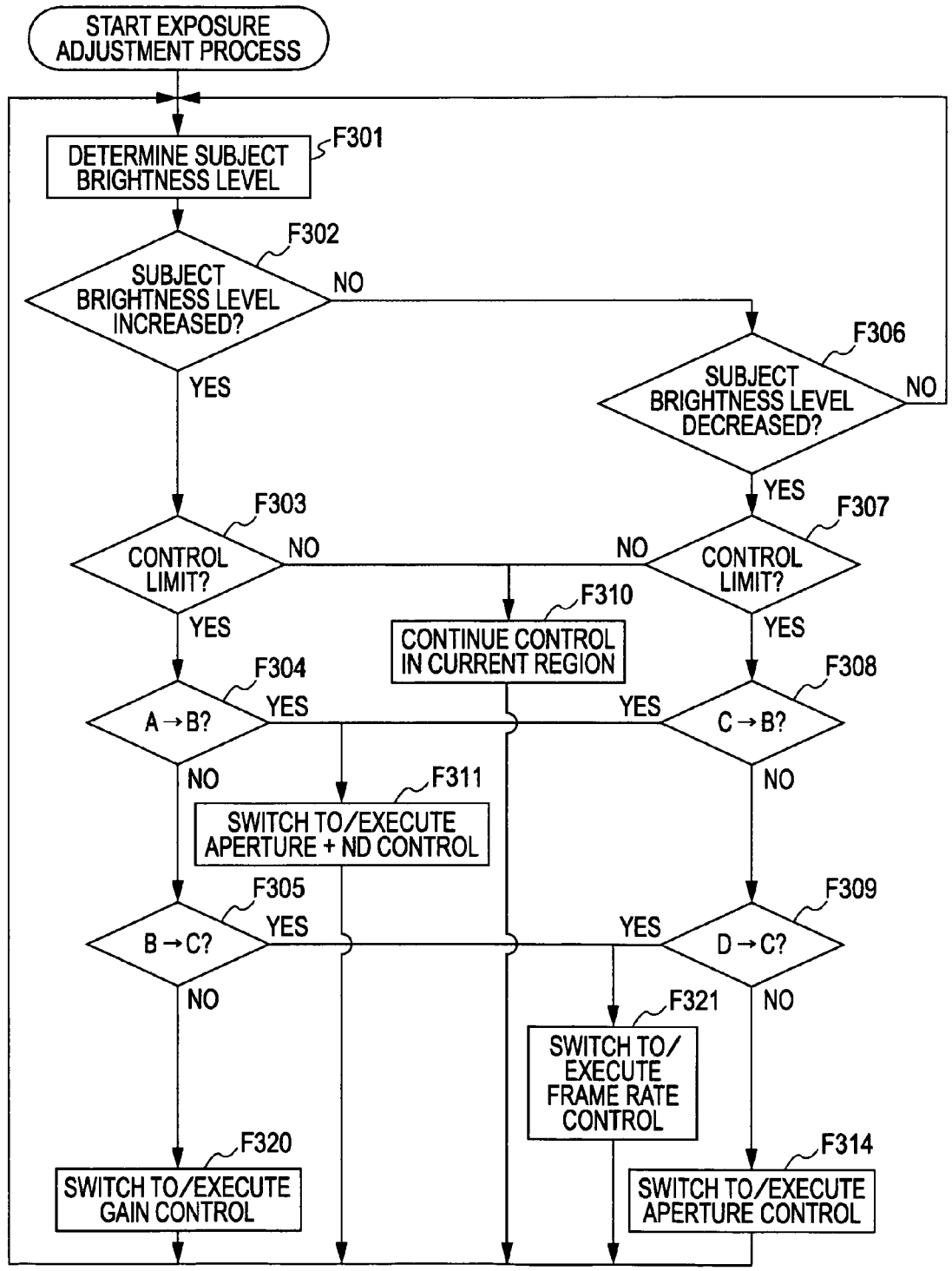
FIG. 33 is a flowchart showing exposure adjustment control using variable frame rates according to the embodiment.

In order to perform exposure adjustment as described above, in the image capture in step F15 shown in FIG. 5 described above, the CPU 31 (image capture control unit 51) performs an exposure adjustment process shown in FIG. 33. The process shown in FIG. 33 is continuously performed for a period during which frames are continuously captured.

Steps F301 to F311 and F314 are similar to those shown in FIG. 27 described above. The processing of step F320 is performed instead of F313 shown in FIG. 27, and the processing of step F321 is performed instead of step F312 shown in FIG. 27. Since a portion of the specific processing steps is different such as step F310, all the processing steps will be described hereinafter.

In step F301, the CPU 31 determines the subject brightness level. For example, the CPU 31 obtains exposure amount information (such as average brightness information) regarding the frame currently being captured and processed in the camera DSP 4, which is calculated by the image signal processing unit 41, and compares it with the exposure amount information regarding the preceding frame to determine whether the subject brightness level has been increased or reduced.

If it is determined that no change has occurred in the subject brightness level, the CPU 31 returns to step F301 through steps F302 and F306 and determines the subject brightness level of a next frame.

If it is determined that the subject brightness level has been increased, the CPU 31 proceeds from step F302 to step F303 and determines whether or not the exposure adjustment method of the current region has reached its control limit. Specifically, it is checked whether or not the current increase of the subject light intensity corresponds to one of the increases from the region A to the region B, from the region B to the region C, and from the region C to the region D shown in FIG. 32C.

If the exposure adjustment method of the current region has not reached its control limit, the CPU 31 proceeds to step F310 and addresses the increase of the subject brightness level using the current exposure adjustment method.

Specifically, if the current region is the region A, the amount of opening of the aperture mechanism is reduced. If the current region is the region B, the amount of incident light is reduced using a combination of the aperture mechanism and the ND filter mechanism. If the current region is the region C, control is performed so that the frame rate is changed to shorten the period of one frame. If the current region is the region D, control is performed so that the gain level is reduced.

If the exposure adjustment method of the current region has reached its control limit, the process branches in steps F304 and F305.

Specifically, if the subject brightness level has been increased with the transition from the region A to the region B, the CPU 31 proceeds to step F311. Then, the CPU 31 switches from the exposure adjustment using only the aperture mechanism to the exposure adjustment using both the aperture mechanism and the ND filter mechanism, and performs control to address the increase of the subject brightness level.

If the subject brightness level has been increased with the transition from the region B to the region C, the CPU 31 proceeds to step F321. Then, the CPU 31 switches from the exposure adjustment using both the aperture mechanism and the ND filter mechanism to the exposure adjustment using variable frame rates, and performs control to address the increase of the subject brightness level. If the subject brightness level has been increased with the transition from the region C to the region D, the CPU 31 proceeds to step F320. Then, the CPU 31 switches from the exposure adjustment using variable frame rates to the exposure adjustment using variable gain levels, and performs control to address the increase of the subject brightness level.

If it is determined as a result of the determination in step F301 that the subject brightness level has been reduced, the CPU 31 proceeds from step F302 to step F306 and determines whether or not the exposure adjustment method of the current region has reached its control limit. Specifically, it is checked whether or not the current reduction of the subject light intensity corresponds to one of the reductions from the region B to the region A, from the region C to the region B, and from the region D to the region C shown in FIG. 32C.

If the exposure adjustment method of the current region has not reached its control limit, the CPU 31 proceeds to step F310 and addresses the reduction of the subject brightness level using the current exposure adjustment method.

Specifically, if the current region is the region A, the amount of opening of the aperture mechanism is increased. If the current region is the region B, the amount of incident light is increased using a combination of the aperture mechanism and the ND filter mechanism. If the current region is the region C, the period of one frame is increased by changing the frame rate. If the current region is the region D, control is performed so that the gain level is increased.

If the exposure adjustment method of the current region has reached its control limit, the process branches in steps F308 and F309.

Specifically, if the subject brightness level has been reduced with the transition from the region C to the region B, the CPU 31 proceeds to step F311. Then, the CPU 31 switches from the exposure adjustment using variable frame rates to the exposure adjustment using both the aperture mechanism and the ND filter mechanism, and performs control to address the reduction of the subject brightness level.

If the subject brightness level has been reduced with the transition from the region D to the region C, the CPU 31 proceeds to step F321. Then, the CPU 31 switches from the exposure adjustment using variable gain levels to the exposure adjustment using variable frame rates, and performs control to address the reduction of the subject brightness level.

If the subject brightness level has been reduced with the transition from the region B to the region A, the CPU 31 proceeds to step F314. Then, the CPU 31 switches from the exposure adjustment using both the aperture mechanism and the ND filter mechanism to the exposure adjustment using only the aperture mechanism, and performs control to address the reduction of the subject brightness level.

The CPU 31 performs such processes to execute the exposure adjustment shown in FIGS. 32A to 32D.

Specifically, the CPU 31 causes the image capture system 2 to capture a plurality of frames of image data having continuity in time, and performs exposure adjustment control according to the subject brightness level during the capture by variably controlling the frame rate as well as using the aperture mechanism, the ND filter mechanism, and gain level control to perform exposure adjustment control.

Such exposure adjustment control is performed in the image capture in step F15 shown in FIG. 5, whereby appropriate exposure adjustment can be performed according to the subject brightness level and, in addition, a plurality of frames of image data captured has no lack of information caused by non-exposure periods.

Therefore, in accordance with the subsequent combination process, as shown in FIG. 30C, a smooth image, which is comparable to an image actually captured using long-time exposure, can be obtained. In particular, in the case of capturing an image of a moving subject, a smooth long-time exposure image can be obtained.

In the region D, exposure adjustment is performed using variable gain. As described above, gain adjustment may cause electronic noise. However, the region D is a high-brightness region which hardly occurs in a usual case, and exposure adjustment using variable gain will not be performed in most cases. Thus, it can be considered that there is substantially no effect of noise caused variable gain in practice if a special technique such as a noise reduction process is not used.

The exposure adjustment control described above may also be performed in the image capture in step F16 as well as in step F15.

While three exposure adjustment factors (the aperture mechanism, the ND filter mechanism, and the variable gain) other than the variable frame rate are used in FIGS. 32 and 33, all the three factors may not necessarily be used. For example, the ND filter mechanism may not be used.

In the combination process using image data elements obtained variably controlling the frame rate as described above, preferably, weighting coefficients are assigned according to frame periods corresponding to the image data elements. Specifically, weighting coefficients that are determined as the inverse of the ratio of frame period lengths of the image data elements during the image capture are assigned to the image data elements used in the combining process to perform a combination process.

For example, as shown in FIG. 31C, when image data elements #1 to #22 obtained using variable frame rates are used as images to be combined to perform a combination process to generate combined-image data, weighting coefficients shown in FIGS. 31A to 31C are assigned. For example, if weighting coefficients to be assigned to the image data elements #8 to #22 in a frame period FR8 are 1, a weighting coefficient of ⅕ is assigned to the image data element #1, assuming that a frame period FR1 corresponding to the image data element #1 is five times as long as the frame period FR8. A weighting coefficient of 3/10 is assigned to the image data element #2, assuming that a frame period FR2 corresponding to the image data element #2 is (10/3) times as long as the frame period FR8.

In this manner, weighting coefficients that are determined as the inverse ratio are assigned to image data elements according to the lengths of the periods of one frame to generate combined-image data, and a smooth image can be produced based on the combined-image data.

In order to set such weighting coefficients in the combination process, desirably, information regarding frame rates is included in metadata to be added to each image data element during image capture.

8. Exemplary Combination-Mode Process: Frame Interpolation

Various examples applicable in the combination-mode process described above will now be described. First, frame interpolation will be described.

In the combination-mode image capture, images of a plurality of frames having continuity in time may be captured using the electronic shutter function for exposure adjustment or the like.

The electronic shutter function may be used in cases such as when the exposure adjustment method shown in FIGS. 25A to 25D is used, when a subject brightness level in the region D is obtained in the exposure adjustment method shown in FIG. 26C, and when a user performs the setting of the electronic shutter function. In such cases, as described above, a non-exposure period occurs in a frame period even though continuous frame capture is performed, resulting in lack of subject information the non-exposure period.

Further, even without using the electronic shutter function, for example, in a case where the continuous image capture in step F15 shown in FIG. 5 is not performed every frame but is performed intermittently such as every other frame, a sequence of a plurality of frames of image data having continuity in time also has lack of subject information.

In this situation, if a sequence of image data elements to be combined has lack of subject information, a combined image with non-smoothness is obtained.

However, a sequence of captured image data elements has no (or substantially no) lack of subject information if the exposure adjustment method shown in FIGS. 26A to 26D or 32A to 32D described above is used and if the continuous image capture in step F15 shown in FIG. 5 is performed for all frames.

The sequence of image data elements can be used to obtain a combined image representing smooth motion of a subject. Another demand exists for improved smoothness.

Therefore, preferably, a combination process is performed using a frame interpolation process. The frame interpolation process will be described with reference to FIGS. 34A to 35B.

Figure 34A:
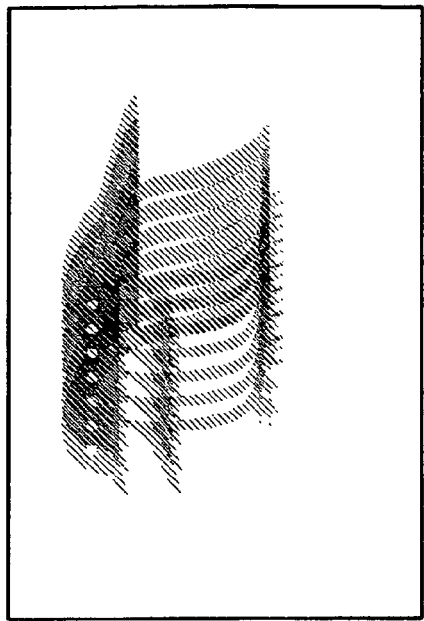
FIGS. 34A to 34D are diagrams showing combined images obtained with and without using inter-frame interpolation according to the embodiment.
Figure 34B:
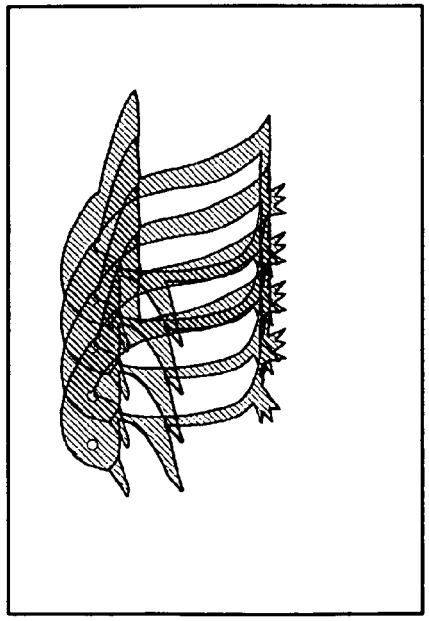
Figure 34C:
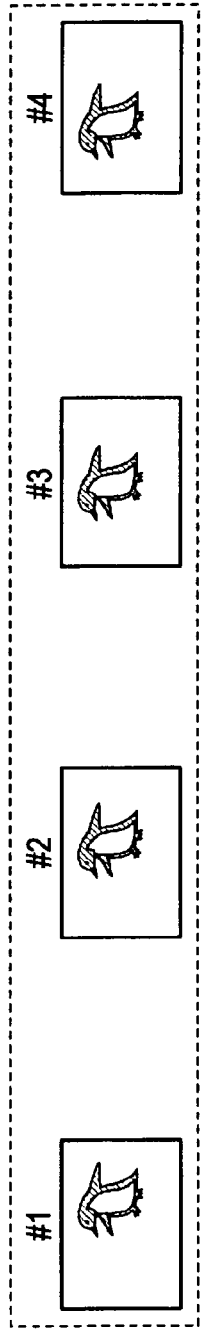

FIG. 34C shows a sequence of image data elements #1, #2, #3, and #4 that have been actually captured and recorded on the recording medium 90 or the like.

The image data elements #1, #2, #3, and #4 are combined, thereby obtaining a combined image shown in FIG. 34A. That is, a non-smooth image with the long-time exposure effect is obtained.

Figure 34D:
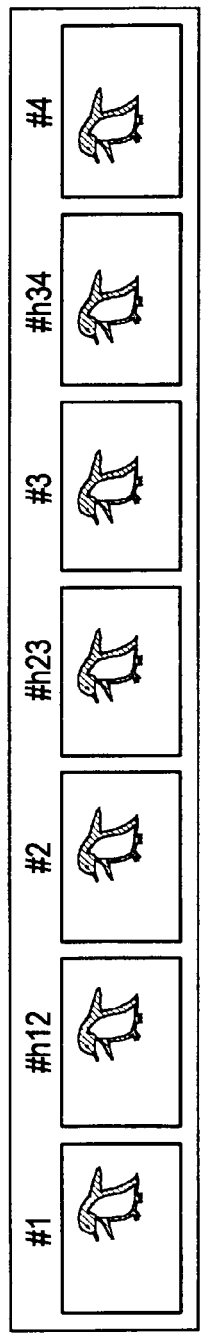

Here, an interpolation process is performed to generate interpolated frames #h12, #h23, and #h34 shown in FIG. 34D.

The interpolated frame #h12 is generated from the image data elements #1 and #2. The interpolated frame #h23 is generated from the image data elements #2 and #3. The interpolated frame #h34 is generated from the image data elements #3 and #4.

An interpolated frame can be created, using an inter-frame (inter-field) interpolation technique generally used in codec schemes such as MPEG techniques, by interpolating pixel values between two frames using spatial prediction using motion vector.

FIG. 34B shows an image obtained by combining the image data elements #1, #h12, #2, #h23, #3, #h34, and #4. A smoother combined image can be achieved by performing combination using interpolated frames in addition to frames.

In the combination process using interpolated frames in addition to frames, weighting may be performed based on metadata (for example, exchangeable image file format (Exif) data) added to each of the image data elements #1, #2, #3, and #4 according to the image capture intervals or exposure times.

Figure 35A:
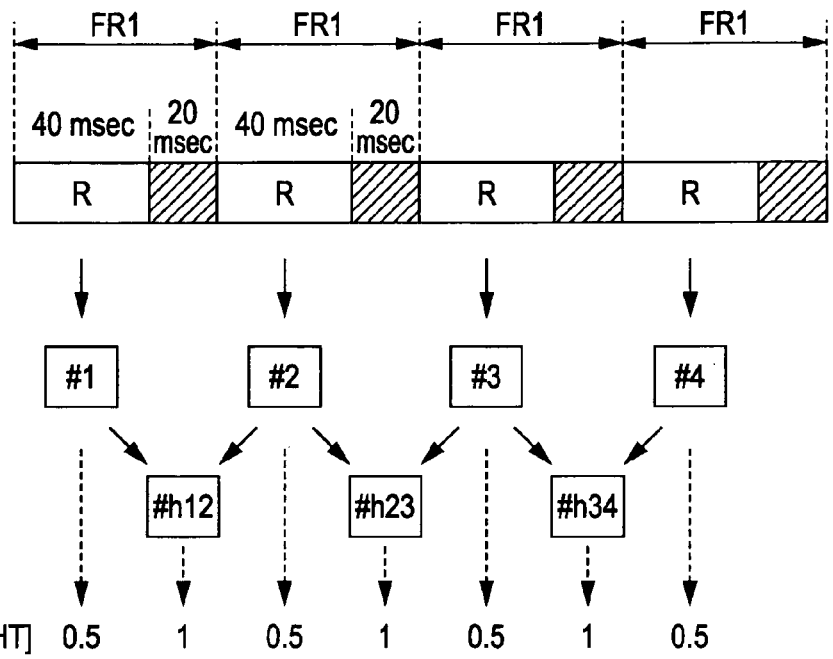
FIGS. 35A and 35B are diagrams showing inter-frame interpolation according to the embodiment.

For example, FIG. 35A shows the image capture of the image data elements #1, #2, #3, and #4 for exposure periods R of 40 msec and non-exposure periods (hatched portions) of 20 msec using the electronic shutter function, where a period of one frame FR1 is fixed.

In this case, the interpolated frames #h12, #h23, and #h34 serve to interpolate frames for the periods of 20 msec, which have not been actually captured. Frames that have been actually captured for the periods of 40 msec with correct exposure can be used to create correct images of interpolated frames.

In the combination process using the image data elements #1, #2, #3, and #4 and the interpolated frames #h12, #h23, and #h34, coefficients are assigned according to the ratio of exposure times.

For example, the image data element #1, the interpolated frame #h12, and the image data element #2 have a relationship of 2:1:2 on the time axis. According to the computation of the inverse ratio, as shown in FIG. 35A, weights of 0.5:1:0.5 are assigned. Thus, exposure times can be reproduced in accordance with the actual motion of the subject.

The weights may be computed using a sum of brightness signals of a plurality of images or using exposure or shutter speed recorded in the metadata.

Figure 35B:
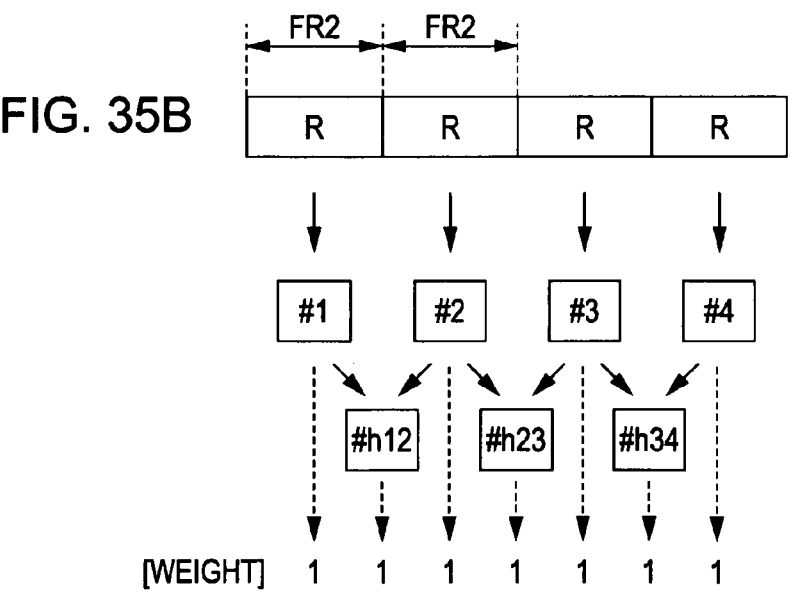

FIG. 35B shows image capture of the image data elements #1, #2, #3, and #4 without using non-exposure periods in a period of one frame FR2.

Because of no presence of non-exposure periods, the interpolated frames #h12, #h23, and #h34 are used for the purpose of obtaining a more smooth combined image. In this case, as shown in FIG. 35B, a combination process is performed by assigning an equal weight to the image data elements #1, #2, #3, and #4 and the interpolated frames #h12, #h23, and #h34.

Figure 36:
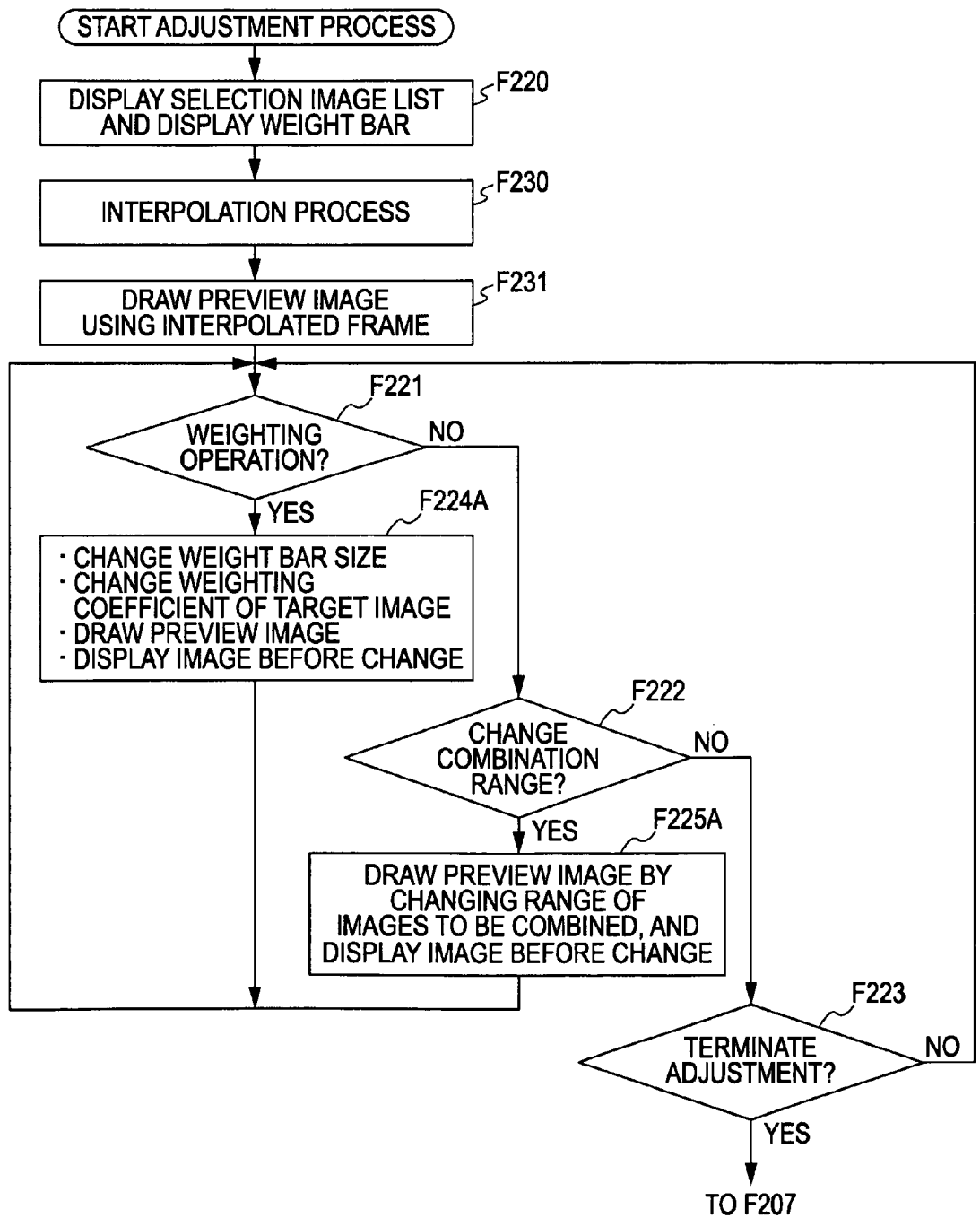
FIG. 36 is a flowchart showing an exemplary process including frame interpolation according to the embodiment.

FIG. 36 shows an exemplary process of the CPU 31, including the frame interpolation process described above.

For example, in the adjustment process in step F206 shown in FIG. 8, the CPU 31 performs a process shown in FIG. 36 instead of the example shown in FIG. 9.

In step F206 shown in FIG. 8, the CPU 31 performs the process shown in FIG. 36. First, in step F220, as in FIG. 9, the CPU 31 displays a selection image list and weight bars. For example, the combination-work image 70 is changed from the state shown in FIG. 12 to the state shown in FIG. 13.

At this time, a combined image to be displayed as a preview image in the image display area 72 is an image generated using the frame interpolation process in steps F230 and F231.

Specifically, in step F230, the CPU 31 creates interpolated frames described with reference to FIG. 34D using a sequence of image data elements in the current combination range. In step F231, the CPU 31 sets predetermined weighting coefficients in a manner described with reference to FIG. 35A or 35B to perform a combination process. Thus, a combined image displayed in the image display area 72 of the combination-work image 70 shown in FIG. 13 is, for example, a combined image obtained by performing a combination process together with a frame interpolation process.

The subsequent processing of steps F221 to F225A shown in FIG. 36 is similar to that shown in FIG. 19, and redundant descriptions thereof are omitted. However, when preview image combination is performed in steps F224A and F225A, the combination is performed using the interpolated frames generated in step F230.

Further, when a final combination process is performed in step F207 shown in FIG. 8 after the adjustment process shown in FIG. 36 is performed, the combination process is performed also using the interpolated frames used in the final stage of the adjustment process in step F206 (FIG. 36).

With the additional use of the frame interpolation process, a smoother image, which is comparable to an image actually captured using long-time exposure, can be obtained as a combined image.

In particular, when a rapidly moving subject is a target, more advantageously, smooth motion in a combined image can be represented using the frame interpolation process described above.

In the example described above, in the process shown in FIG. 36 in step F206 shown in FIG. 8, a combined image necessarily using interpolated frames is displayed as a preview image. However, in this adjustment process, image combination involving the generation and use of interpolated frames may be performed only when it is desired by a user operation.

Further, frame interpolation may not necessarily be performed in the adjustment process in step F206 shown in FIG. 8. Instead, in the final combination process in step F207, interpolated frames may be generated and used to perform image combination.

Furthermore, in the adjustment process, in the combination-work image 70, interpolated frames may be displayed on a combined image list together with original image data, as well as weight bars correspondingly, so as to be used to change weighting coefficients in a manner similar to that in the original image data or to set a combination start position/combination end position.

Alternatively, conversely, the presence of interpolated frames may be hidden from the user.

9. Exemplary Combination-Mode Processes: Flash Removal/Correction

A user may perform the combination-mode image capture (image capture in step F15 shown in FIG. 5) using a flash. In accordance with the subsequent combination process, for example, the first-curtain synchronization effect or the like can be achieved without using a flash. However, some users may perform image capture using a flash in cases such as when they wish to initially achieve the first-curtain synchronization effect or the like without changing weighting coefficients or the like in the combination work or to obtain an image representation with the use of a flash.

In such cases, however, it is necessary to determine settings according to photographer's experience and intuition, such as the flash light emission time and the amount of exposure. In practice, a user (photographer) may not necessarily obtain the desired image.

Further, after a user actually captures an image using a flash, the user may later change his or her mind and wish to generate a combined image using images captured without using a flash.

Moreover, the actual amount of flash may be insufficient due to the performance of the image capture apparatus or the user's settings.

It is therefore desirable for a user to be able to remove or correct flash image capture in the combination process.

Figure 38:
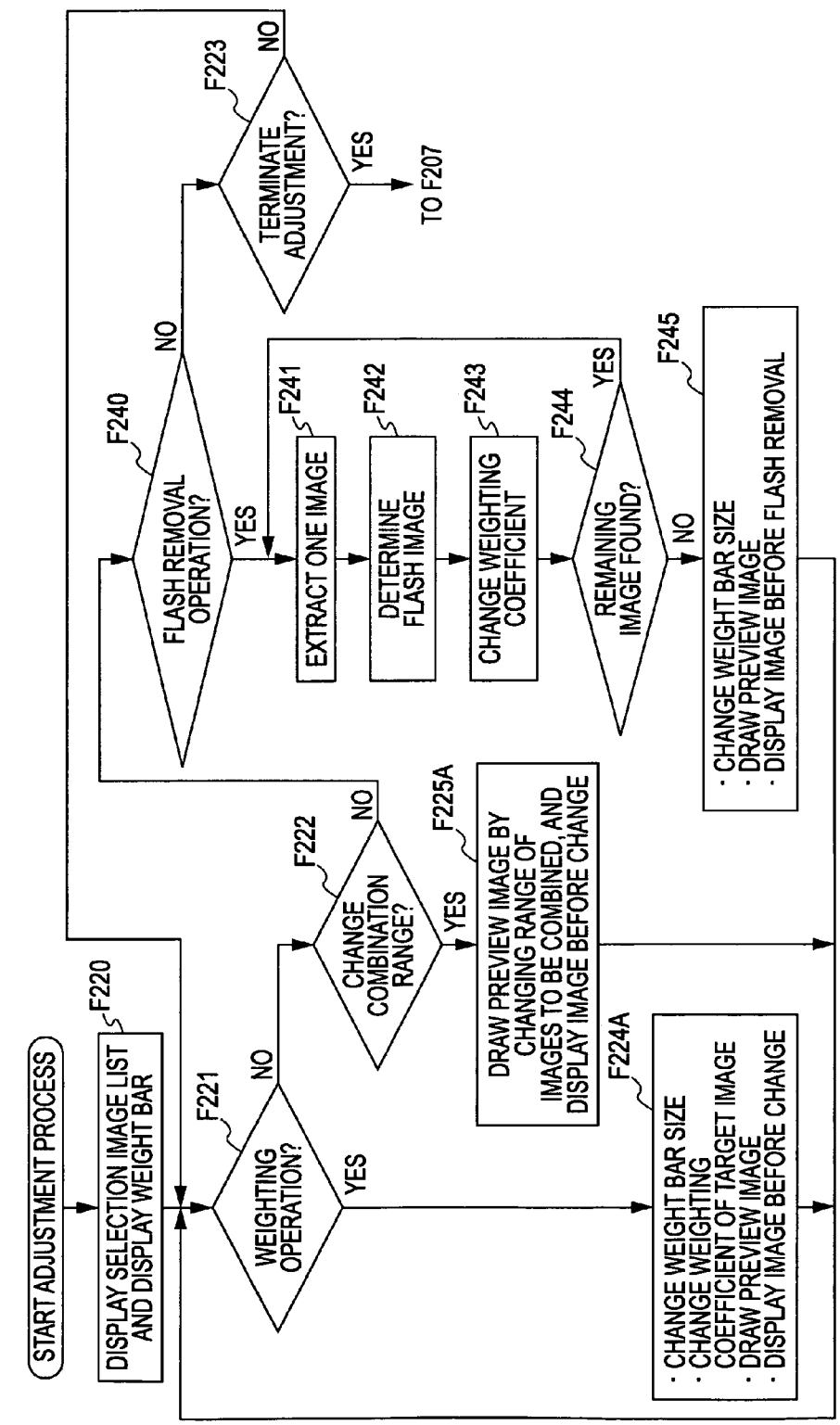
FIG. 38 is a flowchart showing an exemplary process including flash removal according to the embodiment.

FIG. 38 shows an exemplary process of the CPU 31 for enabling flash removal in the adjustment process in step F206 in the combination process shown in FIG. 8.

Steps F220 to F225A shown in FIG. 38 are similar to those in FIG. 19. In FIG. 38, steps F240 to F245 are added to the process shown in FIG. 19.

When the combination-work image 70 is being displayed in the adjustment process, in addition to the operation of changing a weighting coefficient or changing a combination range described above, a user can perform a flash removal operation. The flash removal operation can be performed by, for example, operating a predetermined operation key or selecting a menu item.

When a flash removal operation performed by the user is detected, the CPU 31 advances the process from step F240 to step F241.

In steps F241 to F244, a weighting coefficient for removing the flash is changed for each image data element within a combination range.

In step F241, the CPU 31 extracts one of the image data elements in the combination range as a processing target. In step F242, the CPU 31 determines whether the extracted image data element is an image data element captured using a flash (hereinafter referred to as a "flash image") or an image data element captured without using a flash (hereinafter referred to as a "non-flash image"). As described above, the determination of a flash image or a non-flash image may be performed by checking the metadata added to image data element during image capture.

In step F243, the CPU 31 changes the weighting coefficient depending on a flash image or a non-flash image.

Specifically, if the current image data element is a flash image, the weighting coefficient is reduced so as to remove or negate the flash effect. If the current image data element is a non-flash image, the weighting coefficient is increased.

The weighting coefficients are used for the purpose of eliminating a difference in overall image brightness level between a flash image and a non-flash image. Thus, the amount by which the weighting coefficient for a flash image is reduced and the amount by which the weighting coefficient for a non-flash image is increased are determined according to the relative difference in overall image brightness level therebetween. In some cases, when the weighting coefficient of the flash image is reduced while the weighting coefficient of the non-flash image is maintained unchanged, the overall brightness level of the flash image may be equivalent to that of the non-flash image.

After the process has been completed for one image data element, the CPU 31 returns from step F244 to step F241 and performs a similar process on a next image data element in the combination range.

When the process described above is completed for all the image data elements in the combination range, the weighting coefficients set for the individual image data elements are used to equalize the differences in overall screen brightness level between the individual image data elements. That is, the weighting coefficients are assigned to the individual image data elements so that flash images can become as bright as non-flash images.

In this state, in step F245, the CPU 31 changes the heights of the weight bars corresponding to the image data elements. The CPU 31 further performs a combination process using the weighting coefficients corresponding to the image data elements to generate a combined image with the flash removed, and displays the combined image in the image display area 72 as a preview image.

The image that has been displayed in the image display area 72 (that is, the previous combined image) is further displayed in the image display area 71 as a preview image of a combined image before the flash removal.

Figure 37:
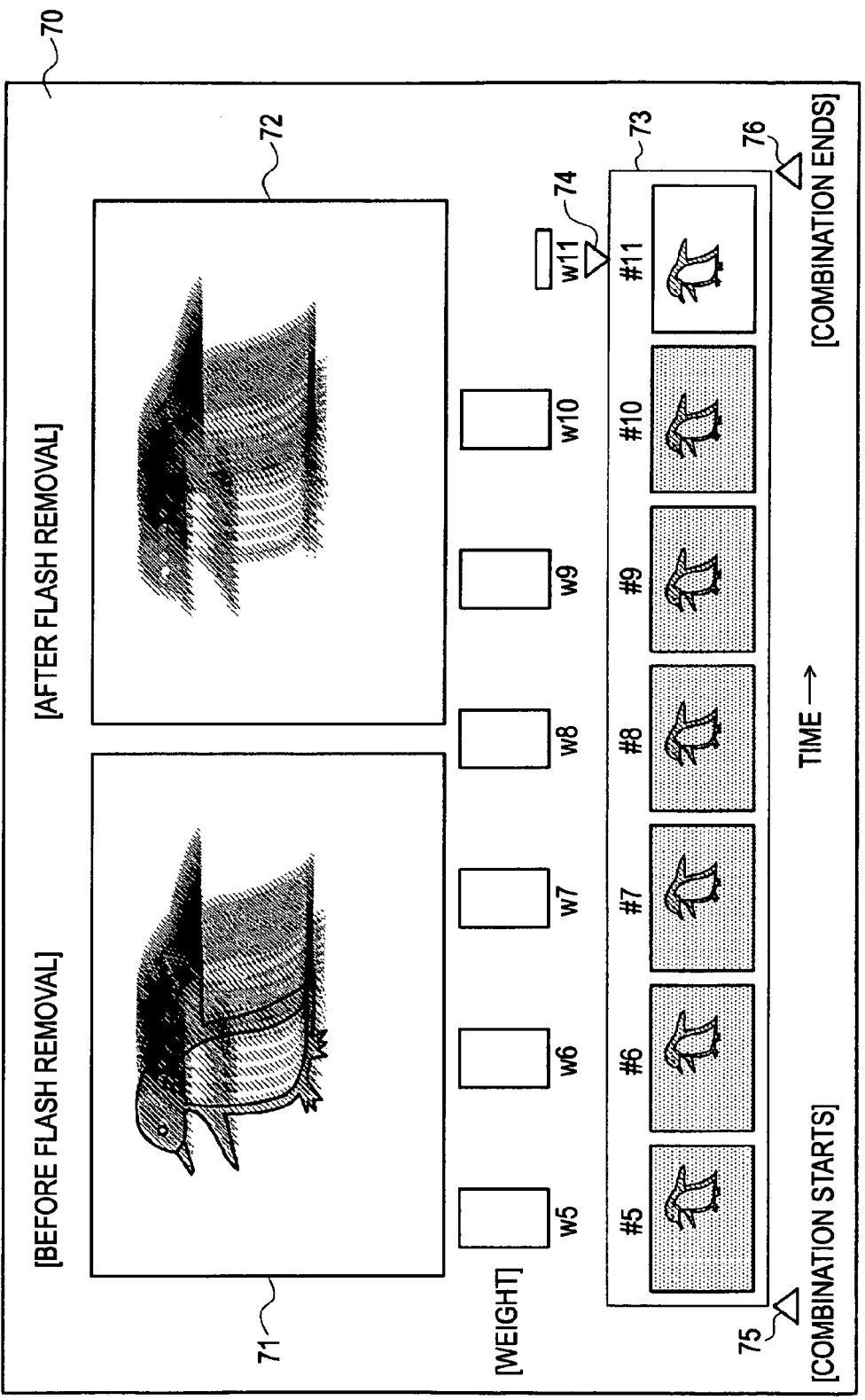
FIG. 37 is a diagram showing a combination-work image obtained when flash removal is performed according to the embodiment.

FIG. 37 shows a combination-work image 70 obtained after the flash removal process.

It is assumed that, as shown in FIG. 37, an image data element #11 is a flash image among image data elements #5 to #11 in a combination range that are displayed as a selection image list in the timeline 73.

Initially, when the adjustment process shown in FIG. 38 is started, that is, when an equal weighting coefficient is assigned to the image data elements #5 to #11 (for example, as shown in FIG. 13, in an initial state where the weighting coefficients are equal and where the weight bars have the same height), the combined image with the second-curtain synchronization effect that is displayed in the image display area 71 shown in FIG. 37 is displayed in the image display area 72 as a preview image of the combined image.

Then, when the user performs the flash removal operation to perform the processing of steps F241 to F245, the combination-work image 70 shown in FIG. 37 is obtained.

Specifically, the weighting coefficients of the image data elements #5 to #10, which are non-flash images, are increased, which is represented by increasing the weight bars w5 to w10. Further, the weighting coefficient of the image data element #11, which is a flash image, is reduced, which is represented by reducing the weight bar w11.

Then, the combined image obtained after the flash removal process is displayed in the image display area 72, and the combined image obtained before the flash removal is displayed in the image display area 71.

As shown in FIG. 37, the combined image obtained after the flash removal process is a long-time exposure effect image with the second-curtain synchronization effect removed. That is, a combined image is generated so that the overall brightness level of the image data element #11, which is a flash image, can also be equal to that for a non-flash image.

In this manner, even when a user captures images using a flash, the user can easily remove the flash effect as desired in the combination process.

For example, when a user obtains an undesired image as a result of flash image capture, the user can only perform the flash removal operation to assign a weight for a non-flash image to obtain a combined image.

While the determination of a flash image or a non-flash image in step F242 may be performed using, instead of metadata, a brightness distribution (sum of brightness signals) of image data of preceding and following frames in consecutive frames or the like.

For example, a sum of brightness signals for consecutive captured images can be detected, monitored, or watched to detect a change in the brightness signals.

The determination of a frame captured with the firing of the flash can also be performed, although indirectly, by detecting a light control function (such as the aperture mechanism, the ND filter mechanism, or a liquid crystal iris) in exposure control, the, shutter speed, the electronic shutter speed, the gain, or the like.

When a rapid change is found by detecting the rate of overtime changes of a brightness signal (or lightness of a scene of a captured image), it is determined that a flash has been fired. For example, when a change from a bright condition to a dark condition within a period of 1/60 seconds is found, it can be determined that a flash has been fired.

In this manner, for example, with the determination based on brightness comparison between frames, exposure control conditions, or other conditions, the use or non-use of a flash can be determined in cases other than flash light emission by the image capture apparatus 1, such as when a flash was fired from another device close to the image capture apparatus 1 or when a subject was instantaneously illuminated by the headlight of a vehicle passing by.

Therefore, for example, assuming that flash light emission caused by user's unintentional events in a situation where a large number of photographers are close to the user is to be removed or negated in the combination process, it is preferable that a flash image or a non-flash image be determined based on the brightness comparison between frames, exposure control conditions, or the like. That is, regardless of the image capture conditions, a combined image can be easily obtained with the ambient image capture conditions canceled.

An exemplary process for enabling flash correction will now be described with reference to FIGS. 39 and 40.

In the case of an insufficient amount of flash even though the user captures images using a flash, an undesired image effect combined image may be obtained in the combination process.

Accordingly, it is desirable to correct a flash image in the combination process.

Figure 40:
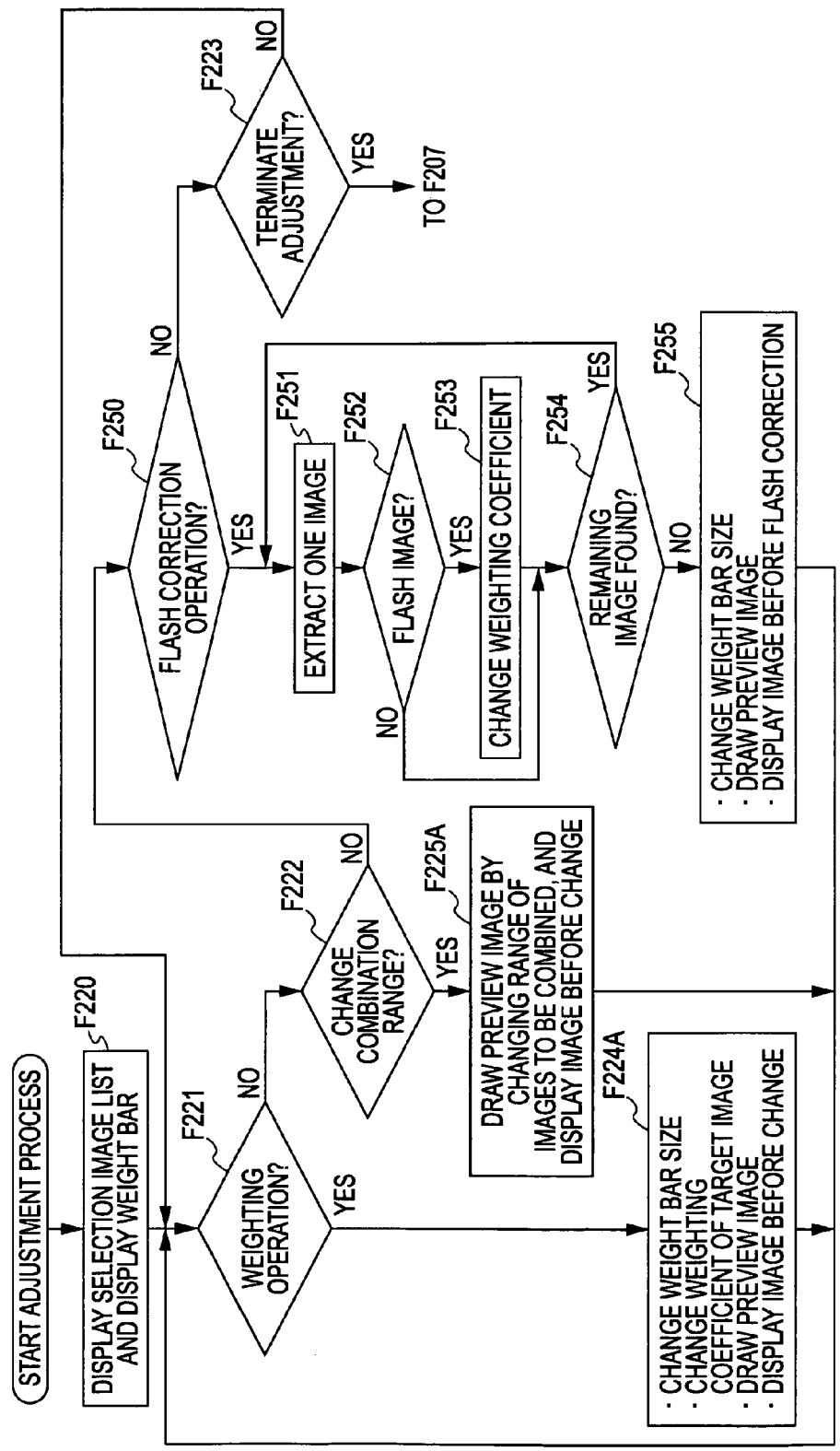
FIG. 40 is a flowchart showing an exemplary process including flash correction according to the embodiment.

FIG. 40 shows an exemplary process of the CPU 31 for enabling flash correction in the adjustment process in step F206 in the combination process shown in FIG. 8.

Steps F220 to F225A shown in FIG. 38 are similar to those in FIG. 19. In FIG. 38, steps F250 to F255 are added to the process shown in FIG. 19.

When the combination-work image 70 is being displayed in the adjustment process, in addition to the operation of changing a weighting coefficient or changing a combination range described above, a user can perform a flash correction operation. The flash correction operation can be performed by, for example, operating a predetermined operation key or selecting a menu item.

When a flash correction operation performed by the user is detected, the CPU 31 advances the process from step F250 to step F251.

In steps F251 to F255, a flash image is extracted among image data elements in a combination range, and the weighting coefficient is changed.

In step F251, the CPU 31 extracts one of the image data elements in the combination range as a processing target. In step F252, the CPU 31 determines whether the extracted image data element is a flash image or a non-flash image. As described above, the determination of a flash image or a non-flash image may be performed by checking the metadata added to image data element during image capture. Alternatively, as described above, the determination may be based on the brightness comparison between frames, exposure control conditions, or the like.

If the current target image data element is a flash image, the CPU 31 proceeds to step F253 and changes a weighting coefficient. In this case, the frame of the flash image is strongly weighted to perform correction so that the flash has been emitted with an appropriate light amount.

If the current target image data element is a non-flash image, the weighting coefficient is not specifically changed.

After the process has been completed for one image data element, the CPU 31 returns from step F254 to step F251 and performs a similar process on a next image data element in the combination range.

When the process described above is completed for all the image data elements in the combination range, the weighting coefficients set for the individual image data elements are used to perform correction so that brightness level of a flash image can be improved.

In this example, the weighting coefficient of a non-flash image is changed. However, the weighting coefficient of a non-flash image may be changed so as to be reduced or the like to highlighted a flash image.

After the processing of steps F251 to F254 has been completed for all the image data elements in the combination range, in step F255, the CPU 31 changes the heights of the weight bars corresponding to the image data elements. The CPU 31 further combines the individual image data elements using the changed weighting coefficients to generate a combined image with the flash corrected, and displays the combined image in the image display area 72 as a preview image.

A combined image that has not been corrected for the flash effect (that is, the image that has been displayed in the image display area 72 as a preview image of the combined image immediately before the flash correction process) is further displayed in the image display area 71.

Figure 39:
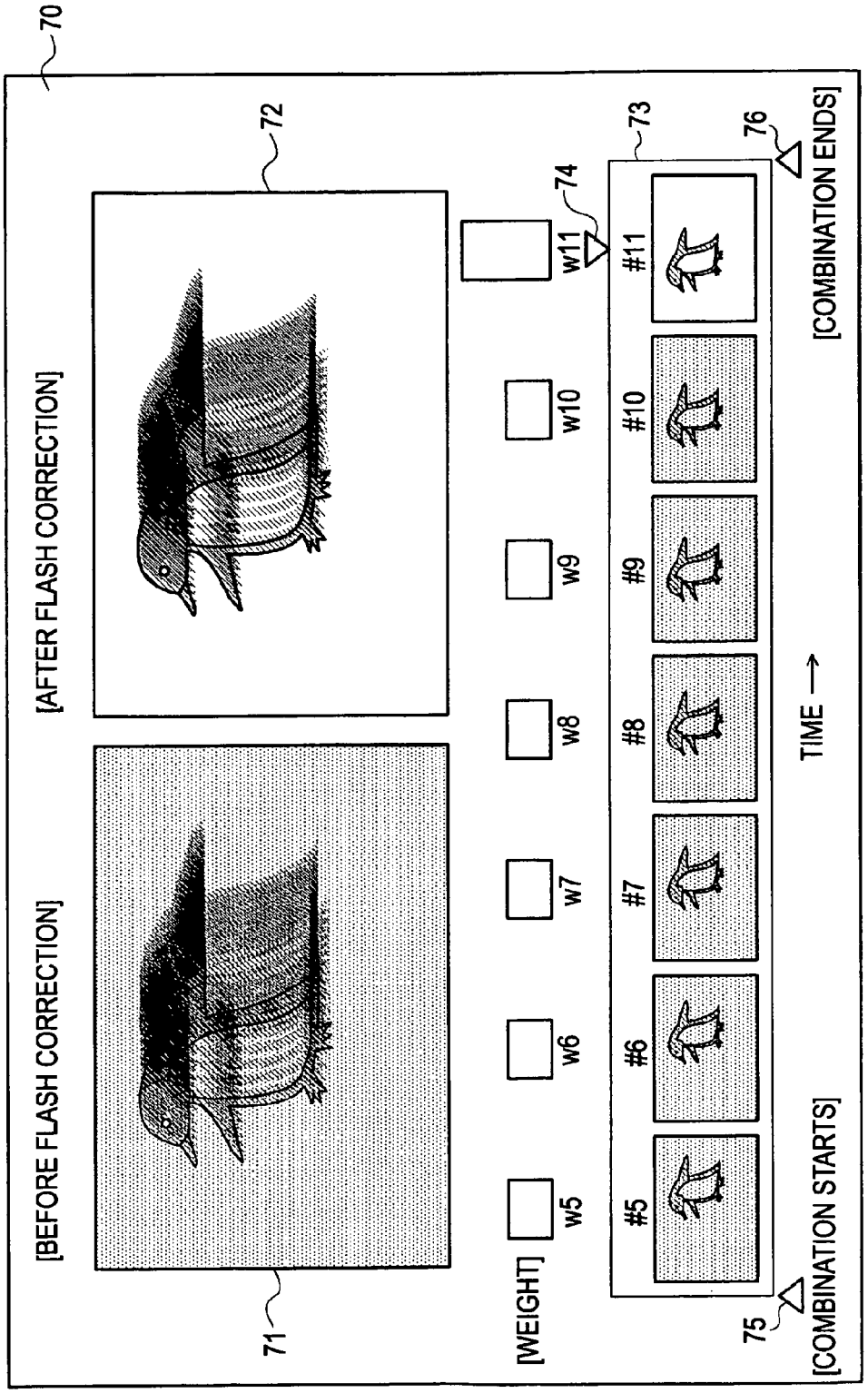
FIG. 39 is a diagram showing a combination-work image obtained when flash correction is performed according to the embodiment.

FIG. 39 shows a combination-work image 70 obtained after the flash correction.

It is assumed that, as shown in FIG. 39, an image data element #11 is a flash image among image data elements #5 to #11 in a combination range that are displayed as a selection image list in the timeline 73.

Initially, when the adjustment process shown in FIG. 40 is started, that is, when an equal weighting coefficient is assigned to the image data elements #5 to #11 (for example, as shown in FIG. 13, in an initial state where the weighting coefficients are equal and where the weight bars have the same height), the combined image with the second-curtain synchronization effect that is displayed in the image display area 71 shown in FIG. 39 is displayed in the image display area 72 as a preview image of the combined image. In this case, due to the insufficient amount of flash during the image capture, the overall brightness level of the image data element #11 is low and the second-curtain synchronization effect is not significantly highlighted.

Then, when the user performs the flash correction operation to perform the processing of steps F251 to F255, the combination-work image 70 shown in FIG. 39 is obtained.

Specifically, the weighting coefficient of the image data element #11, which is a flash image, is increased, which is represented by increasing the weight bar w11.

Then, the combined image obtained after the flash correction process is displayed in the image display area 72, and the combined image obtained before the flash correction is displayed in the image display area 71.

As shown in FIG. 39, the combined image obtained after the flash correction process is an image in which the second-curtain synchronization effect is noticeable.

In this manner, even when a user captures images using a flash but the subject brightness level of the images is not sufficient due to the performance of the flash, the distance to a subject, or the like, the user can easily correct the flash effect as desired in the combination process.

In this embodiment, flash correction has been described in the context of the achievement of a sufficient image brightness level in the case of insufficient amount of light. Conversely, when the amount of flash is too large, correction may be performed so that the screen intensity can be reduced.

Further, the amount by which the weighting coefficient for a flash image is corrected may be automatically calculated by the CPU 31 or may be adjusted step-by-step by the user.

In the case of automatic calculation, for example, a standard difference between total sums of brightness levels of flash images and non-flash images may be set in advance and weighting coefficients of the flash and non-flash images may be adjusted so that the difference can be obtained.

In the case of adjustment by the user, a fixed amount of change may be set for the weighting coefficients, and the weighting coefficient for a flash image may be changed by the fixed amount each time the flash correction operation is performed. The user merely repeats the flash correction operation until a desired state has been obtained.

Since the flash removal and flash correction processes described above are implemented by changing a weighting coefficient, the user can also the processes by selecting an image data element in the combination-work image 70 and manually changing the weighting coefficient. However, it is actually time-consuming for a user to change individual weighting coefficients of a large number of image data elements. By executing the processes described above in accordance with a flash removal operation, flash correction operation, or the like, the operability of the combination work is significantly improved.

10. Exemplary Combination-Mode Processes: Distance-Based Correction

An exemplary process for correcting a weighting coefficient according to the distance to a subject during image capture will now be described with reference to FIGS. 41 to 44.

In order to perform this process, in the image capture in step F15 shown in FIG. 5, a distant to the in-focus plane during the image capture (hereinafter referred to as an "image capture distance") is included in metadata (for example, Exif data) added to image data of each frame. As described above, a main subject is in focus using autofocus control during image capture. At this time, the lens position detection unit 27 performs the inverse operation from the lens address to determine the distance to the main subject. The CPU 31 adds information regarding the distance as metadata.

Figure 41:
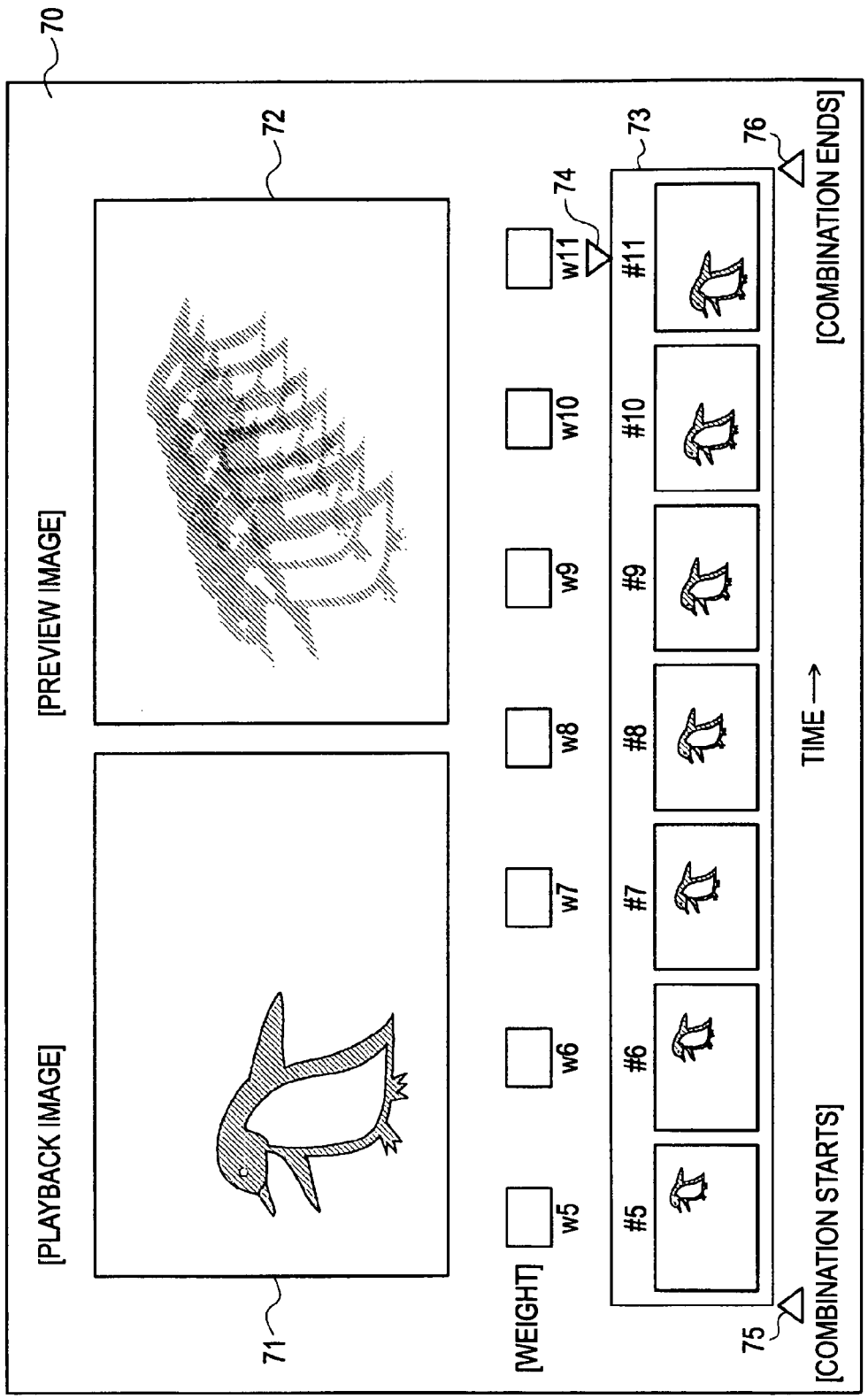
FIG. 41 is a diagram showing a combination-work image according to the embodiment.

Now, in the adjustment process in step F206 shown in FIG. 8 in the combination process, it is assumed that image data elements #5 to #11 displayed as a selection image list in the timeline 73 shown in FIG. 41 are in a combination range.

It is assumed that the image data elements #5 to #11 show a scene in which a subject is gradually approaching the image capture apparatus 1 while moving from the upper right to the lower left of the screen.

A combined image generated with the same weighting coefficient assigned to the image data elements #5 to #11 is displayed as a preview image in the image display area 72.

Figure 42:
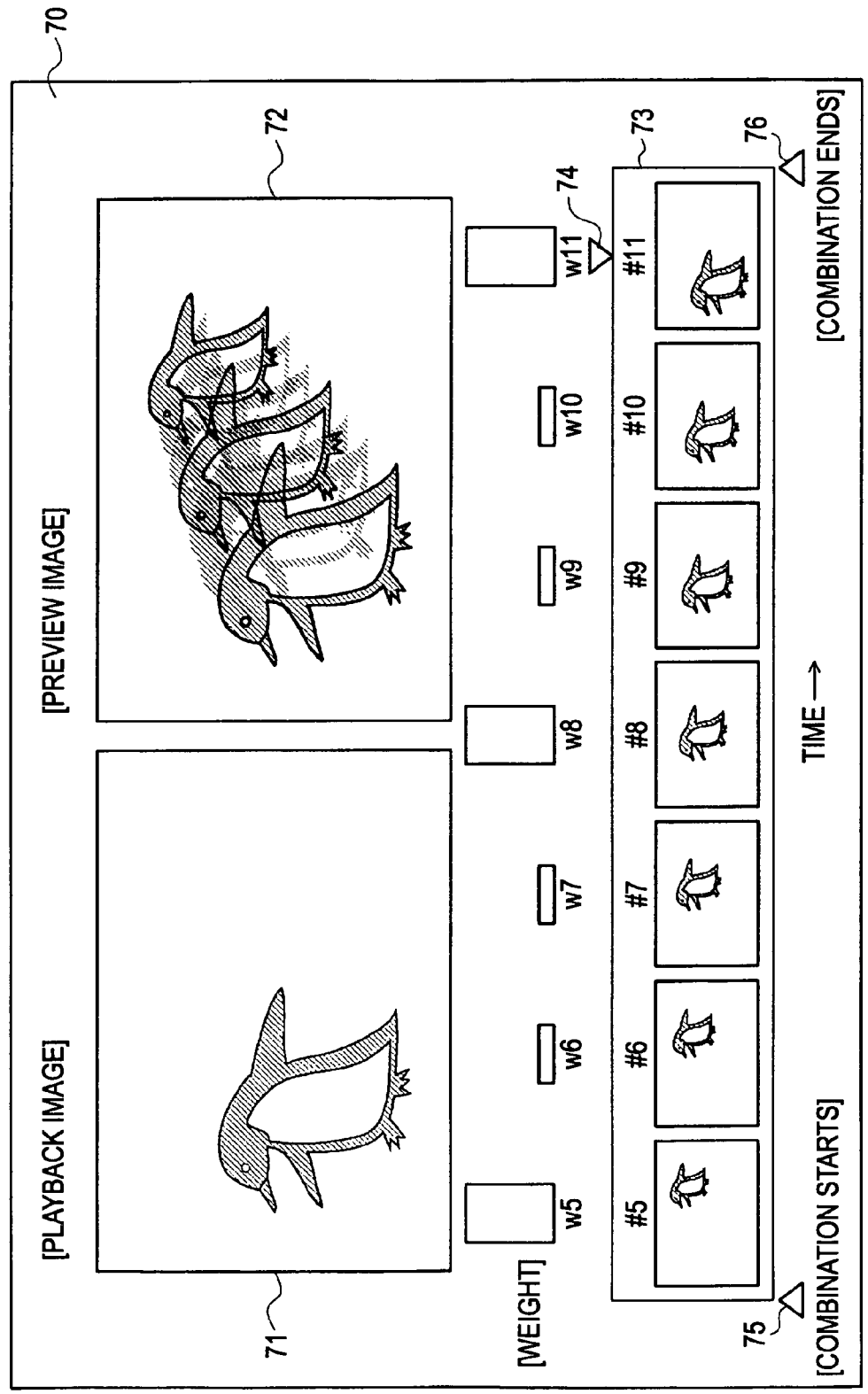
FIG. 42 is a diagram showing a combination-work image obtained when the multi-flash effect is achieved according to the embodiment.

Here, it is assumed that, as shown in FIG. 42, a user performs a weighting coefficient operation to increase the weighting coefficient for the image data elements #5, #8, and #11 and reduce the weighting coefficient for the remaining image data elements #6, #7, #9, and #10 to apply the multi-flash effect so as to produce an image displayed as a preview image.

Since the image data elements #5 to #11 have been captured without using a flash, the multi-flash effect is achieved using the weighting coefficients. Here, the actual firing of the flash during image capture will be considered.

In flash image capture, actually, as the distance to the subject increases, the amount of light reaching the subject is reduced, resulting in a dark shot if the amount of light is not sufficient. In order to avoid this problem, a larger flash is necessary, which may prevent reduction in size and power consumption.

In the present embodiment, in contrast, the problem caused by the actual firing of the flash in the related art can be overcome by performing image combination as shown in FIG. 42. That is, an image similar to that captured with a sufficient amount of light can be obtained without using a large flash.

There may be another demand for an image similar to that captured with the firing of the flash to be reproduced more realistically without using a flash. That is, a demand may be considered for a more realistic reproduction of the multi-flash effect that is achieved using the flash image capture of the related art.

Figure 43:
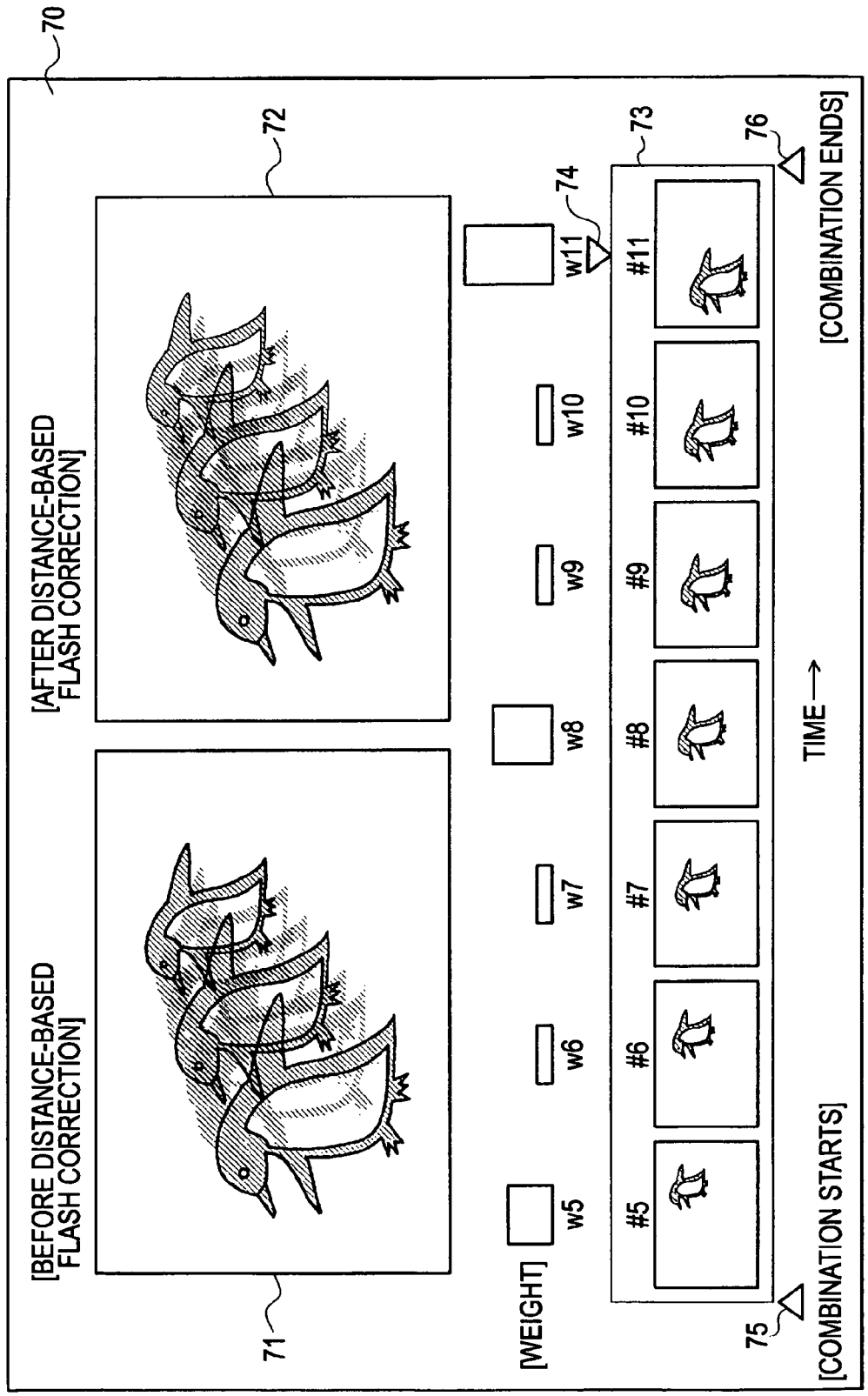
FIG. 43 is a diagram showing a combination-work image obtained when distance-based flash correction is performed according to the embodiment.

Therefore, it is desirable to correct the flash effect. FIG. 43 shows a combined image with the multi-flash effect, which is similar to an image actually captured with the firing of the flash, in which the weighting coefficients of image data elements (#5, #8, and #11) with the flash effect applied are increased according to information regarding the image capture distance recorded in metadata (for example, Exif data) while adjusting the weighting coefficients depending on the image capture distance (hereinafter referred to as "distance-based flash correction"). Specifically, in FIG. 43, as indicated by weight bars w5, w8, and w11, the weighting coefficients are adjusted so as to be reduced as the image capture distance increases. Thus, as shown in a preview image in the image display area 72 which is obtained after the distance-based flash correction, a combined image is produced so that the flash effect is diminished as the distance increases. The combined image obtained before the distance-based flash correction (that is, the combined image obtained in the state shown in FIG. 42) is displayed in the image display area 71. As can be seen from the comparison between both combined images, a more realistic representation of a combined image can be achieved using the distance-based flash correction.

Figure 44:
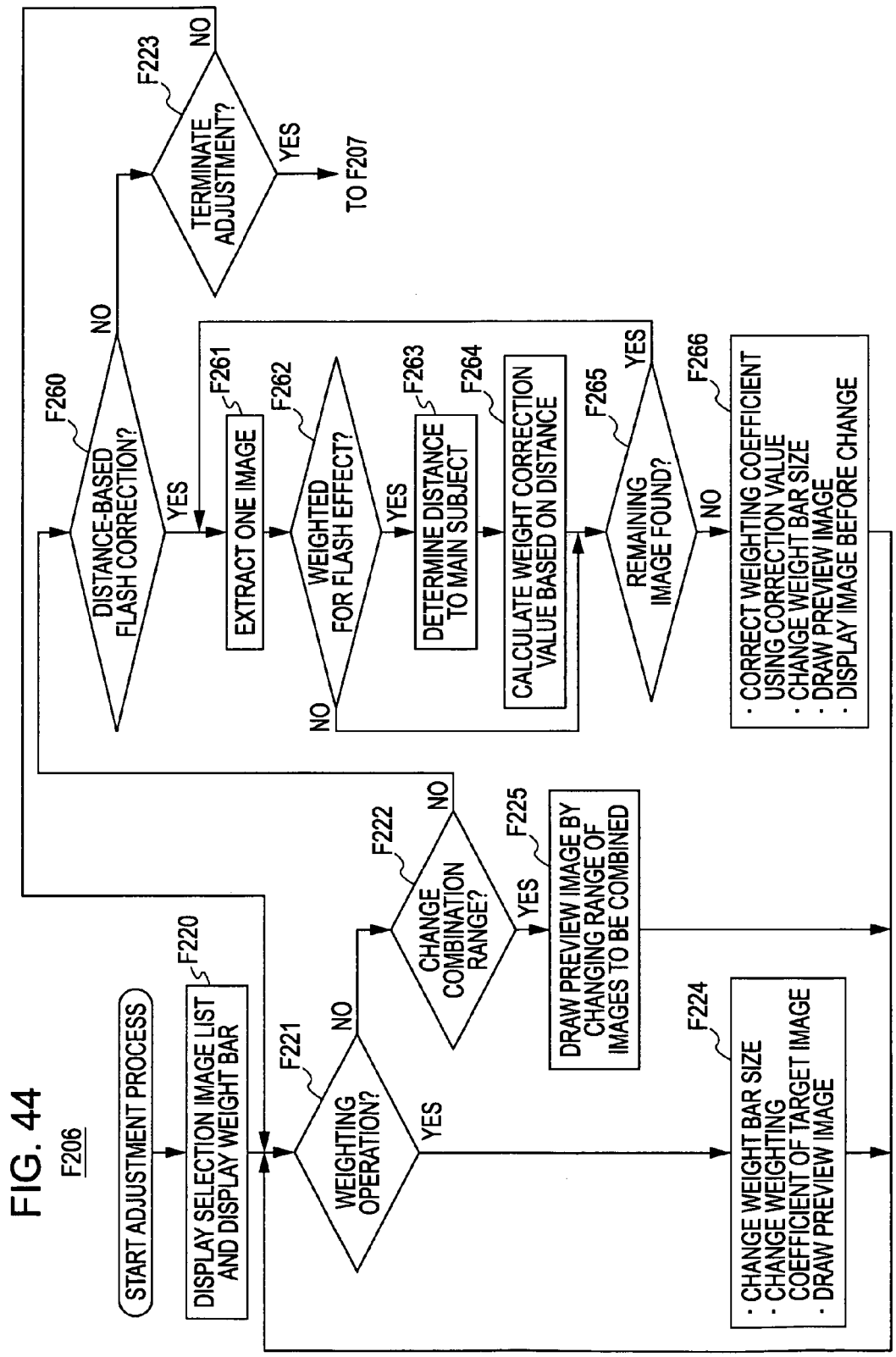
FIG. 44 is a flowchart showing an exemplary process including distance-based flash correction according to the embodiment.

FIG. 44 shows a process of the CPU 31 for implementing the distance-based flash correction described above. FIG. 44 shows an exemplary process for enabling distance-based flash correction in the adjustment process in step F206 in the combination process shown in FIG. 8.

Steps F220 to F225 shown in FIG. 44 are similar to those shown in FIG. 9. In FIG. 44, steps F260 to F266 are added to the process shown in FIG. 9.

When the combination-work image 70 is being shown in the adjustment process, as described above, in addition to the operation of changing a weighting coefficient or changing a combination range, a user can perform a distance-based flash correction operation. The flash correction operation can be performed by, for example, operating a predetermined operation key or selecting a menu item.

For example, the user may perform a weighting coefficient operation (or select the coefficient template for the multi-flash effect) to apply the multi-flash effect to a combined image in the manner shown in FIG. 42. The multi-flash effect is merely an example, and any other effect such as the first-curtain synchronization effect, the second-curtain synchronization effect, or the flash effect with a high weighting coefficient assigned to a certain image data element in a combination range may be applied.

In this case, the user can achieve a more realistic image representation by performing the distance-based flash correction operation.

When a distance-based flash correction operation performed by the user is detected, the CPU 31 advances the process from step F260 to step F261.

In steps F261 to F264, an image with the flash effect applied using a weighting coefficient is extracted among image data elements in a combination range, and the weighting coefficient is changed.

In step F261, the CPU 31 extracts one of the image data elements in the combination range as a processing target. In step F262, the CPU 31 determines whether or not the extracted image data element is an image with the flash effect applied using the weighting coefficient (hereinafter referred to as a "flash-effect-applied image" or "flash-effect-applied image data element").

If the current target image data element is a flash-effect-applied image, the CPU 31 proceeds to step F263 and determines the image capture distance of the image data element with respect to the subject on the basis of the metadata of the image data element. Then, in step F264, the CPU 31 calculates a correction value of the weighting coefficient on the basis of the image capture distance, and stores it as the correction value of the weighting coefficient of the image data element.

If the current target image data element is not a flash-effect-applied image, the processing of steps F263 or F264 is not performed.

After the process has been completed for one image data element, the CPU 31 returns from step F265 to step F261 and performs a similar process on a next image data element in the combination range.

When the process described above is completed for all the image data elements in the combination range, the correction values of the weighting coefficients based on the image capture distances have been calculated for all the flash-effect-applied image data elements in the combination range (in FIG. 42, the image data elements #5, #8, and #11).

After the processing of steps F261 to F265 has been completed for all the image data elements in the combination range, in step F266, the CPU 31 corrects the weighting coefficients of the flash-effect-applied image data elements on the basis of the correction values of the weighting coefficients based on the image capture distances.

After the correction, the CPU 31 changes the heights of the weight bars corresponding to the image data elements. The CPU 31 further combines the individual image data elements using the corrected weighting coefficients to generate a combined image, and displays the combined image in the image display area 72.

A combined image obtained before the distance-based flash correction (that is, the image that has been displayed in the image display area 72 as a preview image of the combined image immediately before the process) is further displayed in the image display area 71.

With the process described above, the combination-work image 70 shown in FIG. 43 is obtained. Thus, a combined image subjected to distance-based flash correction is displayed.

In the combination in step F266, in order to prevent the lightness of the combined image generated after the correction of weighting coefficients from being entirely changed, all the weighting coefficients may be automatically adjusted so as to obtain an appropriately bright combined image.

In the process shown in FIG. 44, the weighting coefficient of only a flash-effect-applied image data element is corrected according to the distance. Alternatively, correction values of the weighting coefficients of all the image data elements in the combination range may be calculated according to the image capture distances and the weighting coefficients may be corrected. Specifically, the processing of step F262 shown in FIG. 44 may be omitted, and the processing of steps F263 and F264 may be performed for all the image data elements in the combination range.

Figure 45:
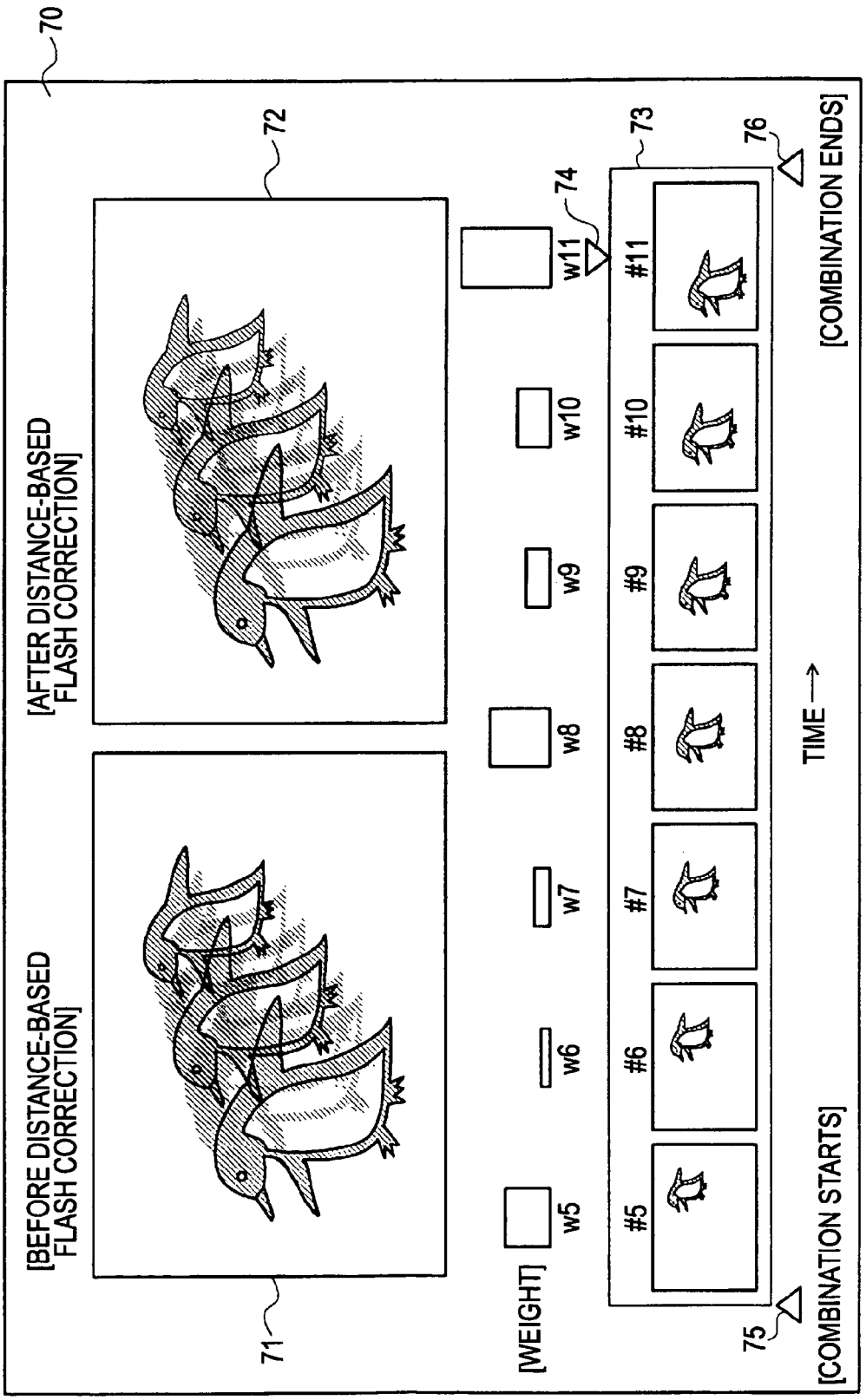
FIG. 45 is a diagram showing a combination-work image obtained when distance-based correction is performed for all images according to the embodiment.

In this case, a combination-work image 70 shown in FIG. 45 is obtained after distance-based correction. Specifically, as indicated by the weight bars w5 to w11, the weighting coefficients of the image data elements #5 to #11 are corrected according to the image capture distances, and a combined image based on the corrected weighting coefficients is displayed in the image display area 72.

In actuality, the flash reach distance of a flash fired has the following relationship:

Flash reach distance (m)=guide number (ISO 100) $\square$ aperture setting value Once a guide number is specified, a correction value of a weighting coefficient can be set based on the fact that the amount of lash light is in inverse proportion to the square of the distance.

In view of image representations, preferably, a virtual guide number is specified in accordance with an instruction given by a user operation. A guide number may also be automatically selected in accordance with the distance distribution of subjects. For example, when subjects are distributed over a short distance to a middle distance, the guide number is reduced; when subjects are distributed over a short distance to a long distance, the guide number is increased.

A guide number may also be preset such as "a guide number of 28". The "guide number" is merely an example and any other value that implies the amount of flash light may be specified such as a flash reach distance. Or, an aperture setting value different from the aperture value used in the actual photographing may be specified. Thus, a virtual flash effect is achieved.

When a coefficient template is selected in the manner described above, weighting can also be determined by referring to metadata of captured image data on the basis of the image capture distance.

The multi-flash effect may be automatically set so that light emission intervals (intervals of highly weighted frames) can be adjusted after a coefficient template is selected and so that weighting can be determined based on the image capture distance according to the adjusted light emission intervals.

The adjustment operation may be implemented by adding the corresponding operation function to a predetermined operator or by selecting the corresponding item from a menu. Alternatively, a light emission interval may be set as desired by performing an operation such as pressing a left-right button of the cross key 5$i$ while pressing the shutter operation key 5$a$.

Further, area extraction may be used to apply weighting only to an in-focus subject according to the image capture distance, thereby achieving a more realistic reproduction of the flash effect.

Distance distribution information such as the so-called depth map (a measured distance to a subject for each pixel) may be obtained as information regarding the image capture distances, thereby assigning a weight to each pixel according to the relationship of:

Flash reach distance (m)=guide number (ISO 100) $\square$ aperture setting value Specifically, in addition to using weighting to obtain a long-time exposure image during image combination, weights may be changed depending on distances within one combined image using area extraction based on the image capture distance or distance distribution information such as a depth map, thereby achieving a more realistic reproduction of the flash effect.

As described above, the distance distribution information can be generated by the information generation unit 44 of the camera DSP 4 during image capture.

Further, a frame having a short image capture distance may be strongly weighted and a frame having a long image capture distance may be weakly weighted to reduce an image processing load. The processing load can be reduced by performing weighting on the entire screen without using area extraction or a depth map.

In an image captured using long-time exposure for representing motion of a moving subject, no motion may be contained in the background areas or even motion contained in the background areas may not be necessarily important in terms of image capture. Thus, in some scenes captured, no problems occur if image combination is performed by performing weighting on the entire screen.

According to the exemplary process described above with reference to FIGS. 41 to 45, weighting for image combination is performed according to subject distance information. Thus, an image similar to that actually captured using a flash can be obtained without using a flash. Therefore, a more realistic representation of a combined image with the multi-flash effect, the first-curtain synchronization effect, the second-curtain synchronization effect, the light emission effect at a desired time, or the like can be achieved.

Another exemplary process will now be described with reference to FIGS. 46 and 47.

Figure 46:
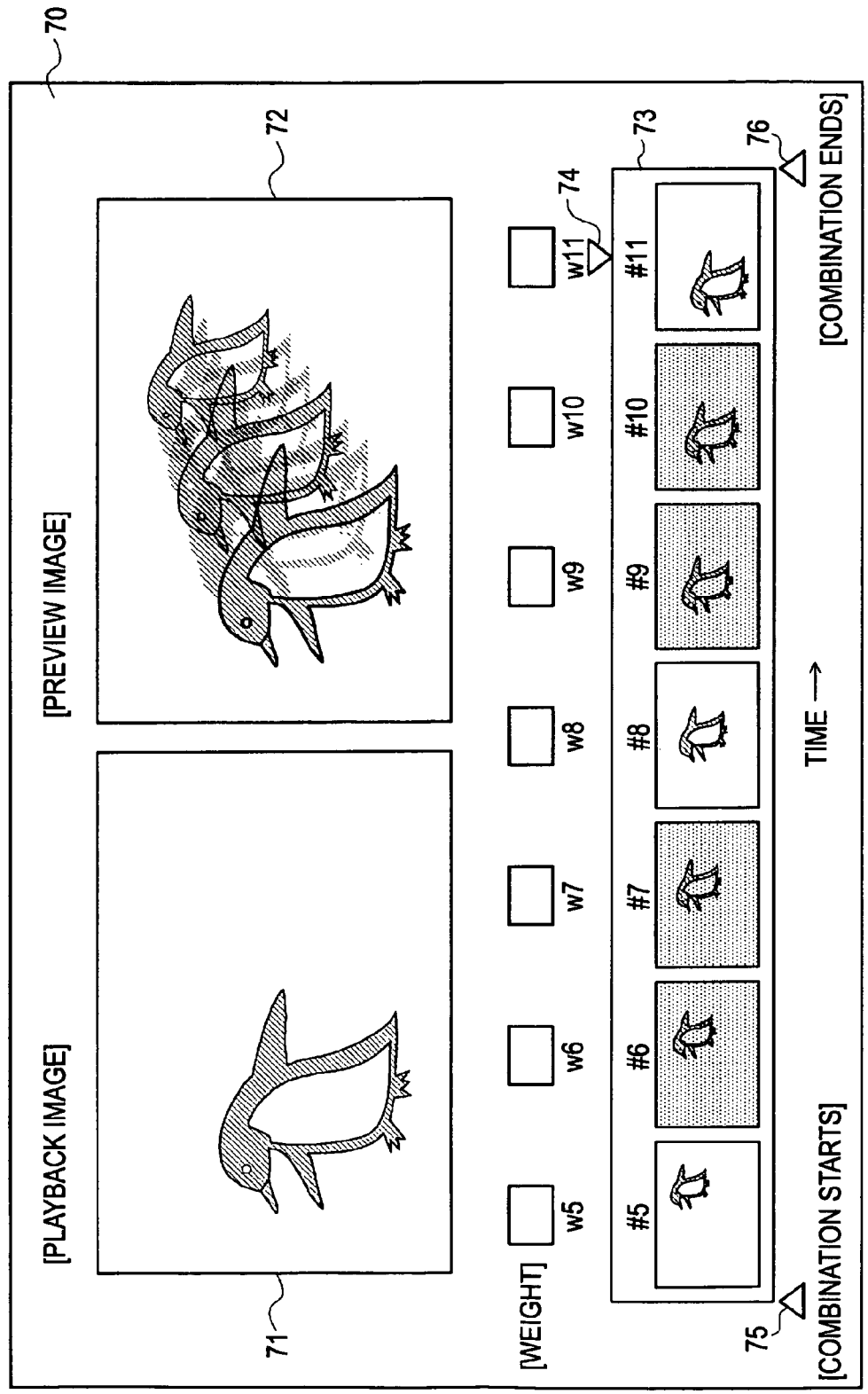
FIG. 46 is a diagram showing a combination-work image obtained when flash images are combined according to the embodiment.

For example, it is assumed that image data elements #5, #8, and #11 among image data elements #5 to #11 in a combination range shown in FIG. 46 have been actually captured using a flash.

Further, due to the sufficient amount of flash light, it is assumed that a favorable, appropriate exposure image of a frame having a long image capture distance is not obtained. In this example, it is assumed that the amount of flash light for the image data element #11 in which the subject is close to the image capture apparatus 1 is sufficient while the amount of light for the image data elements #8 and #5 in which the subject is distant is not sufficient (the amount of light for the image data element #5 is the smallest).

In this case, when combination is performed by applying an equal weighting coefficient, as shown in FIG. 46, an image with the multi-flash effect in which the subject is more noticeable when it is closer to the image capture apparatus 1 is obtained.

Although this combined image provides a realistic representation of the multi-flash effect, some users may desire a clear, rather than realistic, representation of the light emission effect regardless of the image capture distance. Therefore, correction may be performed so that, conversely to the example described above, a realistic image obtained by actually performing image capture with flash light emission can be corrected to enhance the flash effect.

In order to perform this process, in the image capture in step F15 shown in FIG. 5, an image capture distance (a distance to the in-focus plane during the image capture) is included in metadata (for example, Exif data) to be added to each frame of image data. Information as to whether or not a flash has been emitted is also included as metadata.

An actual exemplary process of the CPU 31 may be implemented by modifying the process shown in FIG. 44 described above.

Specifically, in step F262, it is determined whether or not the extracted image data element is a flash image that has been captured by actually firing a flash. If the extracted image data element is a flash image, in step F263, a distance to the subject is determined. In step F264, a correction value of the weighting coefficient is calculated according to the distance. At this time, conversely to the example described above, a correction value for correcting the weighting coefficient so as to provide a sufficient amount of light, instead of reducing the amount of flash light according to the distance, is determined.

Then, after the correction values of the weighting coefficients of all flash images are calculated, in step F266, the weighting coefficients of the flash images may be corrected using the correction values, and, after the correction, a combination process may be performed.

FIG. 47 shows an example of the combination-work image 70 obtained after the correction. The corrected combined image is displayed in the image display area 72. In the combined image obtained after the correction, as can be seen from the comparison with the combined image obtained before the correction, a clearer representation of the flash effect can be obtained even for an image actually captured with an insufficient amount of flash light for the subject which is distant.

As indicated by weight bars w5 to w11, the weighting coefficients are corrected so that a higher weighting coefficient is assigned to an image data element in which the subject is more distant among the flash images #5, #8, and #11. That is, correction is performed so as to provide the firing of the flash with a large amount of light.

In the combination in step F266, in order to prevent the lightness of the combined image generated after the correction of weighting coefficients from being entirely changed, all the weighting coefficients may be automatically adjusted so as to obtain an appropriately bright combined image.

In this case, the correction of a weighting coefficient of a flash image (the calculation of a correction value in step F264) can be performed as follows.

It is determined whether or not it is necessary to correct a flash image captured using a flash (it is necessary to change the weighting coefficient) according to the following relationship:

Flash reach distance (m)=guide number (ISO 100)÷aperture setting value

For example, if the image capture distance (m) is smaller than the flash reach distance (m), it is determined that the amount of flash light is insufficient and that the correction (weighting) is necessary.

If the correction is necessary, correction is performed based on the fact that the amount of flash light is in inverse proportion to the square of the distance and the relationship that "flash reach distance (m)=guide number (ISO 100) ☐ aperture setting value".

In this correction, a guide number is specified to perform weighting based on the fact that the amount of flash light is in inverse proportion to the square of the distance.

In view of image representations, preferably, a virtual guide number is specified in accordance with an instruction given by a user operation. A guide number may also be automatically selected in accordance with the distance distribution of subjects. For example, when subjects are distributed over a short distance to a middle distance, the guide number is reduced; when subjects are distributed over a short distance to a long distance, the guide number is increased.

A guide number may also be preset such as "a guide number of 28".

The "guide number" is merely an example and any other value that implies the amount of flash light may be specified such as a flash reach distance. Or, an aperture setting value different from the aperture value used in the actual image capture may be specified. Thus, a virtual flash effect is achieved.

The following process may be used as an exemplary weighting coefficient correction process.

The degree of correction (weighting) necessary for a frame captured with the firing of the flash (flash image) may be determined by determining a correction coefficient according to the brightness distribution of the image and performing correction (weighting) using the metadata and the correction coefficient.

Further, the determination of a frame captured with the firing of the flash (flash image) may be based on the brightness distribution (sum of brightness signals) or the like of preceding and following frames of consecutive images continuously captured and recorded.

Moreover, the determination of a frame captured with the firing of the flash (flash image) may be performed by referring to metadata added to an image data element, and the determination of a frame captured with unintended light emission, such as the firing of another flash (by another photographer or the like) or instantaneously illumination by the light of a vehicle passing by, may be performed based on the brightness distribution of preceding and following frames of consecutive images (sum of brightness signals) or the like. With this determination, a favorable combined image can be obtained even in accidental illumination conditions such as the firing of a flash by another photographer.

Information regarding the image capture distance may be implemented not only by an image capture distance (a distance to the in-focus plane during image capture) which is stored as metadata (for example, Exif data) but also by, for example, an image capture distance to an in-focus subject obtained using an area extraction technique or the so-called distance distribution information (depth map).

The determination of the necessity of correction (weighting) for a frame captured with the firing of the flash may be performed using area extraction or distance information based on distance distribution information and using the relationship that "flash reach distance (m)=guide number (ISO 100) □ aperture setting value". If "distance information (m)<flash reach distance (m)" holds, it is determined that the amount of flash light is insufficient and that it is necessary to correct a weighting coefficient.

If the correction is necessary, a correction value is determined based on the fact that the amount of flash light is in inverse proportion to the square of the distance. Also in this case, weighting can be performed on an area or each pixel using area extraction or distance information based on distance distribution information.

That is, a long-time exposure image is obtained in image combination not only by performing weighting but also by changing weights according to the distances within one image according to area extraction based on the image capture distances or distance information such as distance distribution information, thereby achieving a more favorable reproduction of the flash effect.

Further, the flash removal described above can also be performed by determining whether or not flash light emission has reached and reducing the weighting on an image with the image capture distance within which the flash light emission has reached.

Also in the flash removal, a more favorable image can be obtained by performing weighting on an area or each pixel using area extraction or distance information based on distance distribution information.

The flash reach distance has the relationships that "flash reach distance (m)=guide number (ISO 100) □ aperture setting value" and that the amount of flash light is in inverse proportion to the square of the distance. Thus, a correction value for each distance can be computed using the amount of flash light recorded in the metadata.

During correction, weighting may be performed by specifying a guide number on the basis of the fact that the amount of flash light is in inverse proportion to the square of the distance. A guide number may be specified by referring to metadata to display the actual guide number so as to be changed or by entering a desired guide number (which is different from that for the actual flash). Thus, a variety of image representations are achieved.

11. Exemplary Combination-Mode Processes: Blurring Correction

An exemplary combination-mode process including blur correction will now be described.

Figure 48A:
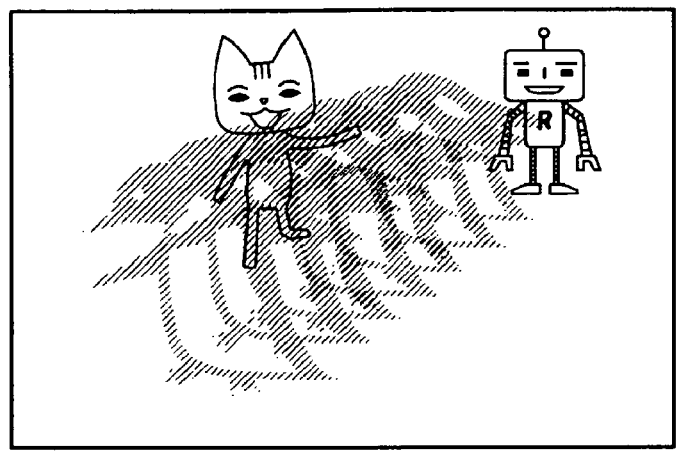
FIGS. 48A to 48C are diagrams showing combined images in which blurring occurs according to the embodiment.
Figure 48B:
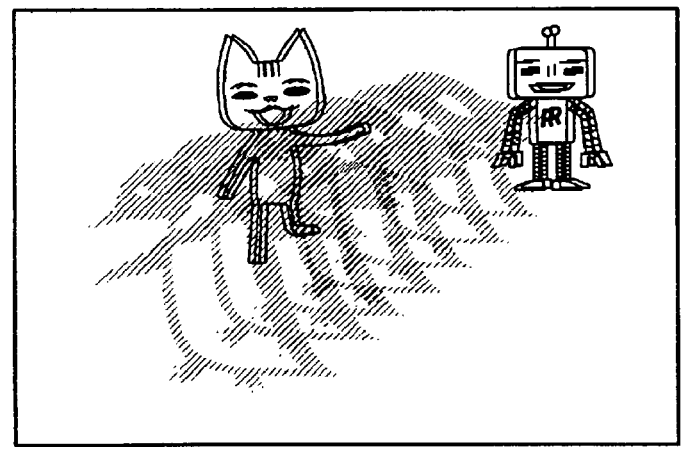
Figure 48C:
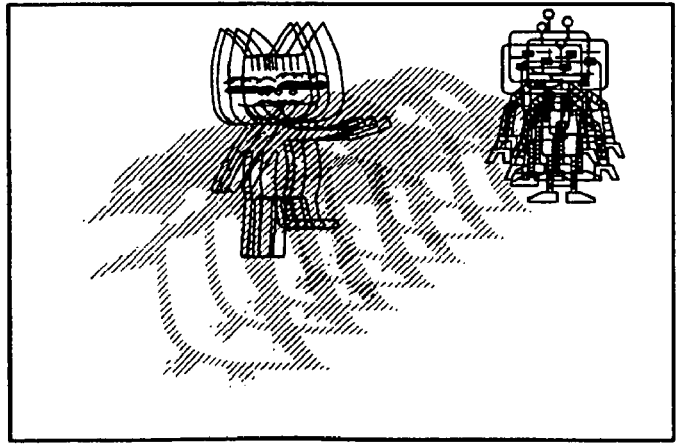

FIGS. 48A, 48B, and 48C show examples of combined images obtained using a combination process. Here, subjects in the combined images include a main subject (dynamic subject with motion) that is moving from the upper right to lower left of the screen and a static subject in the background thereof. The term "static subject" as used herein means an object which a user "does not wish to move" during image capture, rather than an object appearing in the background or an object that "does not move or is stationary" such as a building or landscape. Static subjects may also include, for example, people and animals. Static subjects are therefore subjects whose blurring in a combined image is not desirable.

FIG. 48A shows an image desired by the user, in which the long-time exposure effect is achieved for a dynamic subject while static subjects in the background appear stationary.

In the continuous image capture in step F15 shown in FIG. 5, image capture is carried out for a certain period of time. Thus, due to the shake of the user's hand or the movement of the subjects, the static subjects may blur in a resulting combined image.

FIG. 48B shows blurring of the static subjects in the background due to the camera shake in a case where, for example, the image capture apparatus 1 is not fixed by a tripod or the like.

FIG. 48C shows blurring of the static subjects due to the arbitrary movements of the individual subjects (hereinafter referred to as "subject blur"). For example, even if the image capture apparatus 1 is fixed by a tripod or the like, a static subject may unintentionally blur in a combined image due to its movement.

In the following exemplary processes, the influence of such camera shake or subject blur is corrected by way of example.

First, a camera-shake image is produced when the photographer shakes the image capture apparatus 1. In this case, static subjects in the background similarly blur in a combined image.

Such camera shake is corrected by performing coordinate transformation on each of image data elements in a combination range according to motion vectors of the static subjects, which are detected in each combination-use image data element, and then combining the combination-use image data elements.

A subject blur is caused by arbitrary movements of individual subjects. That is, static subjects differently blur.

Such a subject blur is addressed by extracting an image area of a dynamic subject from each of image data elements in a combination range and performing a combination process to combine the image areas of the dynamic subject extracted from the combination-use image data elements with one combination-use image data element.

First, an exemplary process for correcting camera shake will be described with reference to FIGS. 49 to 52.

FIG. 49 shows a combination-work image 70 in which a combined image obtained by combining image data elements #5 to #11 in a combination range is displayed in the image display area 72 as a preview image. In this case, background subjects blur (user's unintentional blurring occurs) due to the camera shake during image capture.

While the term "camera shake" is used herein for the convenience of description, a frame composition shift in continuous image capture would cause similar blurring in a combined image even though the camera is not actually shaken.

Figure 52:
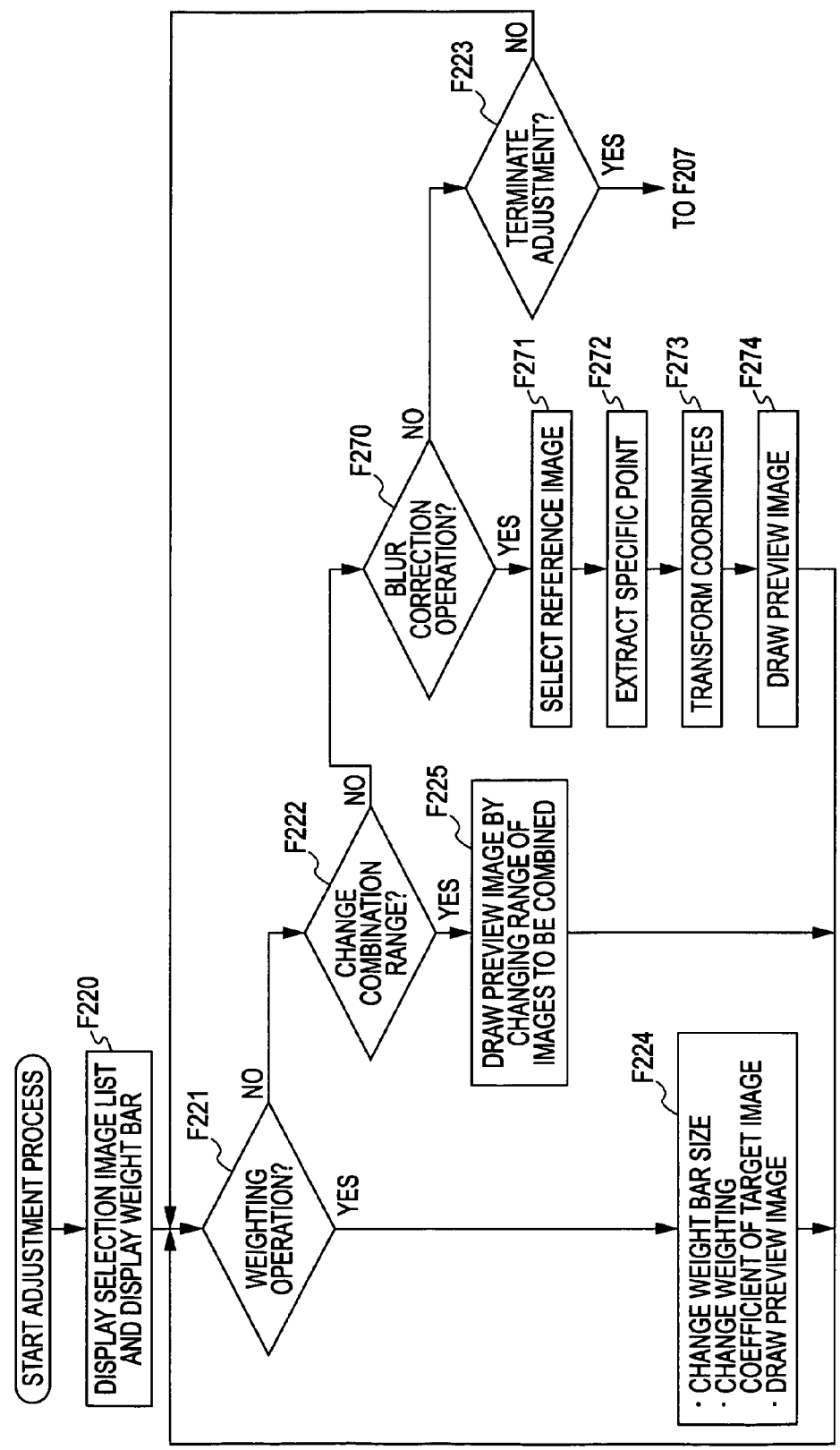
FIG. 52 is a flowchart showing an exemplary process including camera-shake correction according to the embodiment.

Camera-shake correction is performed using motion vectors. FIG. 52 shows an exemplary process including a process for correcting such camera shake. In FIG. 52, steps F220 to F225 are similar to those in FIG. 9. In FIG. 52, steps F270 to F274 are added to the process shown in FIG. 9.

For example, when the combination-work image 70 shown in FIG. 49 is being displayed in the adjustment process, as described above, in addition to the operation of changing a weighting coefficient or changing a combination range, a user can perform a blur correction operation. The blur correction operation can be performed by, for example, operating a predetermined operation key or selecting a menu item.

When a blur correction operation performed by the user is detected, the CPU 31 advances the process from step F270 to step F271 and performs, first, a reference image selection process.

The reference image selection process may be a process for selecting a reference image data element for correction from among image data elements #5 to #11 in a combination range.

As a reference image, the top frame is selected from the selection image list defined by the combination start position and the combination end position. The reference image may also be the center frame. Alternatively, the user may be allowed to select a reference image so that image combination can be performed using the user's favorite background condition.

Then, in step F272, the CPU 31 performs a specific point extraction process. In this process, the CPU 31 extracts a specific point in each of the image data elements #5 to #11, and detects amounts of displacement of the specific point on images other than the reference image with respect to the specific point on the reference image.

The specific point is a characteristic portion in a static subject, and an amount of displacement corresponds to the motion vector of the specific point on each image data with respect to a reference image data.

The specific point may be extracted by selecting a high-brightness high-contrast image from among a plurality of image data elements (edge detection) or may be selected by the user using a touch panel, a cursor, or the like. Alternatively, a plurality of coordinates may be automatically extracted and the user may be allowed to select one of them.

For the images other than the reference image, an identical image in the vicinity of (within the range of frame composition blur due to camera shake which is defined by the focal length of the image capture apparatus 1) the position coordinates of the specific point in the reference image or an image close to the reference image (for example, an adjacent frame) is found and extracted.

A frame is selected and checked using a playback image. Thus, the extracted specific point can be checked.

The extracted specific point in the images other than the reference image can be modified by operating a touch panel, a cursor, or the like.

Furthermore, instead of merely extracting/selecting a specific point from the reference image, possible specific points may also be extracted from the images other than the reference image and a specific point having the smallest movement may be selected. The possible specific points may also be arranged in ascending order of movement and the user may be allowed to select one of them.

Moreover, a correlation arithmetic operation may be executed between the reference image and the images other than the reference image to obtain changes in the corresponding pixels as motion vectors as changes of the specific point.

In a case where a specific point is set either automatically or by the user, a plurality of specific points rather than one specific point may be selected.

A plurality of points rather than one point may be selected as specific points, and the average values of the motion vectors at the points or the minimum values of scalar may be set as changes of the specific points.

The plurality of selected specific points may be weighted to obtain weighted average values of motion vectors.

In step F272, the CPU 31 extracts a specific point for each of the image data elements #5 to #11 in the manner described above, and calculates amounts of displacement of the specific point in non-reference image data elements with respect to the reference image. For example, if the image plane is assumed to be an XY coordinate plane, an amount of displacement may be an amount of shift on the X and Y axes. When a specific point and amounts of displacement are detected in the manner described above, in step F273, the CPU 31 performs coordinate transformation of the images other than the reference image on the basis of the detection results.

For example, if the image data element #5 is used as a reference image, first, in the image data element #6, the amount of displacement of an image at the specific point with respect to the image at the specific point in the reference image data element #5 has been determined. Thus, coordinate transformation is performed on the image data element #6 by the corresponding amount of displacement. Specifically, coordinate transformation is performed (the image is shifted on the XY coordinates) so that the position (XY coordinate value) of the specific point in the image data element #6 can match the position of the specific point in the image data element #5. Coordinate transformation is also performed in a similar manner for the image data elements #7 to #11 so that the position of the specific point in each of the image data elements #7 to #11 can match the position of the specific point in the reference image data element #5.

Then, in step F274, a combination process is performed for each of the image data elements #5 to #11, and a resulting image is displayed in the image display area 72 as a preview image.

FIG. 50 shows a combination-work image 70 obtained in this case. As shown in FIG. 50, a combined image in which the influence of camera shake has been corrected is displayed in the image display area 72.

Camera shake may also influence the main subject with motion. However, the influence of camera shake on the main subject is overcome in the combination after the coordinate transformation. Thus, a smooth long-time exposure effect image can be achieved.

Coordinate transformation on image data other than reference image data may cause a portion where images do not overlap each other. In order to prevent the occurrence of such a portion, a trimming process may be applied to the image data.

In the example described above, a technique for detecting motion vectors of a specific point from image data itself. Alternatively, a sensor output (for example, a sensor output for detecting an amount and direction of camera shake detected by the blur detection unit 13) may be included in metadata of each image data element so that an amount of displacement of each image data element with respect to a reference image data element can be determined using the value of the sensor output to perform coordinate transformation.

Figure 51:
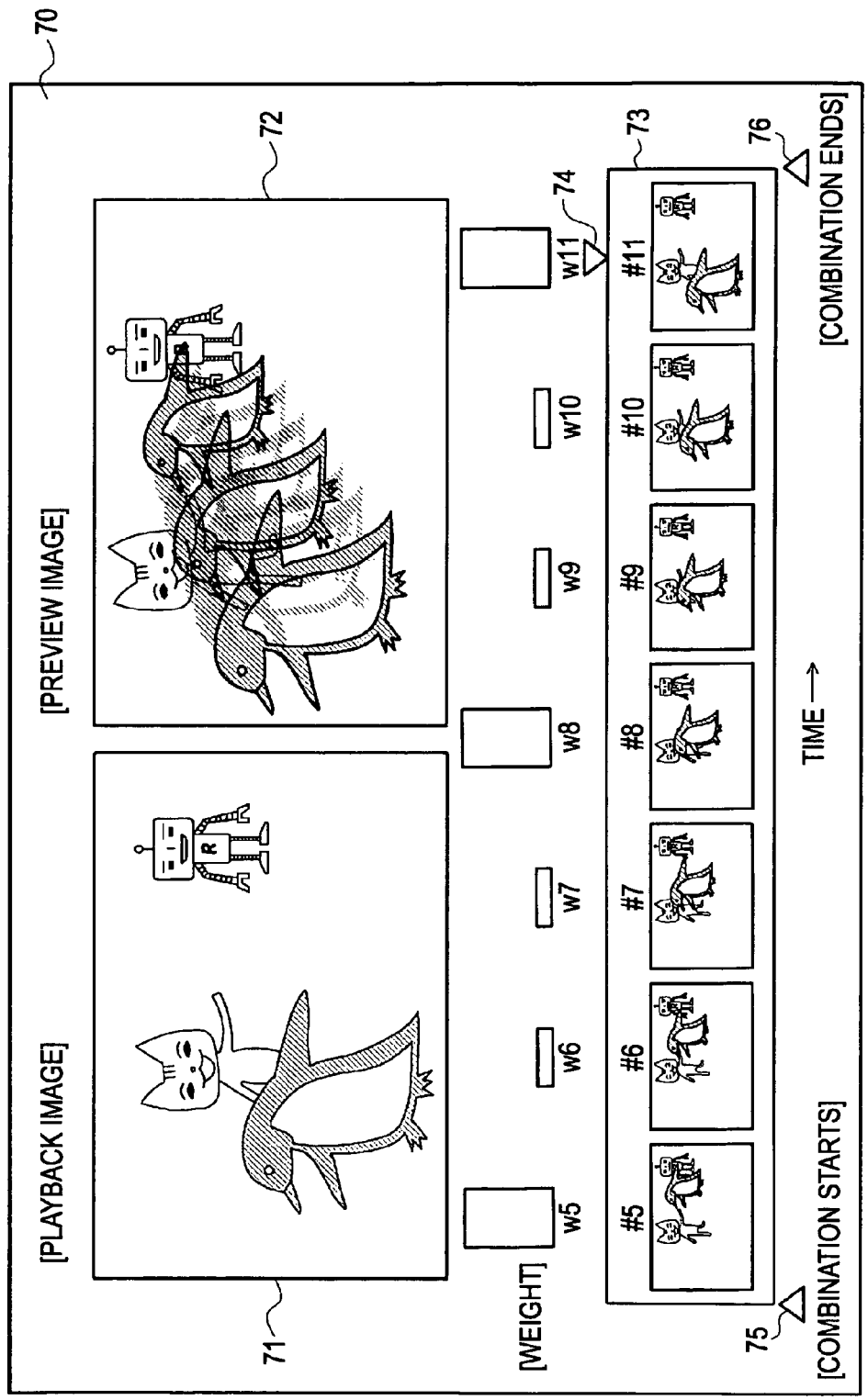
FIG. 51 is a diagram showing a combination-work image in which a combined image to which the multi-flash effect is applied after camera-shake correction is displayed according to the embodiment.

FIG. 51 shows an example of the multi-flash effect combined image generated in accordance with a weighting coefficient operation performed by the user after a blur correction has been performed.

With the process shown in FIG. 52, the user can obtain a desired image effect after performing blur correction in the manner described above.

An exemplary process for correcting subject blur will now be described.

Subject blur is addressed by extracting an image area of a dynamic subject from each of image data elements in a combination range and performing a combination process to combine the image areas of the dynamic subject extracted from the combination-use image data elements with one combination-use image data element.

Figure 53:
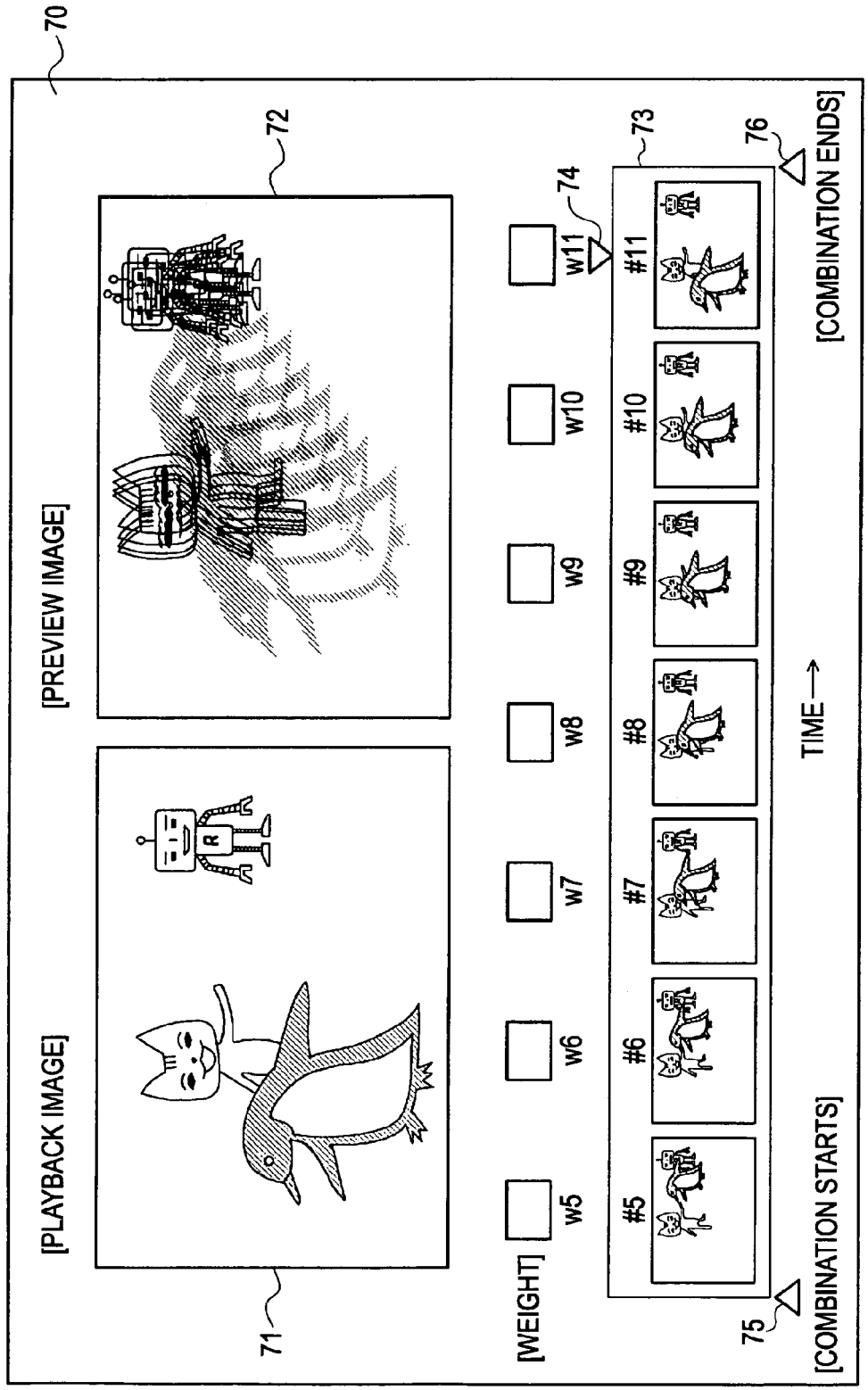
FIG. 53 is a diagram showing a combination-work image in which a combined image affected by subject blur is displayed according to the embodiment.

FIG. 53 shows a combination-work image 70 in which a combined image obtained by combining image data elements #5 to #11 in a combination range is displayed in the image display area 72 as a preview image. In this case, background subjects blur due to the subject blur during image capture.

Figure 54:
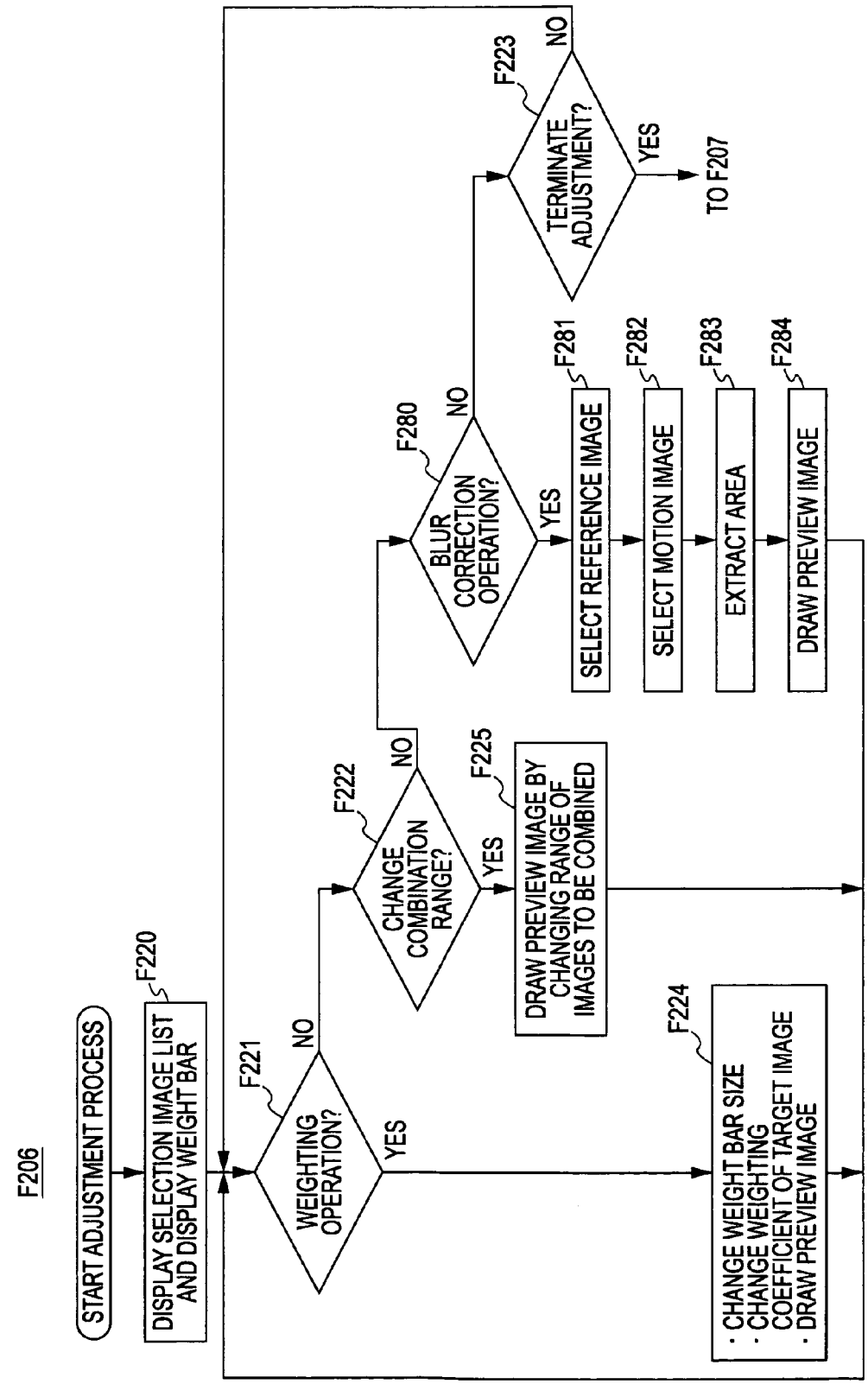
FIG. 54 is a flowchart showing an exemplary process including subject-blur correction according to the embodiment.

Therefore, subject-blur correction is performed. FIG. 54 shows an exemplary process including a process for correcting subject blur. In FIG. 54, steps F220 to F225 are similar to those in FIG. 9. In FIG. 54, steps F280 to F284 are added to the process shown in FIG. 9.

For example, when the combination-work image 70 shown in FIG. 53 is being displayed in the adjustment process, as described above, in addition to the operation of changing a weighting coefficient or changing a combination range, a user can perform a blur correction operation by operating a predetermined operation key or selecting a menu item.

When a blur correction operation performed by the user is detected, the CPU 31 advances the process from step F280 to step F281 and performs, first, a reference image selection process.

The reference image selection process may be similar to the process described above in the camera-shake correction, and may be a process for selecting a reference image data element for correction from among image data elements #5 to #11 in a combination range.

As a reference image, the top frame is selected from the selection image list defined by the combination start position and the combination end position. The reference image may also be the center frame. Alternatively, the user may be allowed to select a reference image so that image combination can be performed using the user's favorite background condition (that is, a frame to be exposed for a long time in this state without movement of the subject).

Then, in step F282, the CPU 31 performs a motion image selection process.

The user may be allowed to select a subject whose motion is to be represented using long-time exposure by operating a touch panel, a cursor, or the like in, for example, the reference image or any other image. In accordance with a user operation, the CPU 31 determines a motion image.

Then, in step F283, the CPU 31 extracts a motion-image area in each of the image data elements #5 to #11. That is, the CPU 31 performs a process of extracting a coordinate range including the specified motion image within each of the image data elements #5 to #11.

Area extraction may be performed based on the determination of an outline as a motion image.

Distance distribution information may also be obtained as metadata during image capture and a portion having a large difference in distance information may be determined as an outline portion to extract an area.

Alternatively, candidates extractable as areas may be extracted and the user may be prompted to select one of them.

For images other than an image in which area extraction is first set, an identical image in the vicinity of (within the range of subject blur that is defined by the exposure time based on divisional exposure) the position coordinates of the extracted area in the initially set image or an image close to the initially set image (for example, an adjacent frame) is found and extracted.

A frame is selected and checked using a playback image. Thus, the extracted area can be checked. The extracted area can also be modified by operating a touch panel, a cursor, or the like.

In a case where the motion-image area is either set automatically or selected by the user, a plurality of areas rather than one area may be selected.

If a scene where a subject serving as a motion image is moving across the screen (within the angle of view) is captured, continuously captured image data elements may include an image data element in which the subject whose motion is to be represented does not appear. In this case, the user is notified that, for the frame in which no motion-image area is extractable, no extractable candidates are found in the screen by displaying the notification on a display screen. Further, due to the rapid motion of a subject serving as a motion image, the subject can appear in only one frame. In this case, the user may be notified that an extractable candidate appears in only one image data element.

That is, area extraction may not necessarily be performed for all frames but may be performed for only one image.

After the area extraction is performed, in step F284, the CPU 31 performs a combination process. In this case, the CPU 31 performs a process of combining data including the motion-image areas (that is, a subject whose motion is to be represented with the long-time exposure effect) extracted from each of the image data elements #5 to #11 with the reference image data element. That is, combination is performed using only the entire screen of the reference image data element and the areas extracted from the remaining image data elements.

In this process, the background of only the reference image data element is used to produce a background except for the extracted motion image, and images of a main subject whose motion is to be represented (images of the extracted areas) are added to the background of the reference image data element.

Then, a preview image obtained by the combination described above is displayed in the image display area 72. For example, as shown in FIG. 50, a combined image without blurring of the background subjects is obtained. Since the background image (static subjects) is formed only using the reference image data element, no blur occurs.

After blur correction is performed in the manner described above, in accordance with a user operation, the weighting coefficients of the image data elements #5 to #11 are changed. Thus, various photographic representations can be achieved.

Note that the lightness or color of a combined image is automatically adjusted according to an area used for the combination and the brightness level thereof, thereby obtaining a combined image having appropriate lightness/color. For example, if an extracted area is whitish or bright, high-brightness information of the overall combined image will be obtained. A value for performing underexposure correction is computed based on the brightness information.

A motion image changes in accordance with the motion. For example, when the subject is a person or animal, the body size or posture (such as the orientation of the legs or the angle of the neck) differs depending on the image data elements #5 to #11. It is therefore desirable that area extraction be performed from each image data element by using a motion image that is extracted first as a reference and extracting an area including an image similar to the motion image in each of the remaining image data elements.

The extracted areas may be stored in a memory (for example, the flash ROM 33) of the image capture apparatus 1 and may be used for subsequent image capture or image combination process.

Other area extraction (area division) techniques other than that described above may also be used, such as using the intensity of brightness signals or a threshold. For example, area extraction may be performed using a brightness signal as a threshold. This can provide a combined image similar to an image of a beam of light moving in a night scene (for example, the taillight of a vehicle) which is captured using long-time exposure.

Next, an exemplary process for correcting both camera shake and subject blur will be described with reference to FIG. 55.

Here, by way of example, a combination process will be described in which an image area of a dynamic subject is extracted from each of image data elements in a combination range having continuity in time; coordinate transformation is performed for each of the extracted image areas of the dynamic subject on the basis of detected motion vectors of a static subject in the image data elements; and then the image areas of the dynamic subject are combined with one reference image data element.

Figure 55:
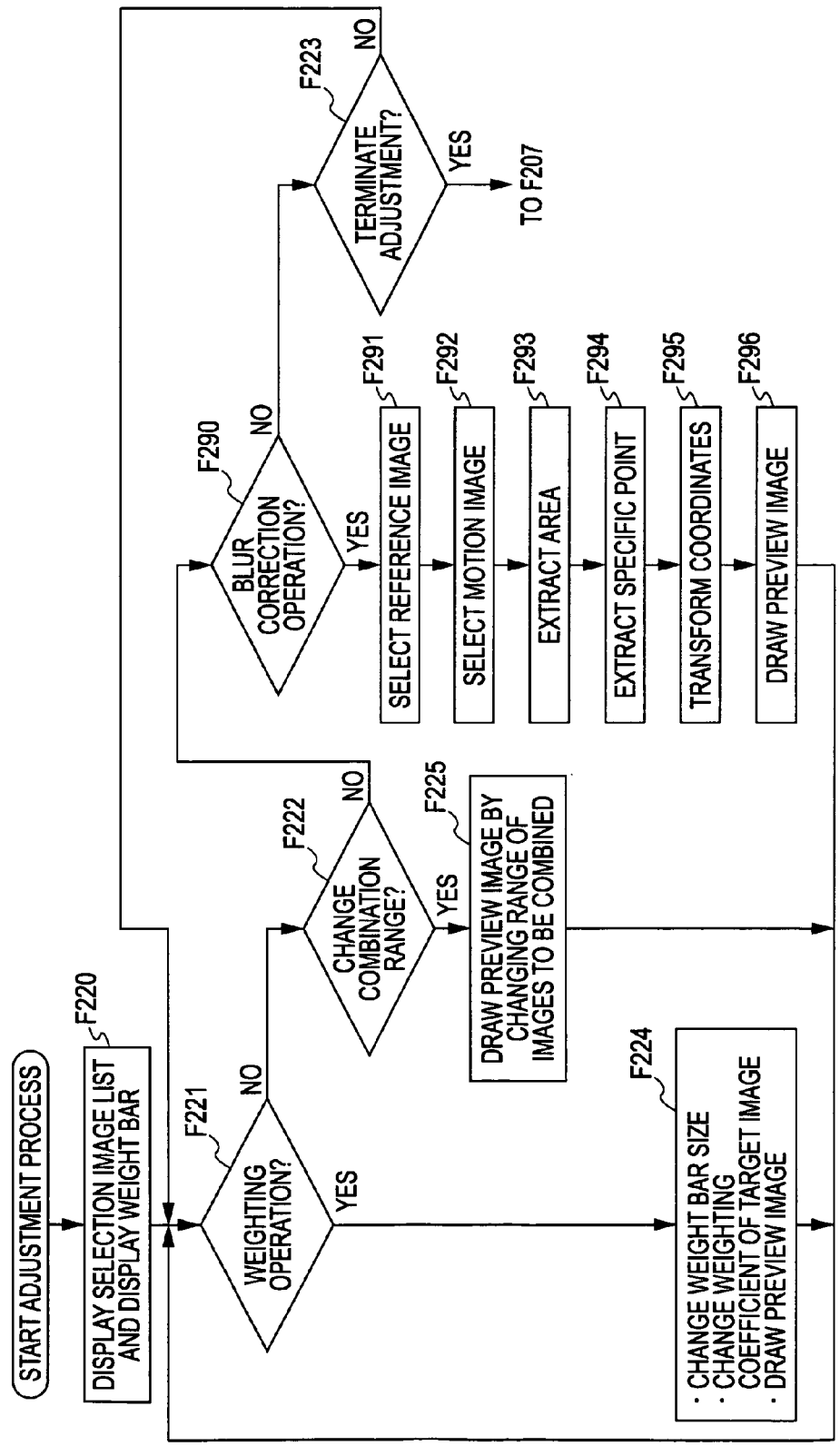
FIG. 55 is a flowchart showing an exemplary process including camera-shake correction and subject-blur correction according to the embodiment.

FIG. 55 shows the process of the CPU 31. Steps F290 to F296 show the processing involved in a blur correction operation (the remaining steps, namely, steps F220 to F225, are similar to those shown in FIG. 9).

When a blur correction operation performed by the user is detected, the CPU 31 advances the process from step F290 to step F291 and performs, first, a reference image selection process in a manner similar to that in the examples shown in FIGS. 52 and 54.

Then, in step F292, the CPU 31 performs a motion image selection process in a manner similar to that in the example shown in FIG. 54. Then, in step F293, the CPU 31 extracts a motion-image area in each image data element.

In step F294, as in the example shown in FIG. 52, the CPU 31 extracts a specific point for a static subject and detects amounts of displacement of the specific point. Specifically, an amount of shift of a coordinate position of the specific point of the static subject in each of image data elements other than a reference image data element with respect to a coordinate position of the specific point in the reference image data element is detected.

In step F295, the CPU 31 performs coordinate transformation of the areas extracted as the motion image from the individual image data elements other than the reference image data element using the amounts of displacement.

For example, if the image data element #5 is used as a reference image data element, first, coordinate transformation is performed on the motion-image area extracted from the image data element #6 using the detected amount of displacement of the specific point in the image data element #6 with respect to the specific point in the reference image data element #5. Coordinate transformation is also performed on the motion-image areas extracted from the image data elements #7 to #11 in a similar manner.

Then, in step F296, the CPU 31 performs a combination process. In this case, the CPU 31 performs a process of combining data of the motion-image areas (that is, a subject whose motion is to be represented with the long-time exposure effect) that have been extracted from the image data elements #5 to #11 and that have been coordinate-transformed in step F295 with the reference image data element. That is, combination is performed using the entire screen of the reference image data element and the areas extracted from the remaining image data elements.

A preview image obtained by the combination described above is displayed in the image display area 72. For example, as shown in FIG. 50, a combined image without blurring of the background subjects is obtained. Since the background image (static subjects) is formed only by the reference image data element, no influence of camera shake or subject blur occurs. Further, images of a main subject serving as a motion image are combined after the coordinate transformation, and no influence of camera shake occurs.

Next, another exemplary process for correcting both camera shake and subject blur will be described with reference to FIG. 56.

In this process, after coordinate transformation based on detected motion vectors of a static subject within image data elements is performed on each of image data elements in a combination range having continuity in time, an image area of a dynamic subject is extracted from each of the image data elements and a combination process is performed so that the area images of the dynamic subject extracted from the image data elements are combined with one reference image data element.

Figure 56:
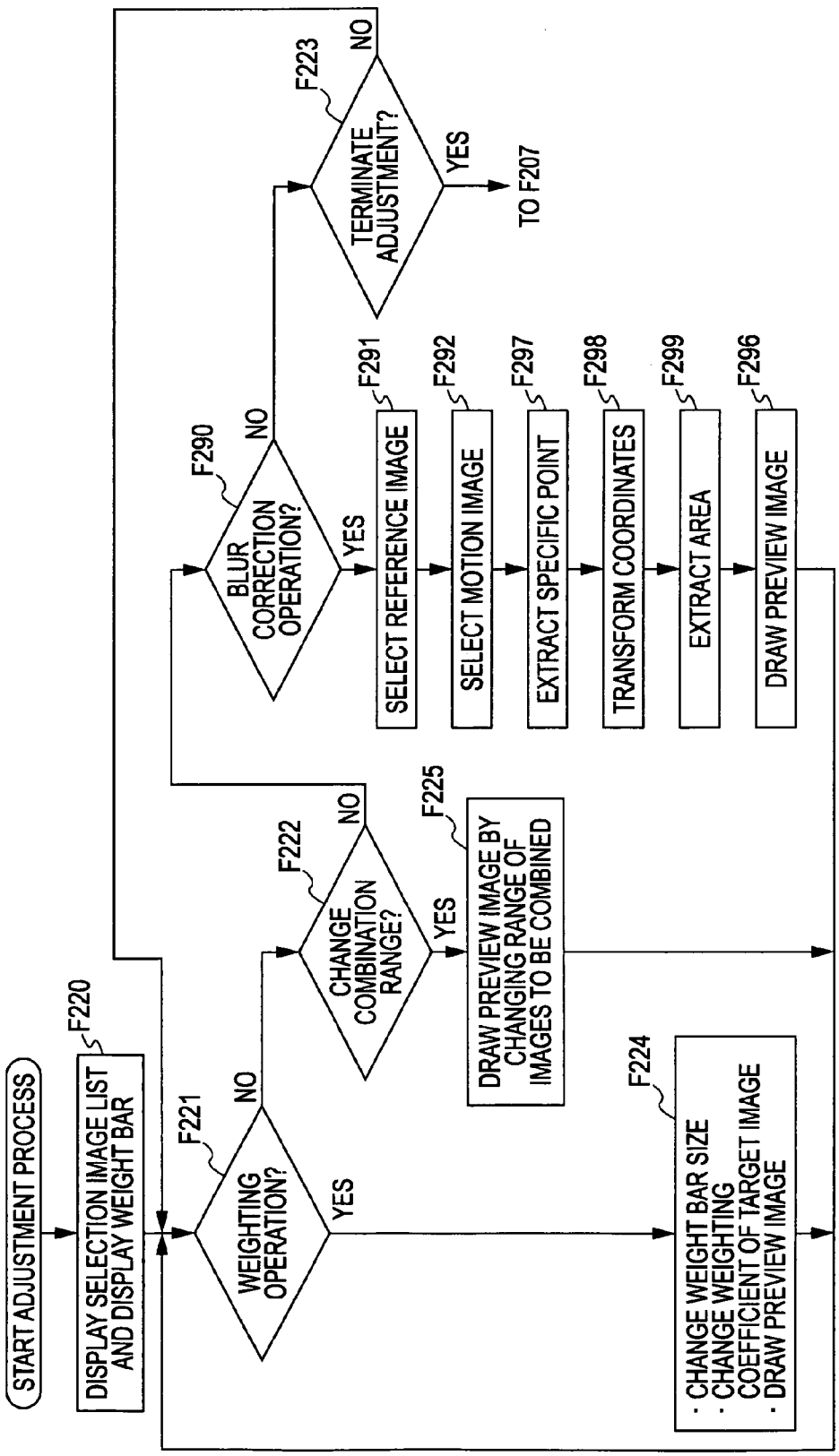
FIG. 56 is a flowchart showing another exemplary process including camera-shake correction and subject-blur correction according to the embodiment.

FIG. 56 shows the process of the CPU 31. Steps F290, F291, F292, F297, F298, F299, and F296 show the processing involved in a blur correction operation (the remaining steps, namely, steps F220 to F225, are similar to those shown in FIG. 9).

When a blur correction operation performed by the user is detected, the CPU 31 advances the process from step F290 to step F291 and performs, first, a reference image selection process in a manner similar to that in the examples shown in FIGS. 52 and 54.

Then, in step F292, the CPU 31 performs a motion image selection process in a manner similar to that in the example shown in FIG. 54.

Then, in step F297, as in the example shown in FIG. 52, the CPU 31 extracts a specific point for a static subject and detects amounts of displacement of the specific point. Specifically, an amount of shift of a coordinate position of the specific point of the static subject in each of image data elements other than a reference image data element with respect to a coordinate position of the specific point in the reference image data element is detected.

Then, in step F298, the CPU 31 performs coordinate transformation on the individual image data elements other than the reference image data element using the amounts of displacement.

For example, if the image data element #5 is used as a reference image data element, first, coordinate transformation is performed for the entirety of the image data element #6 using the detected amount of displacement of the specific point in the image data element #6 with respect to the specific point in the reference image data element #5. Coordinate transformation is also performed for the image data elements #7 to #11 in a similar manner.

After coordinate transformation is performed for the individual image data elements other than the reference image data element, in step F299, the CPU 31 extracts a motion-image area from each of the image data elements #5 to #11.

Then, in step F296, the CPU 31 performs a combination process. In this case, the CPU 31 performs a process of combining data of the motion-image areas (that is, a subject whose motion is to be represented with the long-time exposure effect) extracted from the image data elements #5 to #11 with the reference image data element. That is, combination is performed using the entire screen of the reference image data element and the areas extracted from the remaining image data elements.

A preview image obtained by the combination described above is displayed in the image display area 72. For example, as shown in FIG. 50, a combined image without blurring of the background subjects is obtained. Since the background image (static subject) is formed only by the reference image data element, no influence of camera shake or subject blur occurs. Further, images of a main subject serving as a motion image are extracted from the image data elements #5 to #11 that have been coordinate-transformed, the influence of camera shake has also been overcome.

With the exemplary processes described above, a combined image in which the influence of camera shake or subject blur has been overcome can be obtained, and a user can more easily obtain his or her desired combined image. In particular, users who are inexperienced in image capture techniques can obtain a combined image or undesired motion of a background subject during image capture can be corrected.

12. Information Processing Apparatus

Figure 57:
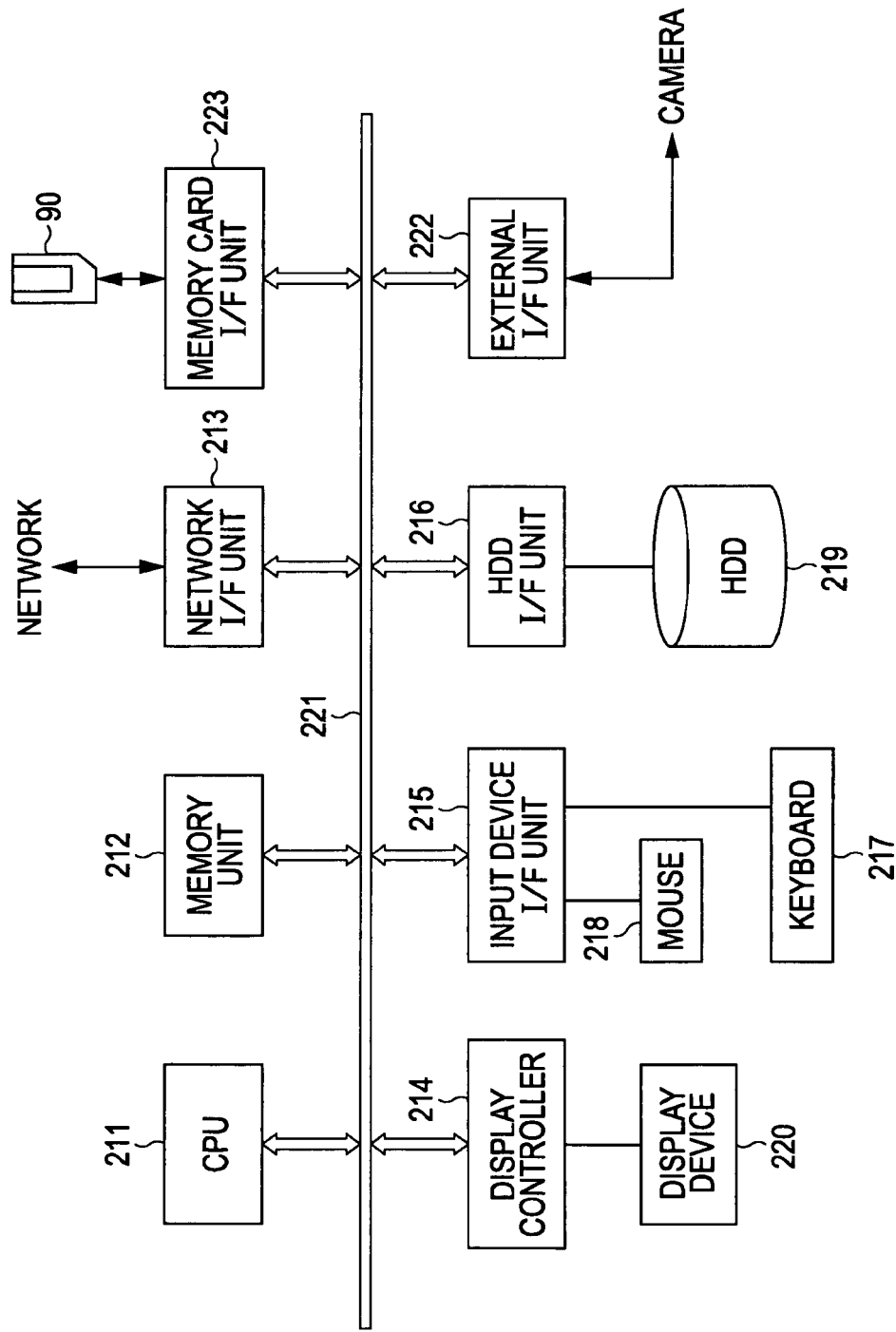
FIG. 57 is a schematic diagram showing an example structure of an information processing apparatus according to an embodiment of the present invention.

In the foregoing embodiment, an image capture and combination processes are performed using the image capture apparatus 1. The combination process may be performed using a device other than the image capture apparatus 1. FIG. 57 shows an information processing apparatus serving as an example of an apparatus configured to execute a combination process, for example, a personal computer 200.

FIG. 57 shows an example structure of a personal computer (hereinafter referred to as a "PC") 200.

As shown in FIG. 57, the PC 200 includes a central processing unit (CPU) 211, a memory unit 212, a network interface unit 213, a display controller 214, an input device interface unit 215, a hard disk drive (HDD) interface unit 216, a keyboard 217, a mouse 218, an HDD 219, a display device 220, a bus 221, an external device interface unit 222, and a memory card interface unit 223.

The CPU 211, which may be a main controller of the PC 200, executes various control processes according to a program stored in the memory unit 212. The CPU 211 is connected to other units via the bus 221.

Each of the devices on the bus 221 has a unique memory address or an input/output (I/O) address, and the CPU 211 can use the addresses to access the devices. An example of the bus 221 may be a peripheral component interconnect (PCI) bus.

The memory unit 212 is configured to include both a volatile memory and a non-volatile memory. The memory unit 212 includes a non-volatile memory such as a ROM for storing a program, a RAM used as a computation work area or temporary storage of various data, and an electrically erasable and programmable read only memory (EEPROM).

The memory unit 212 is used to store program code executed by the CPU 211 or other information such as identification information unique to the PC 200, or is used as a buffer area for communication data or as a work area for work data while it is executed.

The network interface unit 213 connects the PC 200 to a network such as the Internet or a local area network (LAN) according to a predetermined communication protocol such as Ethernet (registered trademark). The CPU 211 can communicate with apparatuses connected to the network via the network interface unit 213.

The display controller 214 is a dedicated controller for actually processing rendering commands issued by the CPU 211. For example, the display controller 214 supports a bitmap rendering function corresponding to the Super Video Graphic Array (SVGA) or extended Graphic Array (XGA) standard. The rendering data processed in the display controller 214 is temporarily written into, for example, a frame buffer (not shown), and is then output to the display device 220. The display device 220 may be, for example, an organic EL display, a cathode ray tube (CRT) display, a liquid crystal display, or the like.

The input device interface unit 215 is a device for connecting a user input device including the keyboard 217 and the mouse 218 to a computer system implemented as the PC 200.

Specifically, a user operation input to the PC 200 is performed using the keyboard 217 and the mouse 218, and the operation input information is supplied to the CPU 211 via the input device interface unit 215.

The HDD interface unit 216 performs an interface process for performing writing/reading on the HDD 219.

The HDD 219 is an external storage device in which a magnetic disk serving as a storage medium is fixedly mounted, as is common in the art, and has a larger storage capacity and a higher data transfer rate than other external storage devices. Placing a software program onto the HDD 219 in an executable state is referred to as "installing" the program into the system. In general, the HDD 219 stores program code of an operating system (OS) executed by the CPU 211, application programs, device drivers, etc., in a non-volatile state.

The programs stored in the HDD 219 are developed in the memory unit 212, for example, when the PC 200 is started or when an application program for the user layer is started. The CPU 211 performs a process based on the program developed in the memory unit 212.

The external device interface unit 222 is configured to interface with an external device connected according to a standard such as the USB standard.

In the present embodiment, examples of external devices may include, for example, a digital still camera, a video camera, and a video player.

The PC 200 can acquire image data from a digital still camera or the like through communication via the external device interface unit 222.

The standard supported by the external device interface unit 222 is not limited to the USB standard but may be any other interface standard such as the Institute of Electrical and Electronics Engineers (IEEE) 1394.

The memory card interface unit 223 is configured to write/read data into/from a recording medium 90 such as a memory card.

For example, the recording medium 90, which is used for a digital still camera, for example, the image capture apparatus 1 described above, a video camera, or the like, is placed. Then, image data can be read from the recording medium 90.

In the PC 200 having the structure described above, an arithmetic processing/control operation based on the software configuration in the CPU 211, namely, software such as the application programs, the OS, and the device drivers, is performed to execute various operations.

In the present embodiment, the processes of steps ST1 to ST4 described as the processes in the combination mode shown in FIG. 4, that is, the target image selection/acquisition process (ST1), the combining preparatory process (ST2), the combination process (ST3), and the combined-image recording process (ST4), are executable. A program for performing the processes is installed into, for example, the HDD 219 and is developed in the memory unit 212 when it is started. The CPU 211 executes necessary arithmetic processes or control processes according to the program developed in the memory unit 212.

Then, in the CPU 211, the program, when started, allows the pre-combination processing unit 52, combination processing unit 53, recording/playback/transmission control unit 54, operation detection unit 55, display control unit 56, and template management unit 57 shown in FIG. 3 to be configured as the functional blocks.

In other words, the processes described with reference to FIGS. 7, 8, and 9 as well as the processes described with reference to FIGS. 19, 22, 36, 38, 40, 44, 52, 54, 55, and 56 are executed in the CPU 211.

Accordingly, the user can use the PC 200 to perform combination processes for obtaining various image effects as described above.

A program for causing the CPU 211 to execute the processes described above can be recorded in advance on an HDD serving as a recording medium incorporated in an apparatus such as the PC 200, or a ROM, a flash memory, or the like in a microcomputer having a CPU.

Alternatively, the program can be temporarily or permanently stored (recorded) on a removable recording medium such as a flexible disk, a compact disc read only memory (CD-ROM), a magnet-optical (MO) disk, a digital versatile disc (DVD), a Blu-ray disk, a magnetic disk, a semiconductor memory, or a memory card. Such removable recording media can be provided as so-called packaged software.

The program may also be downloaded from a download site via a network such as a LAN or the Internet as well as installed into a personal computer or the like from a removable recording medium.

In the PC 200 having the structure described above, for example, the HDD 219 can store various types of image content. For example, image content captured by a user using a digital still camera or a video camera may be acquired and stored into the HDD 219. Thus, the user can enjoy the captured image played back using the PC 200.

For example, the external interface unit 222 of the PC 200 may be connected to the external interface 8 of the image capture apparatus 1 so that image data captured using the image capture apparatus 1 can be transferred to the PC 200 and acquired.

The recording medium 90 (memory card) used in the image capture apparatus 1 may also be placed in the memory card interface unit 223 so that the PC 200 can acquire image data captured using the image capture apparatus 1 from the recording medium 90.

In addition to image content captured by the user, for example, image content played back using an external video player or the like and acquired from the external interface unit 222 or image content downloaded from an external server via a network using the network interface unit 213 can also be stored in the HDD 219 and played back.

That is, in the PC 200, for example, a plurality of frames of image data having continuity in time, which have been captured using a digital still camera or a video camera, can be loaded into, for example, the HDD 219 for use. A user can use the PC 200 to execute a combination process on the loaded image data in a manner similar to that in the example described above.

For example, the user performs the combination-mode image capture in step F15 shown in FIG. 5 using the image capture apparatus 1, and then loads the plurality of captured frames of image data into the PC 200. Then, the user starts software for performing a combination process to cause the CPU 211 to execute the processes of steps ST1 to ST4 described as the processes in the combination mode shown in FIG. 4. Therefore, various types of image combination can be performed in a higher-operability environment to create combined images with various image effects.

Furthermore, a combination process can be performed not only on images captured by the user himself or herself but also on various types of image data (moving-image content) available on the PC 200.

For example, moving-image data loaded into the HDD 219 by any way such as downloading may be played back, or a DVD drive, a Blu-ray disk drive, or the like, which is not shown in FIG. 57, may be connected so that image content recorded on an optical disk such as a DVD or a Blu-ray disk can be played back. In this case, a combination process is performed on moving-image content recorded on the optical disk, thereby generating a combined image with a desired image representation such as the long-time exposure effect, the first-curtain synchronization effect, the second-curtain synchronization effect, or the multi-flash effect. Further, an apparatus incorporating or connected to a television broadcast tuner or the like can generate a combined image of broadcast content.

In the present embodiment, a personal computer is used as an information processing apparatus by way of example. Other various information processing apparatuses using image data, such as a mobile phone, a personal digital assistant (PDA), a game unit, and a video editor, can execute image combination in a manner similar to that described above.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
  a pre-combination processing unit configured to perform a pre-combination process so that a plurality of frames of image data having continuity in time are used as combination-use image data to be combined;
  an operation detection unit configured to detect operation input information used for a combination process;
  a storage unit configured to store a plurality of coefficient templates each having a different pattern of weighting coefficients, each of the different pattern of weighting coefficients being preconfigured to create a different flash effect;
  a template management unit configured to select one of the coefficient templates stored in the storage unit according to the operation input information indicating selection by a user of a particular flash preset from a plurality of selectable flash presets, each of the plurality of selectable flash presets being assigned to each different flash effect; and
  a combination processing unit configured to perform the combination process on the combination-use image data of the plurality of frames obtained in the pre-combination process using the coefficient template selected by the template management unit so as to generate combined-image data representing a still image.

2. The image processing apparatus according to claim 1, wherein the coefficient templates include a coefficient template having a pattern of weighting coefficients in which a high weighting coefficient is assigned to a start frame in consecutive frames and in which a low weighting coefficient is assigned to a remaining frame.

3. The image processing apparatus according to claim 1, wherein the coefficient templates include a coefficient template having a pattern of weighting coefficients in which a high weighting coefficient is assigned to a last frame in consecutive frames and in which a low weighting coefficient is assigned to a remaining frame.

4. The image processing apparatus according to claim 1, wherein the coefficient templates include a coefficient template having a pattern of weighting coefficients in which a high weighting coefficient and a low weighting coefficient are periodically assigned to consecutive frames.

5. The image processing apparatus according to claim 1, wherein, in the pre-combination process, the pre-combination processing unit obtains a plurality of frames of image data having continuity in time that are recorded on a recording medium, and uses the obtained plurality of frames of image data as combination-use image data to be combined.

6. The image processing apparatus according to claim 1, further comprising:
an image capture unit configured to capture an image of a subject to obtain image data; and
a recording playback unit configured to record and play back the image data obtained by the image capture unit onto and from a recording medium,
wherein, in the pre-combination process, the pre-combination processing unit detects a plurality of consecutive or intermittent frames of image data from a plurality of frames of image data that are recorded on the recording medium, and uses the detected plurality of consecutive or intermittent frames of image data as combination-use image data to be combined.

7. The image processing apparatus according to claim 1, further comprising a display control unit configured to generate display data for selecting any one of the plurality of selectable flash presets and output the generated display data as image data for selection by the user for display.

8. The image processing apparatus according to claim 7, wherein the display control unit generates image display data for an image in which combination effects achieved using the selected coefficient template are shown, and outputs the generated image display data as the image data used for display.

9. An processor-implemented image processing method comprising the steps of:
performing, via a processor, a pre-combination process so that a plurality of frames of image data having continuity in time are used as combination-use image data to be combined;
detecting operation input information used for a combination process;
selecting one of a plurality of coefficient templates each having a different pattern of weighting coefficients assigned to image data of frames, each of the different pattern of weighting coefficients being configured to create a different flash effect,
wherein the selected one of the plurality of coefficient templates is selected according to the operation input information indicating selection by a user of a particular flash preset from a plurality of different flash presets, each of the plurality of different flash presents being assigned to each different flash effect; and
performing, via the processor, the combination process on the combination-use image data of the plurality of frames obtained in the pre-combination process using the selected coefficient template so as to generate combined-image data representing a still image.

10. A non-transitory computer-readable storage unit on which computer-readable instructions of a program are stored, the instructions, when executed by a processor, causing the processor to:
performing a pre-combination process so that a plurality of frames of image data having continuity in time are used as combination-use image data to be combined;
detecting operation input information used for a combination process;
selecting one of a plurality of coefficient templates each having a different pattern of weighting coefficients assigned to image data of frames, each of the different pattern of weighting coefficients being configured to create a different flash effect,
wherein the selected one of the plurality of coefficients is selected according to the operation input information indicating selection by a user of a particular flash preset from a plurality of different flash presets, each of the plurality of different flash presents being assigned to each different flash effect; and
performing the combination process on the combination-use image data of the plurality of frames obtained in the pre-combination process using the selected coefficient template so as to generate combined-image data representing a still image.

\* \* \* \* \*